US009916002B2

(12) United States Patent
Petrovskaya et al.

(10) Patent No.: US 9,916,002 B2
(45) Date of Patent: Mar. 13, 2018

(54) SOCIAL APPLICATIONS FOR AUGMENTED REALITY TECHNOLOGIES

(71) Applicant: Eonite Perception Inc., Palo Alto, CA (US)

(72) Inventors: Anna Petrovskaya, Los Altos, CA (US); Peter Varvak, Los Altos, CA (US)

(73) Assignee: Eonite Perception Inc., Palo Alto, CA (US)

( * ) Notice: Subject to any disclaimer, the term of this patent is extended or adjusted under 35 U.S.C. 154(b) by 0 days.

(21) Appl. No.: 15/054,082

(22) Filed: Feb. 25, 2016

(65) Prior Publication Data
US 2016/0253844 A1 Sep. 1, 2016

Related U.S. Application Data

(60) Provisional application No. 62/121,486, filed on Feb. 26, 2015.

(51) Int. Cl.
*G06F 3/01* (2006.01)
*G06T 19/00* (2011.01)

(52) U.S. Cl.
CPC .................... *G06F 3/011* (2013.01)

(58) Field of Classification Search
CPC ............. G06F 3/011; G06T 19/006; G02B 2027/0178; G02B 2027/0174; G02B 2027/017; G02B 2027/0172; H04L 51/32
USPC ........ 345/418, 419, 629–634, 649; 709/204; 382/103, 276
See application file for complete search history.

(56) References Cited

U.S. PATENT DOCUMENTS

| | | |
|---|---|---|
| 5,832,212 A | 11/1998 | Cragun et al. |
| 6,922,701 B1 | 7/2005 | Ananian et al. |
| 7,313,825 B2 | 12/2007 | Redlich et al. |
| 7,382,244 B1 | 6/2008 | Donovan et al. |
| 7,546,334 B2 | 6/2009 | Redlich et al. |
| 7,583,275 B2 | 9/2009 | Neumann et al. |
| 8,275,635 B2 | 9/2012 | Stivoric et al. |
| 8,452,080 B2* | 5/2013 | Engedal .............. G06T 7/251 345/419 |
| 8,521,128 B1 | 8/2013 | Welsh et al. |
| 8,620,532 B2 | 12/2013 | Curtis et al. |
| 8,839,121 B2 | 9/2014 | Bertolami et al. |

(Continued)

OTHER PUBLICATIONS

Anna Petrovskaya, PhD Thesis, "Towards Dependable Robotic Perception", avaialble at (http://cs.stanford.edu/people/petrovsk/dn/publications/anya-thesis.pdf) (retrieved Oct. 22, 2014), Jun. 2011.

(Continued)

*Primary Examiner* — Chante Harrison

(57) ABSTRACT

Augmented and virtual reality systems are becoming increasingly popular. Unfortunately, their potential for social interaction is difficult to realize with existing techniques. Various of the disclosed embodiments facilitate social augmented and virtual reality experiences using, e.g., topologies connecting disparate device types, shared-environments, messaging systems, virtual object placements, etc. Some embodiments employ pose-search systems and methods that provide more granular pose determinations than were previously possible. Such granularity may facilitate functionality that would otherwise be difficult or impossible to achieve.

20 Claims, 34 Drawing Sheets

(56) References Cited

U.S. PATENT DOCUMENTS

| | | | |
|---|---|---|---|
| 8,933,931 B2 | 1/2015 | Balan et al. | |
| 9,124,635 B2 | 9/2015 | Robinson et al. | |
| 9,304,970 B2 | 4/2016 | Wirola et al. | |
| 9,754,419 B2* | 9/2017 | Petrovskaya | G06T 19/006 |
| 2002/0013675 A1 | 1/2002 | Knoll et al. | |
| 2004/0107356 A1 | 6/2004 | Shamoon et al. | |
| 2005/0132070 A1 | 6/2005 | Redlich et al. | |
| 2006/0238380 A1 | 10/2006 | Kimchi et al. | |
| 2008/0195956 A1 | 8/2008 | Baron et al. | |
| 2009/0047972 A1 | 2/2009 | Neeraj | |
| 2009/0104585 A1 | 4/2009 | Diangelo et al. | |
| 2009/0104686 A1 | 4/2009 | Lee et al. | |
| 2010/0060632 A1 | 3/2010 | Lefevre et al. | |
| 2010/0103196 A1 | 4/2010 | Kumar et al. | |
| 2010/0166294 A1 | 7/2010 | Marrion et al. | |
| 2010/0182340 A1 | 7/2010 | Bachelder et al. | |
| 2011/0046925 A1 | 2/2011 | Bidard et al. | |
| 2011/0102460 A1 | 5/2011 | Parker | |
| 2011/0199479 A1 | 8/2011 | Waldman | |
| 2011/0221771 A1 | 9/2011 | Cramer et al. | |
| 2011/0286631 A1* | 11/2011 | Wagner | G06K 9/32 382/103 |
| 2011/0313779 A1 | 12/2011 | Herzog et al. | |
| 2012/0197439 A1 | 8/2012 | Wang et al. | |
| 2012/0315884 A1 | 12/2012 | Forutanpour et al. | |
| 2012/0329486 A1* | 12/2012 | Gits | H04W 4/12 455/466 |
| 2013/0026224 A1 | 1/2013 | Ganick et al. | |
| 2013/0042296 A1* | 2/2013 | Hastings | G06F 21/10 726/1 |
| 2013/0044130 A1 | 2/2013 | Geisner et al. | |
| 2013/0101163 A1 | 4/2013 | Gupta et al. | |
| 2013/0116968 A1 | 5/2013 | Wirola et al. | |
| 2013/0129230 A1 | 5/2013 | Shotton et al. | |
| 2013/0132477 A1* | 5/2013 | Bosworth | G06Q 50/01 709/204 |
| 2013/0132488 A1* | 5/2013 | Bosworth | H04L 51/32 709/206 |
| 2013/0174213 A1 | 7/2013 | Liu et al. | |
| 2013/0182891 A1 | 7/2013 | Ling | |
| 2013/0222369 A1 | 8/2013 | Huston et al. | |
| 2013/0242106 A1 | 9/2013 | Leppanen et al. | |
| 2014/0002444 A1 | 1/2014 | Bennett et al. | |
| 2014/0204077 A1 | 7/2014 | Kamuda et al. | |
| 2014/0210710 A1 | 7/2014 | Shin et al. | |
| 2014/0241614 A1 | 8/2014 | Lee | |
| 2014/0254934 A1 | 9/2014 | Laxminarayana Bhat et al. | |
| 2014/0267234 A1 | 9/2014 | Hook et al. | |
| 2014/0276242 A1 | 9/2014 | Chen et al. | |
| 2014/0292645 A1* | 10/2014 | Tsurumi | G06F 3/011 345/156 |
| 2014/0307793 A1 | 10/2014 | Taubman et al. | |
| 2014/0323148 A1 | 10/2014 | Schmalstieg et al. | |
| 2014/0324517 A1 | 10/2014 | Harris | |
| 2014/0357290 A1 | 12/2014 | Grabner et al. | |
| 2014/0368532 A1* | 12/2014 | Keane | G02B 27/017 345/619 |
| 2015/0143459 A1 | 5/2015 | Molnar et al. | |
| 2015/0204676 A1 | 7/2015 | Zhang et al. | |
| 2015/0287246 A1 | 10/2015 | Huston et al. | |
| 2015/0296170 A1 | 10/2015 | Farrell et al. | |
| 2015/0332439 A1 | 11/2015 | Zhang et al. | |
| 2016/0026253 A1* | 1/2016 | Bradski | G02B 27/225 345/8 |
| 2016/0080642 A1 | 3/2016 | Jung et al. | |
| 2016/0110560 A1 | 4/2016 | Forte et al. | |
| 2016/0180590 A1* | 6/2016 | Kamhi | G06K 9/00671 345/633 |
| 2016/0189419 A1* | 6/2016 | Fakih | G06T 17/005 345/419 |
| 2016/0335275 A1 | 11/2016 | Williams et al. | |
| 2016/0335497 A1 | 11/2016 | Williams et al. | |
| 2016/0335802 A1 | 11/2016 | Bradski | |
| 2016/0337599 A1 | 11/2016 | Williams et al. | |

OTHER PUBLICATIONS

B. Curless and M. Levoy, "A Volumetric Method for Building Complex Models From Range Images", in proceedings of the 23rd annual conference on Computer Graphics and Interactive Techniques, pp. 303-312, ACM, 1996.

W. E. Lorensen and H. E. Cline. "Marching Cubes: A High Resolution 3D Surface Construction Algorithm", in ACM Siggraph Computer Graphics, vol. 21, pp. 163-169, ACM, 1987.

International Search Report & Written Opinion, PCT/US2015/60744; dated Feb. 2, 2016; 8 Pages.

* cited by examiner

1  Input: initial camera pose $T_0$
2  foreach *new frame of data $D_t$* do
3     begin Prediction Step:
4        Compute the prediction $\overline{bel}_t$.
5        Let $T_t^- := MP(\overline{bel}_t)$ be the most likely pose.
6     end
7     begin Measurement Update:
8        Prepare model and data
9        repeat starting with $T_t^{(0)} := T_t^-$, $bel_t^{(0)} := \overline{bel}_t$, and $i := 0$
10          Compute correspondences using the most recent estimate of the camera pose $T_t^{(i)}$.     E-STEP
11          Refine the estimate of belief $bel_t^{(i)}$ to obtain $bel_t^{(i+1)}$ assuming the correspondences are fixed.     M-STEP
12          Let $T_t^{(i+1)} := MP(bel_t^{(i+1)})$ and $i := i + 1$.
13       until *convergence*
14    end
15    Provide the new pose estimate $T_t := T_t^{(i)}$ to the mapper or the AR device.
16 end

*FIG. 13*

Example Scaling Series algorithm for belief estimation.

Input: $V_0$ - initial uncertainty region, $\mathcal{D}$ - data set, $M$ - number of particles per $\delta$-neighborhood, $\delta_*$ - terminal value of $\delta$.

1: $\delta_0 \leftarrow Radius(V_0)$
2: $zoom \leftarrow 2^{-1/dim\mathcal{X}}$
3: $N \leftarrow \lceil \log_2(Volume(S_{\delta_0})/Volume(S_{\delta_*})) \rceil$
4: for $n = 1$ to $N$ do
5: $\quad \delta_n \leftarrow zoom \cdot \delta_{n-1}$
6: $\quad \tau_n \leftarrow (\delta_n/\delta_*)^2$
7: $\quad \bar{\mathcal{X}}_n \leftarrow$ Even_Density_Cover$(V_{n-1}, M)$
8: $\quad \mathcal{W}_n \leftarrow$ Importance_Weights$(\bar{\mathcal{X}}_n, \tau_n, \mathcal{D})$
9: $\quad \mathcal{X}_n \leftarrow$ Prune$(\bar{\mathcal{X}}_n, \mathcal{W}_n)$
10: $\quad V_n \leftarrow$ Union_Delta_Neighborhoods$(\mathcal{X}_n, \delta_n)$
11: end for
12: $\mathcal{X} \leftarrow$ Even_Density_Cover$(V_N, M)$
13: $\mathcal{W} \leftarrow$ Importance_Weights$(\mathcal{X}, 1, \mathcal{D})$

Output: $(\mathcal{X}, \mathcal{W})$ - a weighted particle set approximating the belief.

*FIG. 16*

SOCIAL APPLICATIONS FOR AUGMENTED REALITY TECHNOLOGIES

CROSS-REFERENCE TO RELATED APPLICATIONS

This application claims the benefit of and priority to U.S. Provisional Patent Application No. 62/121,486 filed Feb. 26, 2015, which is also incorporated by reference herein in its entirety for all purposes. This application also incorporates herein by reference in its entirety for all purposes U.S. Provisional Patent Application No. 62/080,400 filed Nov. 16, 2014 and U.S. Provisional Patent Application No. 62/080,983 filed Nov. 17, 2014.

TECHNICAL FIELD

The disclosed embodiments relate to user interfaces and social features for use with augmented reality and/or virtual reality applications.

BACKGROUND

There is increasing public demand for augmented (AR) and virtual-reality (VR) human-computer interaction (HCI) systems. As these systems become more common in society, their incorporation into social contexts will also become increasingly important. Users will want to perform their day-to-day interactions, making purchases, sharing experiences, exchanging information, exploring the Internet, etc., seamlessly with their local AR and VR operations. Additionally, users will want to interact with their peers even when their peers operate disparate systems themselves. These systems may exhibit different levels of functionality and may need to facilitate the application of older methods to new AR and VR contexts.

Unfortunately, the granularity of the information needed for fluid and comprehensive AR/VR interactions is not always easy to acquire. Indeed, many systems can only acquire such granularity at the expense of processing time or bandwidth. Until technical capacities can match the ergonomic demands of human users, such social applications will remain unfeasible. Similarly, until AR/VR systems successfully interface with previous generation HCl systems (e.g., web browsers), it will be difficult for users to share experiences at different times and/or different locations.

BRIEF DESCRIPTION OF THE DRAWINGS

The techniques introduced here may be better understood by referring to the following Detailed Description in conjunction with the accompanying drawings, in which like reference numerals indicate identical or functionally similar elements:

FIG. 13 is a pseudocode listing reflecting one possible Estimation Maximization algorithm as may be implemented in some embodiments;

FIG. 16 is a pseudocode listing reflecting one possible Scaling Series algorithm implementation as may be implemented in some embodiments;

Figure 1:
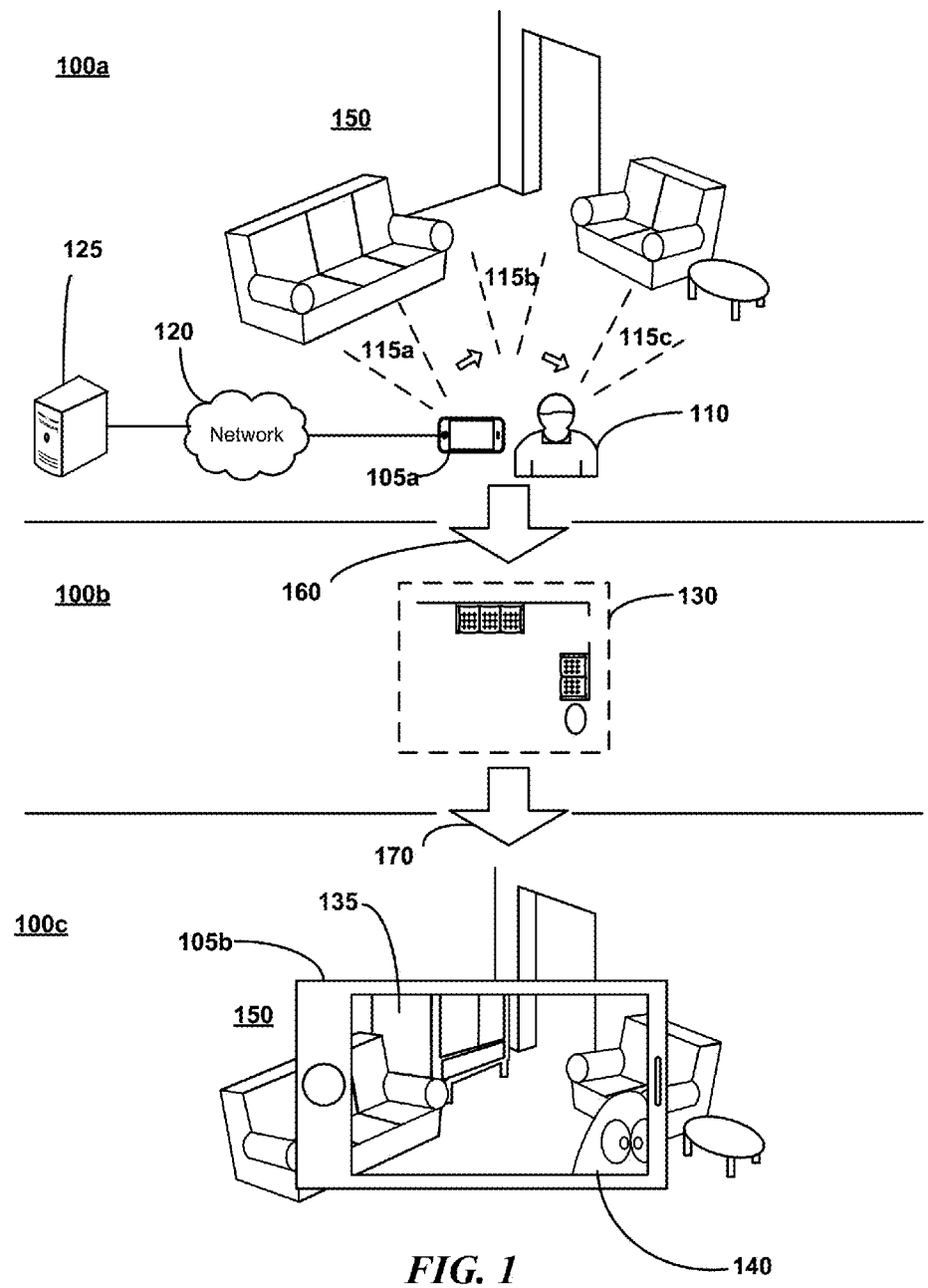
FIG. 1 is a conceptual diagram illustrating an overview of environment data capture, model creation, and model application as may occur in some embodiments.

While the flow and sequence diagrams presented herein show an organization designed to make them more comprehensible by a human reader, those skilled in the art will appreciate that actual data structures used to store this information may differ from what is shown, in that they, for example, may be organized in a different manner; may contain more or less information than shown; may be compressed and/or encrypted; etc.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Similarly, some components and/or operations may be separated into different blocks or combined into a single block for the purposes of discussion of some of the embodiments. Moreover, while the various embodiments are amenable to various modifications and alternative forms, specific embodiments have been shown by way of example in the drawings and are described in detail below. The intention, however, is not to limit the particular embodiments described. On the contrary, the embodiments are intended to cover all modifications, equivalents, and alternatives falling within the scope of the disclosed embodiments as defined by the appended claims.

DETAILED DESCRIPTION

Various of the disclosed embodiments detail social applications incorporating AR and/or VR functionality. Some of the embodiments may be enabled by recently developed technology, e.g., the high fidelity and more efficient systems and methods presented in U.S. Provisional Patent Application No. 62/080,400 and U.S. Provisional Patent Application No. 62/080,983. Accurate mapping and localization may facilitate commercial and social interactions that would otherwise be unfeasible.

1. Example AR System Overview—Example System Topology

Various of the disclosed embodiments include systems and methods which provide or facilitate an augmented reality, and possibly in some instances virtual reality, experiences. Augmented reality may include any application presenting both virtual and real-world objects in a user's field of view as the user interacts with the real-world. For example, the user may hold a tablet, headpiece, head-mounted-display, or other device capable of capturing an image and presenting it on a screen, or capable of rendering an image in the user's field of view (e.g., projecting images upon a transparency between the user and the real-world environment), projecting an image upon a user's eyes (e.g., upon a contact lens), but more generally, in any situation wherein virtual images may be presented to a user in a real-world context. These virtual objects may exist persistently in space and time in a fashion analogous to real objects. For example, as the user scans a room, the object may reappear in the user's field of view in a position and orientation similar to a real-world object.

FIG. 1 is a conceptual diagram illustrating an overview of environment data capture, model creation, and model application as may be relevant to some embodiments. Initially 100a, a user 110 may scan a capture device 105a (illustrated here as a device similar to that depicted in FIG. 4 and discussed in greater detail herein) about an environment 150. The capture device 105a may include a depth sensor and may additionally include a camera for capturing photographic images (e.g., some suitable devices for various embodiments include a Kinect® sensor, a Senz3D® sensor, ASUS Xtion PRO®, etc.). Generally, a "camera" as referenced herein refers to a device able to capture depth and/or photographic images. As the user 110 moves the capture device 105a, the capture device 105a may acquire a plurality of depth frames 115a, 115b, 115c using the depth sensor. Each depth frame may provide depth values for each point in the capture device's 105a field of view. This raw data may be recorded on the capture device 105a in a data log (including, e.g., depth, RGB, and IMU data) as the user walks through and/or scans the environment 150. The data log may be a file stored on the capture device 105a. The capture device 105a may capture both shape and color information into a form suitable for storage in the log. In some embodiments, the capture device 105a may transmit the captured data directly to a remote system 125 (e.g., a laptop computer, or server, or virtual server in the "cloud", or multiple servers e.g. in the "cloud") across a network 120 (though depicted here as communicating across a network, one will recognize that a portable memory, e.g., a USB memory stick, may also be used). In some embodiments, the data may be transmitted in lieu of local storage on the capture device 105a. Remote system 125 may be at the same location or a different location as user 110. An application running on the capture device 105a or on a remote system 125 in communication with the capture device 105a via a network 120 may integrate 160 the frames in the data log to form a three-dimensional internal model representation 130 (e.g., one or more vertex meshes represented here in a top-down view 100b). This integration, also referred to as "mapping" herein, may be performed on the capture device 105a or on the remote system 125 or on a combination of the two. The capture device 105a may also acquire a photographic image with each depth frame, e.g., to generate textures for the map as described herein.

An augmented reality (AR) device 105b (which may be the same as the capture device 105b) may then use 170 the model 130 in conjunction with incoming depth frame data to present an augmented reality experience 100*c*. For example, a user (perhaps the same user as user 110) may hold the AR device 105*b* in view of the environment 150. As real-time RGB images are captured of the environment 150 and displayed on the AR device 105*b*, the AR system may supplement the images with virtual elements (the real-time images may be converted to a textured mesh in some embodiments as described herein). For example, here a virtual piece of furniture 135 appears behind a real-world sofa. Similarly, a virtual character 140 is presented in the scene as though it were standing in the real-world environment (rotating the device to the right and downward may bring the character fully into view). The AR device 105*b* may have more than one camera (e.g. to provide a stereoscopic experience) and the AR system 105*b* may modify each separate camera image mutatis mutandis (though the capture device 105*a*, e.g., may have had only one camera).

The model 130 may also be used in a standalone capacity, e.g., for creating a virtual world mimicking the real-world environment, or for performing measurements of the real-world environment independent of any augmented reality application. Though depicted here in a home environment, one will recognize that the same systems and methods may be applied in other settings, e.g., an office or industrial environments, inside an animal body, etc.

In order to display virtual objects (such as virtual piece of furniture 135 and virtual character 140) faithfully to the user, some embodiments establish: (a) how the camera(s) on the AR device 105*b* are positioned with respect to the model 130, or object, or some static reference coordinate system (referred to herein as "world coordinates"). Some embodiments also establish (b) the 3D shape of the surroundings to perform various graphics processing applications, e.g., to properly depict occlusions (of virtual objects by real objects, or vice versa), to render shadows properly (e.g., as depicted for virtual piece of furniture 135 in FIG. 1), perform an Artificial Intelligence operation, etc. Problem (a) is also referred to as the camera localization or pose estimation, e.g., determining position and orientation of the camera in 3D space.

Various of the disclosed embodiments employ superior methods for resolving how the camera (eyes) are positioned with respect to the model or some static reference coordinate system ("world coordinates"). These embodiments provide superior accuracy of localization, which mitigate virtual object jitter and misplacement—undesirable artifacts that may destroy the illusion to the user of a virtual object being positioned in real space. Whereas prior art devices often rely exclusively on special markers to avoid these issues, those markers need to be embedded in the environment, and thus, are often cumbersome to use. Such markers may also restrict the scope of AR functions which may be performed.

In contrast to the previous AR solutions, many of the disclosed embodiments provide, e.g.: operation in real time; operation without user intervention; display of virtual objects in a correct location and without jitter; no modification of the environment or other cumbersome preparations; occlusions and shadows on-the-fly; presentation to a user in an easy-to-use package (e.g. smart phone, tablet, or goggles); can be produced at consumer-friendly prices; etc. One will recognize that some embodiments may present only some one or none of these features.

Figure 2:
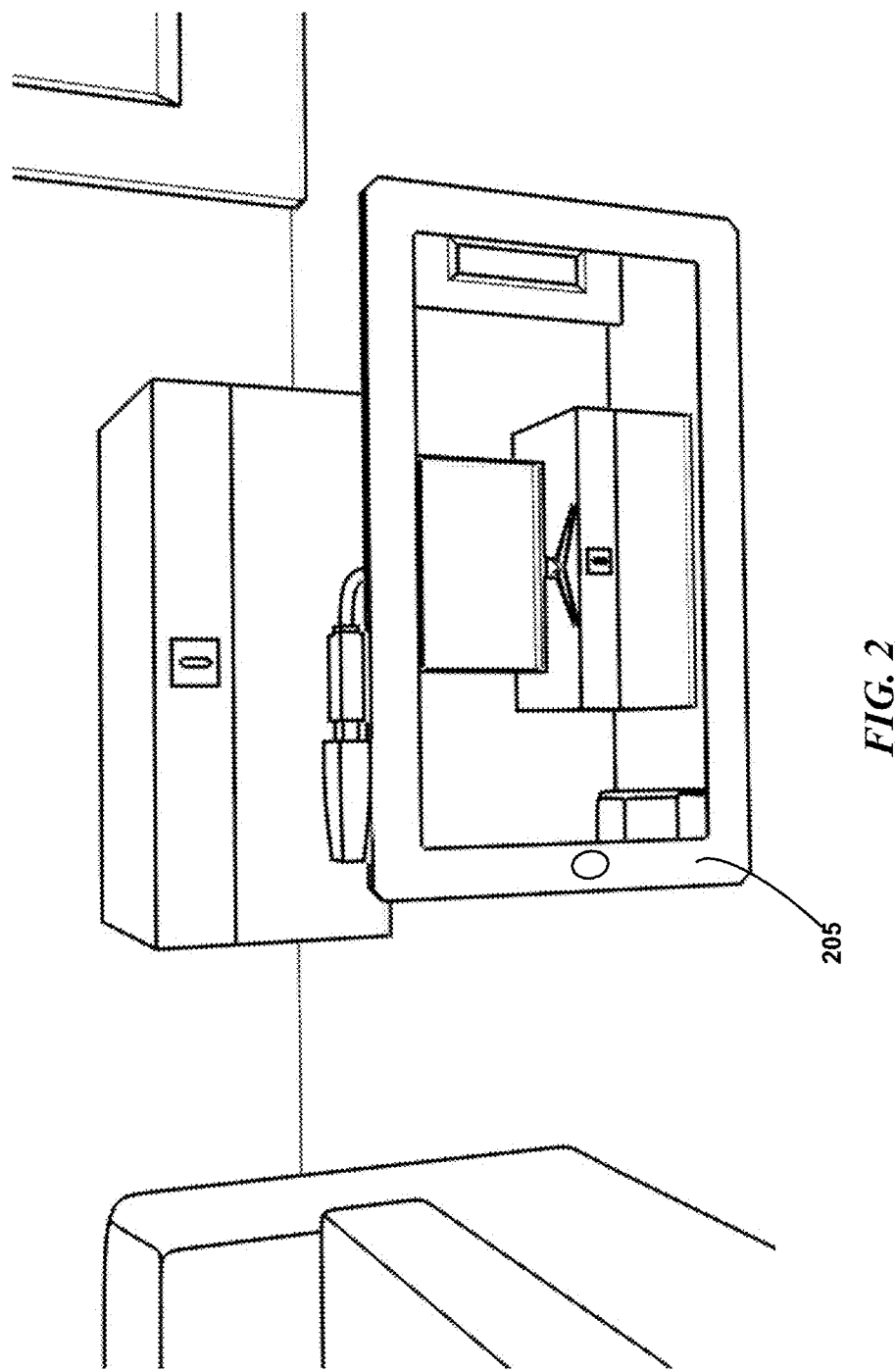
FIG. 2 is an image of an example tablet device implementing a portion of an AR system as may be used in some embodiments.

As an example, FIG. 2 is a recreation of a photograph of an embodiment in operation, wherein a virtual television playing a home video is depicted atop a real-world piece of furniture in an AR device 205. The TV does not actually exist in the real-world, but a user viewing their surroundings with AR device 205, may not be able to distinguish between real and virtual objects around them.

Figure 3:
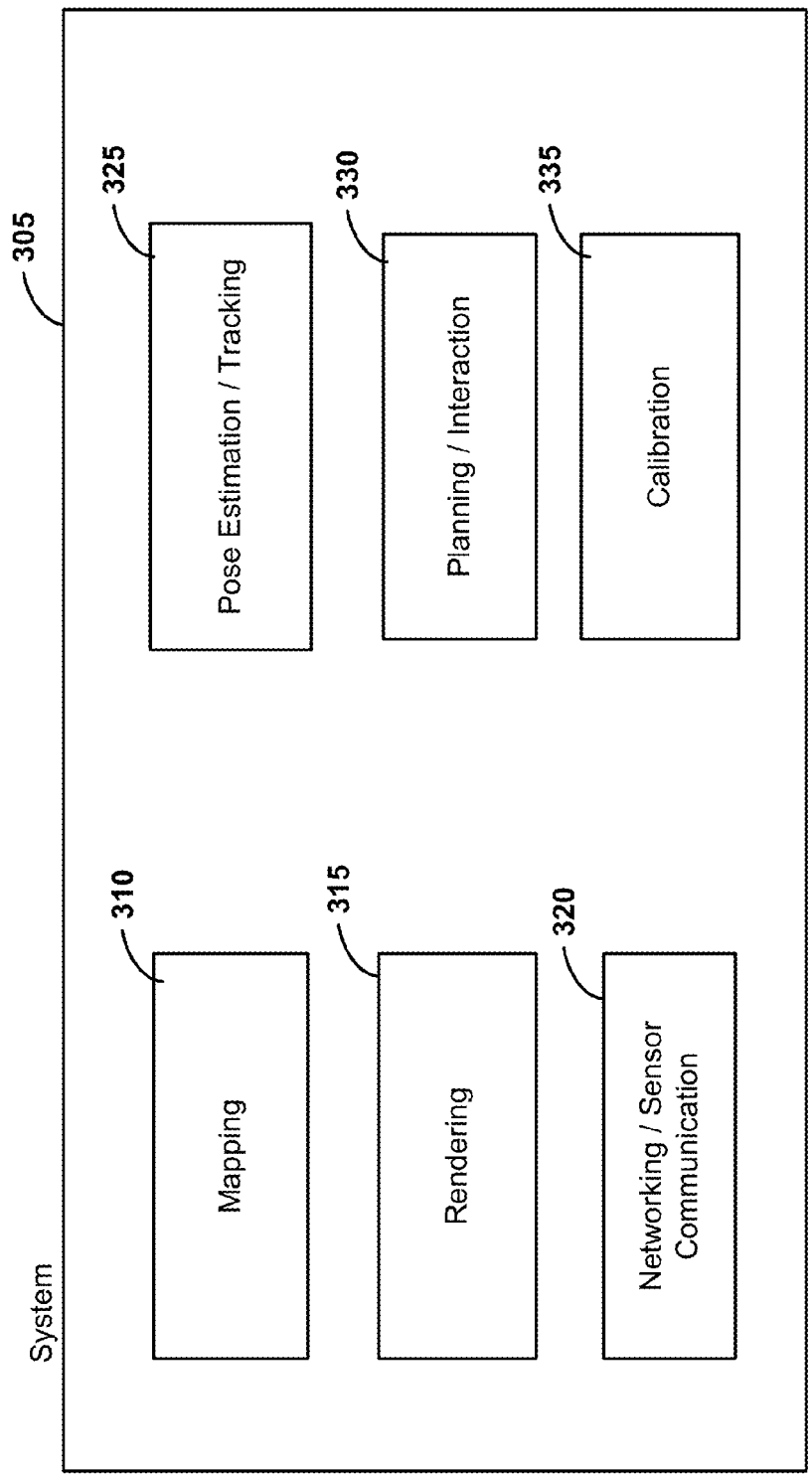
FIG. 3 is a block diagram of various components appearing in a system as may be implemented in some embodiments.

FIG. 3 is a block diagram of various components appearing in a mapping and AR system as may be implemented in some embodiments (though the mapping and AR systems may exist separately in some embodiments). These operational components may consist of the following sub-systems: mapping 310; pose estimation/tracking 325; rendering 315; planning/interaction 330; networking/sensor communication 320; and calibration 335. Though depicted here as components of a single overall system 305, one will recognize that the subcomponents may be separated into separate computer systems (e.g., servers in a "cloud" network), processing functions, and/or devices. For example, one system may comprise a capture device. A second system may receive the depth frames and position information form the capture device and implement a mapping component 310 to generate a model. A third system may then implement the remaining components. One will readily recognize alternative divisions of functionality. Additionally, some embodiments are exclusive to the functions and/or structures associated with one or more modules.

Similarly, though tracking is discussed herein with reference to a user device to facilitate explanation, one will recognize that some embodiments may implement applications using data captured and processed using the disclosed techniques in alternate form factors. As just one example, depth or other sensors may be placed about a user's house and a device for projecting images on a contact lens provided. Data captured using the disclosed techniques may then be used to produce an AR experience for the user by projecting the appropriate image onto the contact lens. Third party devices may capture the depth frames of a user's environment for mapping, while the user's personal device performs the AR functions. Accordingly, though components may be discussed together herein to facilitate understanding, one will understand that the described functionality may appear across different functional divisions and form factors.

2. Example Combined Capture and Augmented Reality Device

Figure 4:
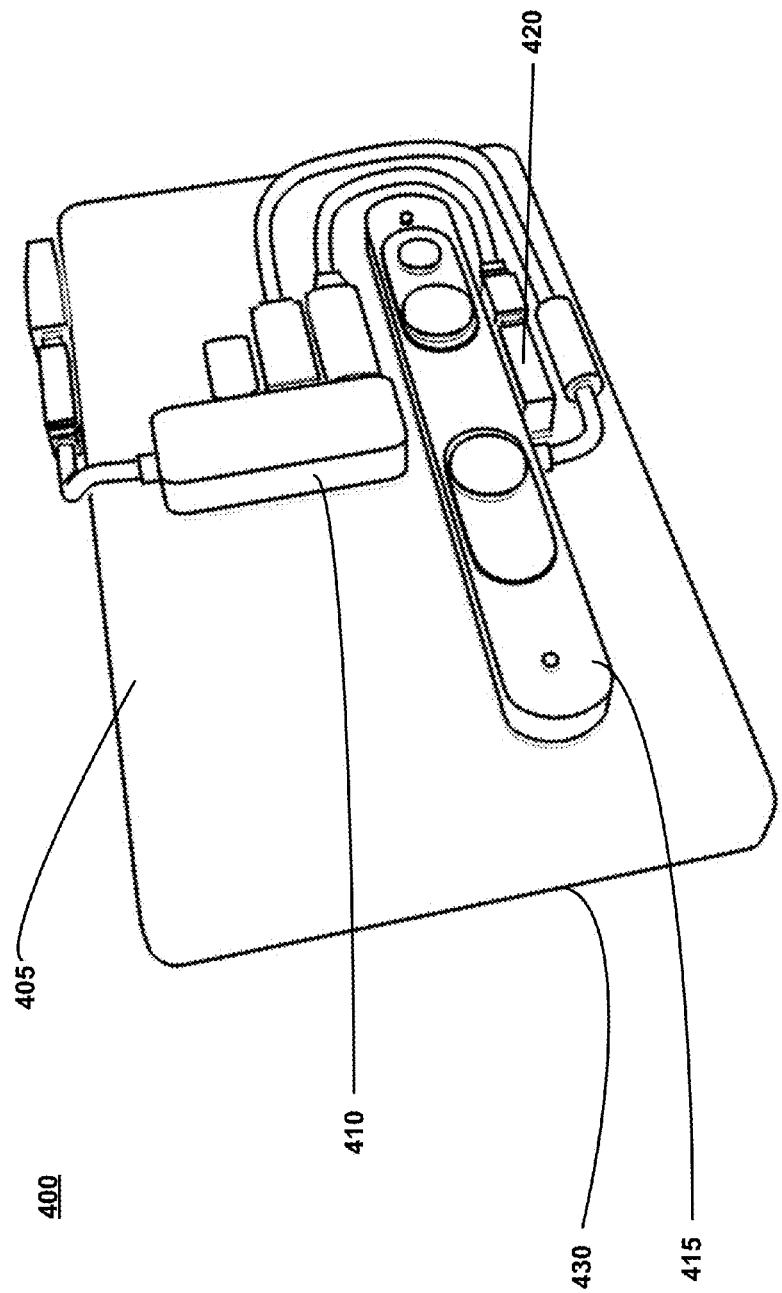
FIG. 4 is a perspective view of example mapping and AR device as may be used in some embodiments.

FIG. 4 is a perspective view of example mapping and application device as may be used in some embodiments. Various embodiments may be implemented using consumer-grade off-the-shelf components. In some embodiments, the AR device consists of a tablet, to which an RGBD camera and optionally an IMU have been attached. As depicted, the example device comprises a tablet personal computer 405, with the panel opposite the display attached to a USB hub 410, RGBD camera 415, and an Inertial Measurement Unit (IMU) 420. Though the IMU 420 and camera 415 are here depicted as separate from the tablet's 405 form factor, one will readily recognize variations wherein the IMU 420, camera 415, and tablet personal computer 405 comprise a single form factor. A touch-screen display 430 (not shown) may be provided on the opposing surface of the tablet. Though shown here separately from the display device, the camera and IMU may be available in embeddable form, and thus could be fitted inside a tablet in some embodiments. Similarly, where a headset display (e.g., a virtual or augmented reality system) is used, the depth-sensor, camera, and/or IMU may be integrated into the headset. Hence, the device can take on multiple forms, e.g., a tablet, a head-mounted system (AR/VR helmet or goggles), a stand-alone device, or a smart phone. Various of the disclosed embodiments, or aspects thereof, may be implemented in software, hardware, and/or firmware (e.g., a system on a chip, an FPGA, etc.).

In one example implementation, a Razer Edge Pro® Tablet may be used as the capture and/or AR device. An example RGBD Sensor used for capture and/or for AR may be an ASUS Xtion PRO LIVE® or a Primesense® camera. An example IMU sensor which may be used is a "VectorNav VN100"®. This example configuration may also include a 4-port USB hub. For computations on a separate device, a Dell Alienware Laptop® (implementing, e.g., a Dual GeForce GTX 880m GPU) may be used.

As mentioned, the mapping and AR device need not be the same device as depicted here. For example, a device without a display may be used to acquire the depth frame data. A head mounted display may be used as a combined mapping and AR device, or as just one or the other.

3. Example Workflow Overview

Figure 5:
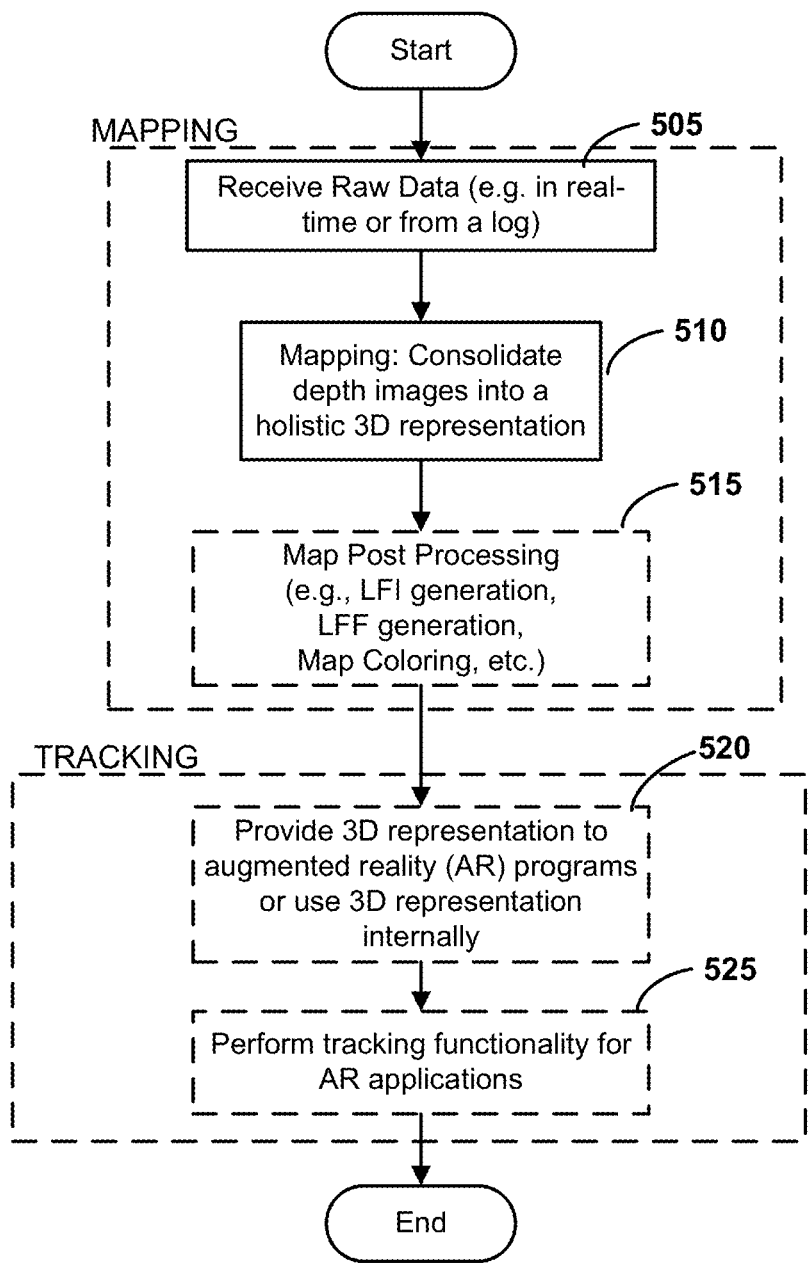
FIG. 5 is a flow diagram generally depicting an overview of various steps in a mapping and tracking process as may be implemented in some embodiments.

Many of the disclosed features are found in the system operations, which may appear as software, firmware, hardware, or a combination of two or more of these (e.g., the implementation could be done on-chip). The general processing and application pipeline may occur as depicted in FIG. 5. At block 505, a mapping system may receive the raw depth frame, image frame, and/or capture device orientation data (e.g., inertial measurement unit data including, e.g., acceleration, gyroscopic, magnetometer data, etc.). This data may be received from a log created by a capture device (previously), or in a real-time delivery from the capture device. The environment may be scanned by a user walking through the environment with the capture device. However, variations where a device moves itself or rotates itself (e.g., where the device is located on a robot or animal) to capture multiple depth frames will also be recognized. The capture device may record location information (accelerometer, and/or gyroscopic, and/or magnetometer, and/or GPS data, encoder data, etc.), a depth frame, and possibly a visual image frame with each capture.

At block 510, mapping generation operations may be performed using the acquired raw data. For example, a mapping system may generate a vertex mesh reflecting the environment based upon depth data. In some embodiments, the resulting maps are represented as polygonal meshes with colored vertices or with textures (though other representations, e.g., voxels, will be readily recognized).

At block 515, the mapping system may also apply any desired post-processing operations, e.g., map coloring. Post processing may also involve the creation of data structures facilitating tracking as discussed in greater detail herein. For example, an LFI and an LFF representation of the map may be created (in some embodiments, only one or both of these representations are created and there is no separate vertex "map").

At block 520, the system may provide the 3D representation, e.g., the 3D vertex mesh and/or LFF and LFI structures, to an AR system. For example, a development toolkit may be provided to the AR developer, allowing them to access the 3D representation.

The AR developer's application may also have access to tracking routines at block 525. These tracking routines may allow the AR program to determine the pose of an AR device in the environment represented by the 3D representation. In some embodiments, the mapping sub-system produces 3D models ("maps") of the environment, which may be used during tracking. The generated maps may be highly detailed and accurate. As the user views the environment through the device, the tracking sub-system may compute the precise camera pose in real time. This pose, the 3D model, and other 3D data (e.g., virtual object models), may then be used by the rendering sub-system to display altered environment to the user in real time. Though tracking and mapping are depicted separately here, one will recognize that during tracking the capture frames may be used to perform mapping functions, e.g., to update or augment an existing map.

A planning and interaction sub-system may also use pose, model, and data to compute interactions between virtual and real-world object, to make decisions for virtual characters (e.g., plan trajectories), and to perform other virtual-real-world interactive functionality.

Example applications include: room organization (identifying and highlighting displaced items, e.g., for security, safety, or child development purposes); shopping (e.g., virtual placement to assess furniture before purchase); interior decorator/redecorator; remodeling (e.g., to virtually assess a change to an environment); video games (Real-Time Strategy, First-Person-Shooter, etc.); education (e.g., learning new languages by encountering words in relation to objects in the environment); etc.

4. Concept Summary for Some Embodiments

Figure 6:
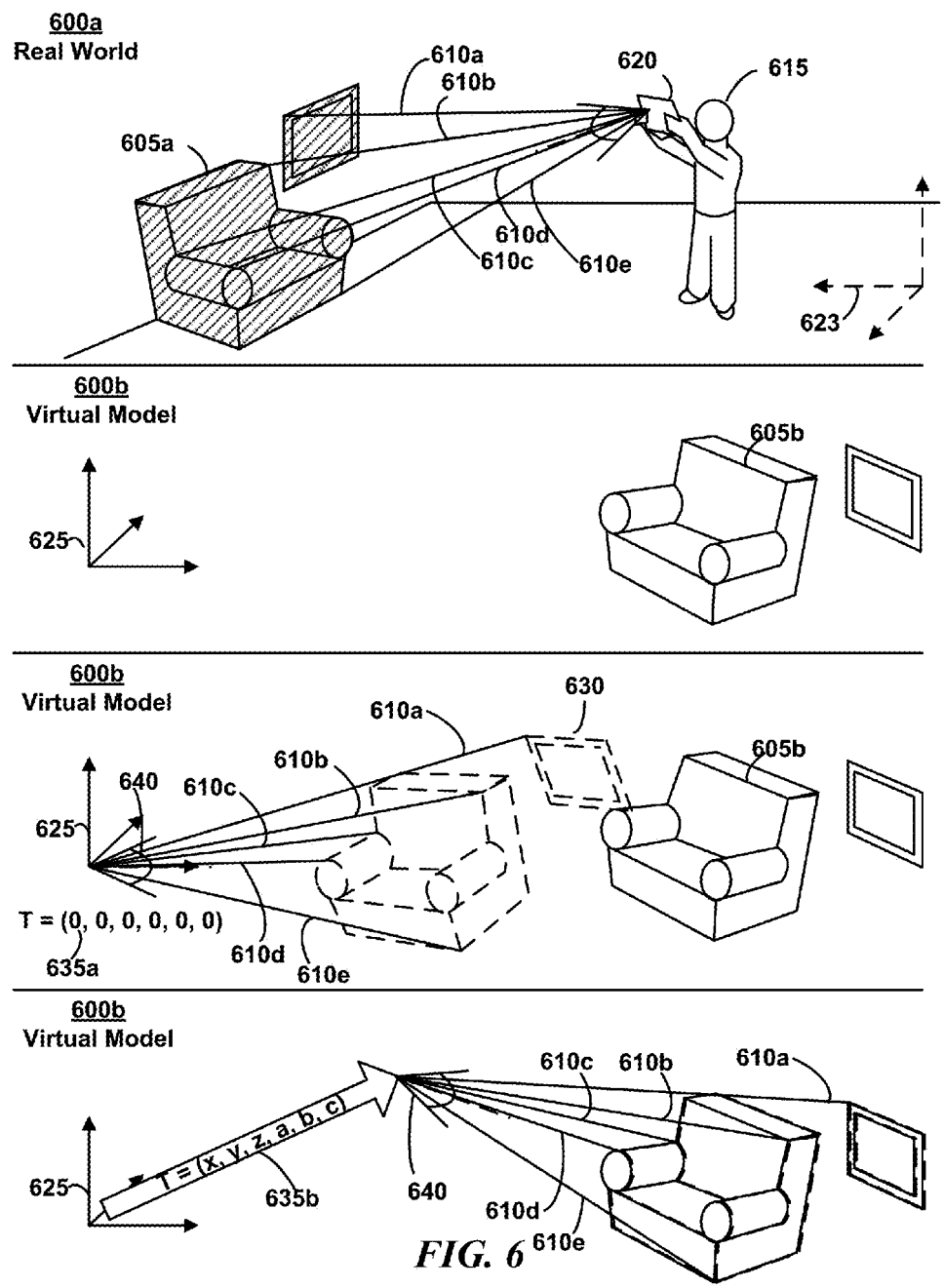
FIG. 6 is a conceptual diagram illustrating a transform representation of a pose as may be used in some embodiments.

To facilitate an understanding of the terminology used in this disclosure, FIG. 6 is a conceptual diagram illustrating a transform representation of a pose as used in some embodiments. Particularly, imagine a situation where a user 615 stood before a chair 605a in the real world 600a, held a capture device 620 above their head, and captured a depth frame having values 610a-e while looking down upon the chair 605a.

The user may have previously created, or be in the process of creating, a virtual model 600b of all, or a portion, of the real-world environment 600a. In this example, the virtual model already includes a virtual representation of the chair 605b (e.g., as a TSDF or vertex mesh) which corresponds to the real world chair 605a. The virtual representation 600b may be stored in a computer. The virtual model has an origin 625 relative to which objects, such as the chair 605b may be oriented. While there is no "central frame of reference" in the physical world to facilitate understanding, one may consider a "real-world" coordinate frame having an origin 623. Some embodiments may make a one-to-one correspondence between real-world coordinate frame 623 and virtual coordinate frame 625. Accordingly, they may each be referred to as a "world coordinate frame" variously herein. Thus, relative to the origin 625 of the virtual environment, the representation of the chair 605b may be located at the indicated position, which would correspond to where the real-world chair 605a is located in relation to the real-world coordinate origin 623 (one will recognize that the particular origin placement in this example is merely to facilitate understanding).

The system may seek to determine the pose of the capture device 620 relative to the world coordinate frame 623 when the depth frame having depth values 610a-e was captured (in some embodiments). This capture device pose may be estimated by fitting or aligning the depth data to the virtual model. To facilitate understanding, assume that the system naively may assume that the depth values 610a-e were generated when the capture device was at the origin 625, in an unrotated position. This may correspond to a naïve transform 635a of the depth values that involves no rotation or translation. As illustrated, this assumption would result in an incorrect alignment 630 of the depth values.

Thus, the system may seek to identify a more appropriate transform 635b of the depth values 610a-e. This improved transform 635b (a translation and/or rotation of the depth frame values 610*a-e*) will better reflect the position and orientation of the capture device 620 relative to the virtual coordinate frame 625, which would serve as an estimate of the transform between the pose of the device 620 and world coordinate frame 623, when the depth frame with values 610*a-e* was captured. As the "transformation" represents the transformation between the pose 640 of the device 620 and the world coordinate frame 623 and virtual model origin 625, the terms "pose" and "transform" are used interchangeably herein.

Thus, though the icon 640 may be used herein to refer to a "pose", one will recognize that the "pose" may also be represented as a transform, e.g., relative to a world coordinate frame, or any other suitable coordinate frame. Camera poses may be represented by rigid transformations in 3D with respect to the world coordinate frame. A starting pose may be referred to as $T_0$ herein and a camera pose at time t by $T_t$.

Figure 7:
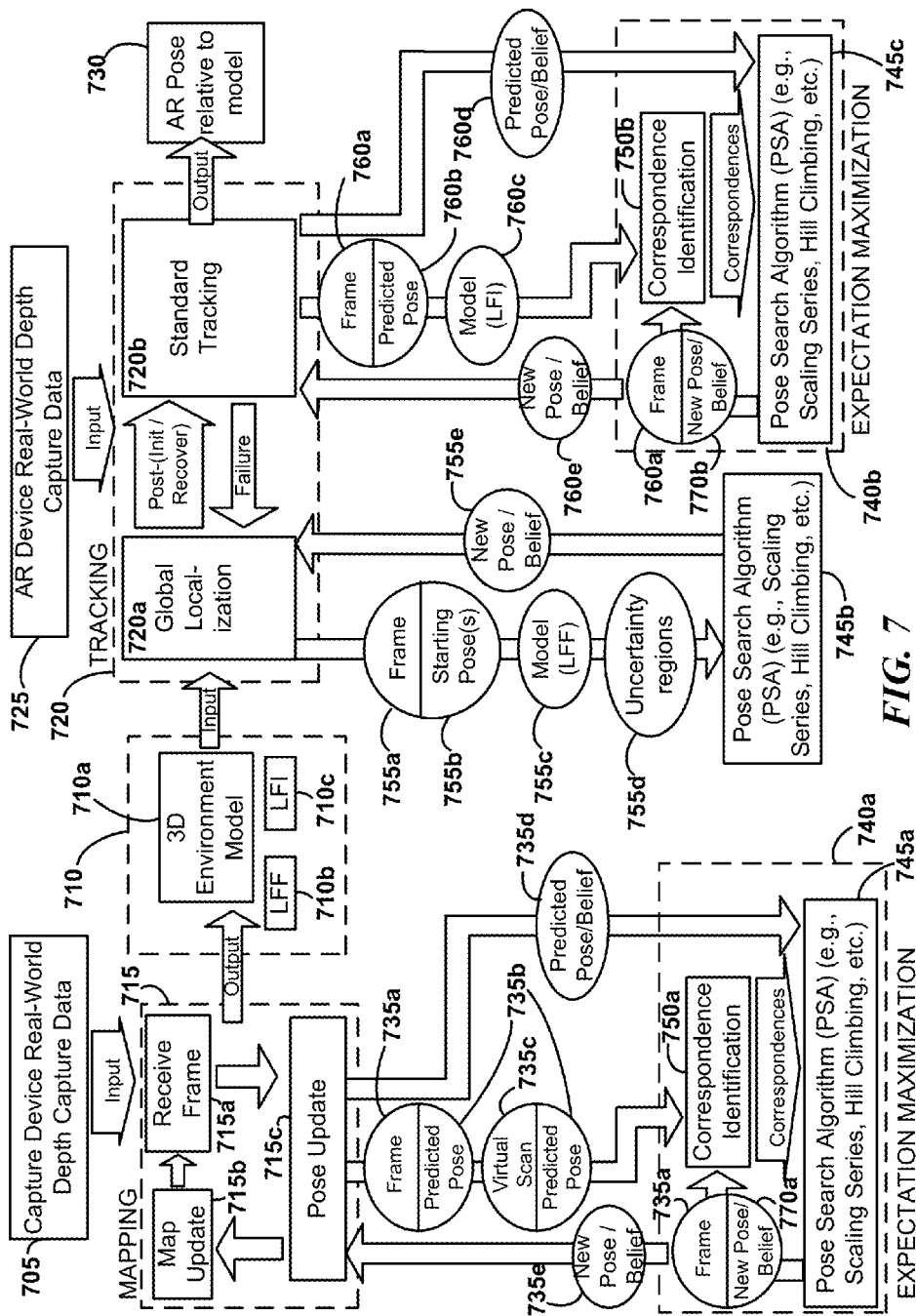
FIG. 7 is a conceptual block diagram of the relations between various concepts relevant to some embodiments.

FIG. 7 is a conceptual block diagram of the relations between various concepts relevant to some embodiments. Generally, at a high level, depth capture data 705 from a capture device may be provided in a log file or in real time to a mapping system 715. The mapping system may generate a plurality of outputs 710, e.g., a 3D model 710*a* (such as a vertex mesh) of the environment, an optimized LFF representation 710*b*, and an optimized LFI representation 710*c* (e.g., as described in greater detail herein, either initially or during post-processing).

These outputs 710 may be used by a tracking system 720. During an AR session, an AR device may provide real-world depth information 725 (e.g., a depth frame taken when the AR device is in some pose in the real world) to the tracking system 720. The tracking system 720 may then determine a pose of the AR device relative to the 3D model 710*a* corresponding to the AR device's real-world pose based upon the depth data 725. The tracking system 720 may provide this pose information as output 730 to the AR application.

Tracking system 720 may include a Global Localization system 720*a* and a Standard Tracking system 720*b* ("Standard" here referring to the frequently repeated character of some operations in some embodiments, rather than any preexisting standard of operation known in the art). The Global Localization system 720*a* may, e.g., be used to determine the AR device's pose relative to the model when the AR device is first used in the environment (e.g., when the first frame is received) or when the AR device is lost (e.g., when the user relocates the device more quickly than expected to a new pose, or if the sensor was covered or too close to an object for the sensor to receive appropriate depth data, or the data is misleading). One will recognize that Global Localization may be used for other purposes as described herein (e.g., for standard tracking operations, in instances where a dynamics model is unavailable, etc.). Following initialization, standard tracking operations may be performed in the Standard Tracking system 720*b*. These standard tracking operations may result in the generation of the AR pose data 730.

The Mapping system 715 may be composed of a Map Update process 715*b* and a Pose Update process 715*c*. The Pose Update process 715*c* and the Map Update process 715*b* may be applied iteratively as frame data 715*a* is considered (e.g., as frame data is pulled from a stored log or as the frames are generated at a capture device). The Map Update process 715*b* may construct a map representation (e.g., a TSDF representation) while the Pose Update process 715*c* determines a proper pose relative to the incomplete map at which to consider the incoming frame data 715*a*. The first Map Update may be performed from a default, or user-specified pose, rather than using the Pose Update determined pose.

Both the Mapping system 715 and the Tracking system 720 each may refer to a Pose Search Algorithm (PSA) 745*a*, 745*b*, 745*c* (Scaling Series is one example of a PSA, but other examples, e.g., Hill Climbing or Optimization Search will be recognized) to identify a new pose (e.g., a transform) 735*e*, 755*e*, 760*e* (also referred to as a "final pose" in various instances herein) which more correctly places the depth frame data with respect to the virtual representation (and, by correspondence, the correct position in the real-world coordinate frame). For example, the "predicted pose" 735*b*, 760*b* may be the system's initial, approximate pose (e.g., the most likely pose for the predicted belief as discussed in greater detail herein) for the frame data in the virtual environment. The PSA 745*a*, 745*b*, 745*c* may determine a more appropriate rotation and translation based on this estimate. Though depicted separately here, in some embodiments two or more of PSAs 745*a*, 745*b*, 745*c* may be the same PSA (and may be implemented using the same hardware/firmware/software). In some embodiments, the belief of the pose 735*d* and 735*e* may be a probability distribution, referred to herein as a "belief" (e.g., a distribution of probabilities across a corpus of candidate pose transforms). In some embodiments (e.g., where the PSA is a hill climber), the belief 735*d* and 735*e* may instead be represented by a single transform. This single transform may be the pose used to create the virtual scan 735*c* and the predicted pose for the frame 735*a* (for use by, e.g., correspondences). Where a probability distribution is used, e.g., the most likely candidate transform may be used as the pose to create the virtual scan 735*c* (e.g., if the belief is represented by a Gaussian probability distribution, the most likely pose would be the mean). As discussed herein, the belief may be represented by a particle system. When using a belief represented, e.g., by particles, samples, grids, or cells, it may be possible to select a single transform in many ways. For example, one could take the highest weighted particle (if weights are available), take the mean of some or all particles, use a Kernel Density Estimation to determine most likely pose, etc. Where poses are used directly, rather than derived from a belief, in some embodiments, the poses may be accompanied by "search regions" directing the PSA where and/or how to limit its search.

Similarly, the belief 760*d* used in Standard Tracking may also be represented by a single transform or distribution, and this transform, or the most likely candidate of the distribution, may also be used as the predicted pose 760*b*. In some embodiments (e.g., as discussed in greater detail herein below), the belief 735*d* and 735*e* may be represented as a collection of regions of possible poses and their likelihoods as derived, e.g., from a dynamics model (using IMU data, timestamps, etc.), or as determined by PSA.

The Pose Update process 715*c* and the Standard Tracking process 720*b* may apply the PSA 745*a*, 745*c* as part of an Expectation Maximization (EM) process 740*a*, 740*b*. The EM processes 740*a*, 740*b* may iteratively refine an intermediate belief and/or pose determination 770*a*, 770*b* (derived initially from the belief and/or predicted pose 735*b*, 735*d*, 760*b*, 760*d*-again the pose 735*b* is the same as, or derived from pose/belief 735*d* and pose 760*b* is the same as, or derived from pose/belief 760*d*) to determine a refined, final pose/belief to be returned 735*e*, 760*e*. The "expectation" refers to the correspondence identification process 750*a*, 750*b* which may determine correspondences between the frame data and the model data (either virtual scan 735c or the model 760c) using the most recent pose determination 770a, 770b. The "maximization" may refer to the application of the PSA 745a, 745c to identify a more refined belief and a more appropriate pose 770a, 770b with which to perform the correspondence. Hence, one "maximizes" (e.g., improves) the alignment of the depth data to the model given "expected" pose correspondences. Again, though they are depicted separately here the EM processes 740a, 740b may be the same, or implemented on the same device, in some embodiments.

In contrast to the EM systems, the Global Localization process 720a may refer directly to a PSA 745b without seeking an iteratively determined optimal fit or fixing the correspondences prior to running the PSA. This may be because Global Localization process 720a seeks to find the pose when considering large portions of the model-attempting to find a correspondence between the frame data and the model as a whole may not be useful. An LFF data structure may already reflect relations between "corresponding" points.

With regard to the Pose Update process 715c, the Pose Update process 715c may generate a depth frame representation of the incomplete map construction called, herein, a virtual scan 735c. The virtual scan 735c may be generated from the perspective of a predicted pose 735b. Initially, the current frame depth data 735a may also be assumed to be taken at the predicted pose 735b (e.g., as the system in FIG. 6 naively assumed the data was taken at the origin, though the predicted pose 735b may be a much better estimate in many embodiments). The virtual scan 735c, predicted pose 735b, and frame depth data 735a may be provided to the correspondence identification process 750a. The frame depth data 735a may be subsampled in some embodiments.

In some embodiments, any points/pixels contained in a "border" area (around the edge of the captured depth image, where the edge could be of some pixel width, e.g., constant, or some distance after skipping any part of the edge where there are no pixels containing depth data, etc.) may be filtered out, or removed from consideration, and hence not considered by the correspondence identification 750a process. This would reduce the amount of previously unseen "new data" appearing in a depth frame relative to a previously acquired and processed depth frames. Note that border filtering may be applied to the frame depth data during Correspondence Identification 750a during Pose Update 715c process, but need not be applied during Map Update 715b, or Standard Tracking Correspondence Identification 750b in some embodiments.

The process 750a may determine which depth values in the virtual scan 735c correspond to the depth values in the frame data 735a (as depth "values" correspond to "points" in space in accordance with their pixel position, the terms depth values and depth points may be used interchangeably herein). Given these correspondences, the PSA 745a may seek a pose (and refined belief in some embodiments) 735e for the frame data 735a that brings the corresponding points closer together.

The PSA 745a may use the predicted belief/pose to constrain its search. The determined pose 770a may then be used in the next correspondence determination to better identify corresponding depth points in the virtual scan 735c and in the frame data 735a. This process 740a may continue until a best resulting belief and determined pose 735e is generated. Note that the virtual scan 735c remains as a representation at the predicted pose 735b in each iteration, but the frame data 735a is reconsidered at the new most likely pose 770a during each EM iteration.

With regard to the Standard Tracking process 720b, some embodiments may generate a virtual scan 735c, and for some embodiments the Standard Tracking process 720b may, instead of generating a virtual scan, or in addition to creating a virtual scan, have access to a model of the environment, e.g., in an LFI representation 760c. A recently captured frame 760a, a predicted pose 760b, and the LFI representation 760c may be provided to the correspondence identification process 750b to identify points in the model 760c corresponding to the frame depth values 760a. The frame 760a may be subsampled in some embodiments. Given these correspondences, the PSA 745c may seek a pose (and in some embodiments, a refined belief) for the frame data 760a that brings the corresponding points closer together. Again, the PSA may make this determination with reference to the predicted pose/belief 760d. The determined pose 770b may then be used in the next correspondence determination to better identify depth values in the LFI representation 760c corresponding to the depth values in the frame data 760a. This process 740b may continue until a best determined pose/belief 760e is generated. Like the virtual scan, the LFI representation 760c does not change with each iteration.

With regard to the Global Localization process 720a, the Global Localization process 720a seeks to determine the AR device's pose relative to the entire model. As the model may be large, a low fidelity determination may be made by the Global Localization process 720a (and a subsequent high fidelity determination made later by the Standard Tracking process 720b). In some embodiments, the frame data may be subsampled for each of the Pose Update, Global Localization, and Standard Tracking operations, though the frame data may be subsampled to a greater degree for Global Localization as compared to Pose Update and Standard Tracking.

Global Localization process 720a may provide a frame 755a to the PSA 745b. When the AR device initializes, frame 755a may be the first frame captured. When the device is lost, or unsure of its pose, frame 755a may be the last viable frame that was captured. The frame 755a may be subsampled to speed the search process. The frame 755a may be associated with one or more "starting poses" 755b and uncertainty regions 755d. In some embodiments, the starting search poses 755b may have been determined when the model was generated (e.g., the Mapping system 715 may have identified rooms and placed a starting pose at the center of each room). The starting poses 755b may be considered sequentially or in parallel as discussed in greater detail herein by one or more PSA 745b instances. An LFF representation 755c of the model may also be provided to PSA 745b. A single uncertainty region 755d covering the entire model may be used in some embodiments, or multiple uncertainty regions 755d large enough such that the union of the starting poses with their corresponding uncertainty regions 755d will cover the entire model. The PSA 745b may identify a belief and a most likely pose 755e that relocates the frame data 755a to a position better matching the LFF model 755c data. Where multiple PSA instances are applied, e.g., in parallel (e.g., one instance for each starting pose), the Global Localization process 720a may select the best of the resulting poses 755e and, in some embodiments, the corresponding belief, or in other embodiments the combined belief.

One will recognize variations to the figure for various embodiments. For example, some embodiments do not apply Expectation Maximization for the Pose Update and Standard Tracking. In these instances, each of the Pose Update, Standard Tracking, and Global Localization may reference a PSA directly.

Figure 8:
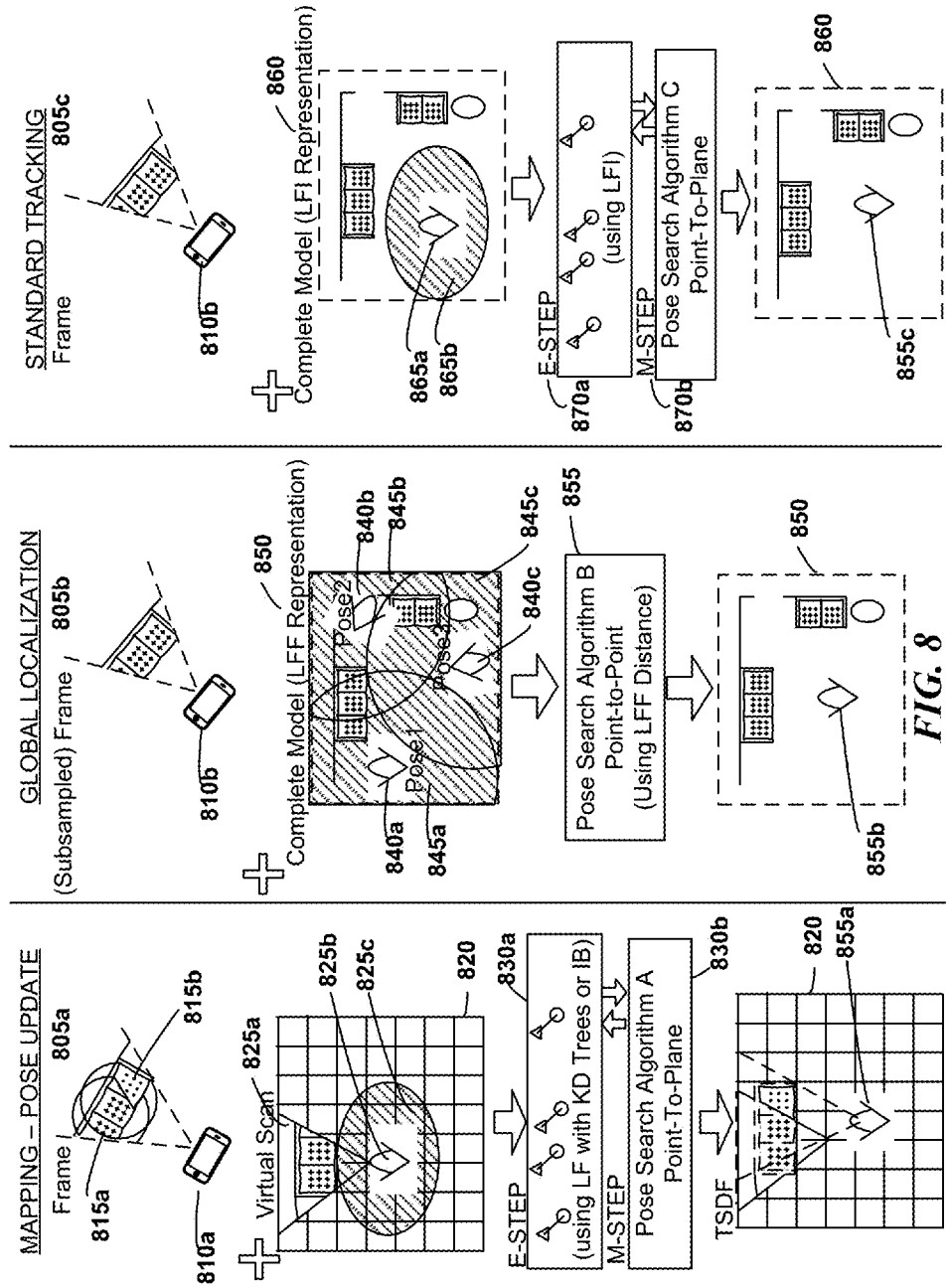
FIG. 8 is a series of inputs, configurations, and outputs as may be applied to a Pose Search Algorithm (PSA) for Mapping, Standard Tracking, and Global Localization, as may occur in some embodiments.

To facilitate a visual understanding of the Pose Update, Global Localization, and Standard Tracking's use of their respective PSAs, FIG. 8 reflects a series of inputs, outputs, and configurations as may be applied in some embodiments. With respect to the Pose Update in the Mapping process, a frame 805a of depth values in the field of view of a capture device 810a may be provided to an EM process comprising an E-step 830a (correspondence determination) and an M-Step 830b (application of the PSA to find an improved belief and its most likely pose). The frame 805a may include depth values 815a corresponding to previous captures which are now represented in an intermediate representation 820 (e.g., a TSDF structure), as well as new depth values 815b which are not yet represented in intermediate representation 820. In addition, a virtual scan 825a construction of the incomplete model 820 using a predicted pose 825b (which, e.g., could be the highest probability pose in the predicted belief 825c) may be provided to the EM process. In some embodiments, a predicted belief 825c may also be provided to the EM process, for example, to the PSA applied in the M-Step. The PSA 830b may apply a Point-to-Plane metric to determine an updated belief and a most likely pose/transform. The correspondences may be implemented, e.g., using LF with KD-trees, or with IB. The EM process may then identify a final pose 855a relative to the incomplete model 820. The new data points in the data frame may then be used to supplement the incomplete model 820.

Global Localization may also provide a frame 805b from an AR device 810b (though the frame may be subsampled relative to frames 805a and 805c). The Global Localization system may also provide a plurality of starting poses 840a, 840b, 840c and corresponding uncertainty regions 845a, 845b, 845c which may together cover the entirety of the map model. The model 850 may be provided as an LFF representation which may be used in a Point-to-Point metric by the PSA 855 as described in greater detail herein. The PSA may then compute the resulting belief and use the most likely pose as a final pose 855b relative to the model 850.

With regard to Standard Tracking, Standard Tracking may also provide a frame 805c from an AR device 810b (e.g., a same device as was used for all or part of Global Localization) to an EM process comprising an E-step 870a (correspondence determination) and an M-Step 870b (application of the PSA to find an improved belief and pose). The Standard Tracking system may also provide a predicted belief 865b and its most likely pose as the predicted pose 865a to the EM process. The model may be provided as an LFI representation 860 to the EM-process. The EM-process may then identify a final belief and its most likely pose 855c relative to the model 860.

5. Mapping

Figure 9:
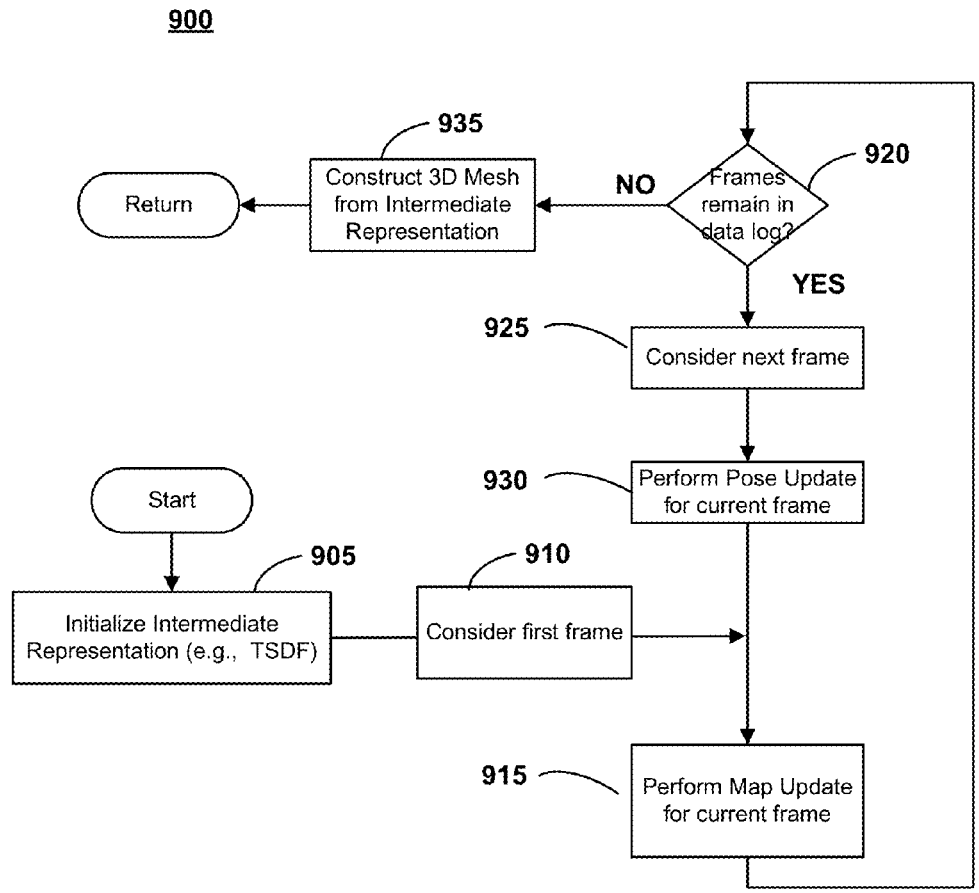
FIG. 9 is a flow diagram generally depicting various steps in a Mapping process to create a model of an environment (e.g., a Truncated Signed Distance Function (TSDF)-based representation) as may be implemented in some embodiments.

The Mapping system produces 3D models (maps) of the environment. The maps may be very accurate to facilitate subsequent operation. FIG. 9 is a flow diagram generally depicting an overview of various steps in a map creation process, e.g., as may occur at block 510 of FIG. 5. In some embodiments, the mapping system uses a Bayesian filter algorithm, e.g., a simultaneous mapping and tracking (SLAM) algorithm, which builds a map based on the camera's pose with respect to the environment. The SLAM method may perform estimation iteratively over the incoming depth frames. Each iteration may consist of a camera Pose Update (e.g., as depicted at block 930) and a Map Update (e.g., as depicted at block 915), though the first frame 910 may be directly applied to the Map Update in the first instance as indicated.

In some embodiments, the mapping system may use an "intermediate" representation when generating the map and may convert this intermediate representation to a final form when finished. For example, in FIG. 9 the first frame 910 may be, e.g., the first frame in a data log or a first frame as it is acquired real-time from a capture device. The intermediate representation may be, e.g., a truncated signed distance function (TSDF) data structure (though one will readily recognize other suitable data structures). However, for purposes of explanation, most of the examples described herein will be with respect to TSDF.

At block 915, the system may perform a Map Update and update the internal representation, e.g., a TSDF representation, with a frame's data. Initially, all the lattice points in the TSDF (also referred to as "cells" or "cell corners" in some instances) may be initialized to a default value at block 905. Applying the Map Update process may adjust some of the TSDF lattice points to reflect a frame's depth data. In some embodiments, to assist with the first frame positioning, the IMU down vector (as measured, e.g., by accelerometers in the captured device) may be aligned with the Z axis. The floor plane may then be extracted. The normal of the floor plane may then be aligned with the Z axis. Rotation around the Z axis as well as 3D translation can be adjusted manually if needed in some embodiments.

While frames remain to be considered at block 920, the system may consider the next frame at block 925. The system may then perform a Pose Update at block 930. For example, during the initial Map Update at block 915 the system may rely upon an arbitrary pose for applying the depth frame data to update the TSDF. During subsequent iterations, however, the incoming depth data should be aligned properly relative to the previous TSDF updates. Accordingly, the Pose Update 930 can improve a camera pose estimate for this frame. The TSDF may then be updated at the Map Update 915.

Once all, or a sufficient number (e.g., to complete a model), of frames have been considered at block 920, at block 935 the system may build a 3D mesh out of the TSDF representation, or construct other representations, such as an LFF and/or LFI as discussed in greater detail herein.

6. Pose Estimation—Pose Tracking

Figure 10:
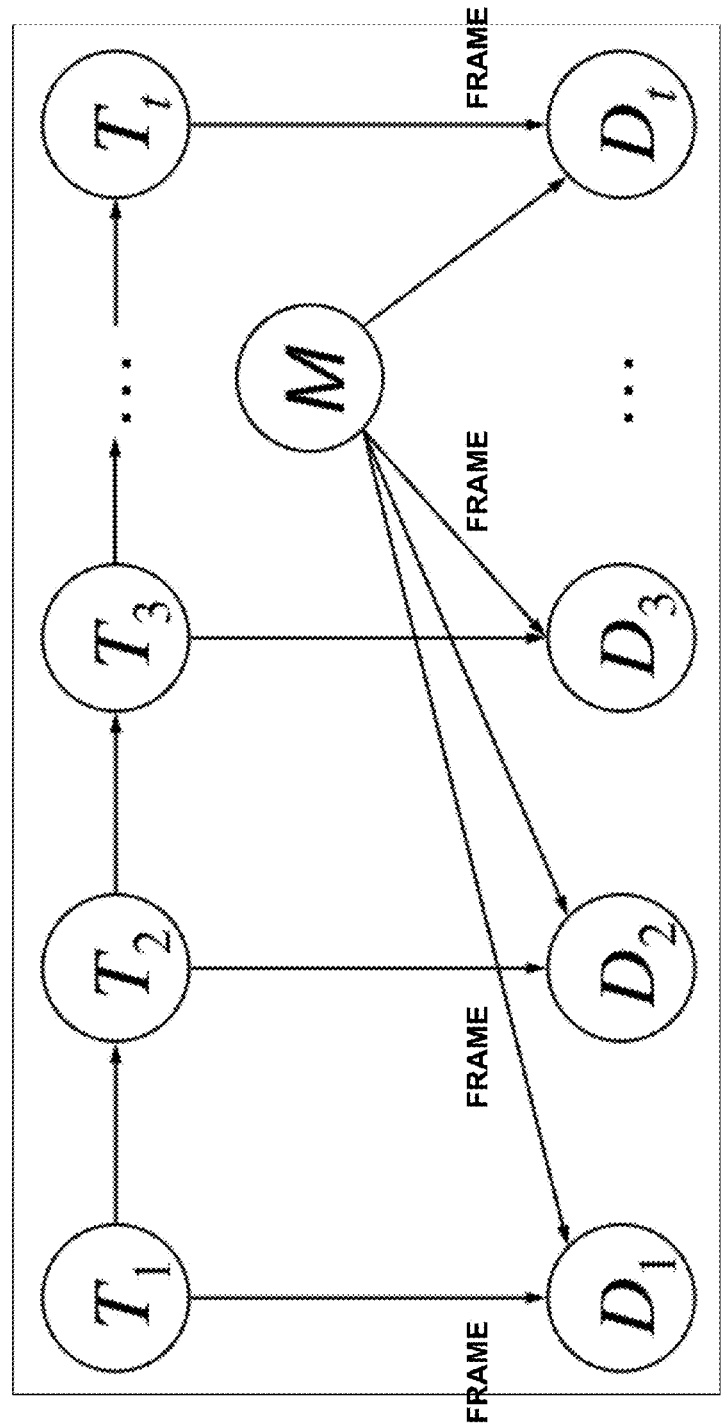
FIG. 10 is a block diagram of a dynamic Bayesian network as may be used in accordance with some embodiments.

In some embodiments, pose tracking can be modeled as a Bayesian process in which the camera pose $T_t$ changes over time due to camera motion. FIG. 10 is a block diagram of a dynamic Bayesian network as may be used in accordance with some embodiments. At each time step t the pose estimation system may obtain a new sensor measurement $D_t$ from the RGBD camera (or any other suitable sensor as discussed herein), e.g., a frame of depth data. Here M represents the environment and $T_1$, $T_2$, etc. the camera poses in the environment at the time when the depth data $D_1$, $D_2$, etc. were taken. $T_1$, $T_2$, etc. are unknown (e.g., unobserved), whereas $D_1$, $D_2$, etc. are known (e.g., observed). During Standard Tracking, M may be considered known (e.g., represented by the previously built model of the environment). During mapping, the map M may be an unknown alongside $T_1$, $T_2$, etc., but unlike the camera pose, the map does not change over time. The system may seek to estimate poses $T_1$, $T_2$, etc., (and possibly estimate M) based on the depth data $D_1$, $D_2$, etc. Due to sensor noise and modeling imprecision, the system may not be able to determine the camera pose with absolute certainty. Instead, the uncertain knowledge of the camera's pose may be described by a probability distribution called the Bayesian "belief" at a given time, $bel_t$.

$$bel_t = p(T_t | D_1, \ldots, D_t) \quad (1)$$

Figure 11:
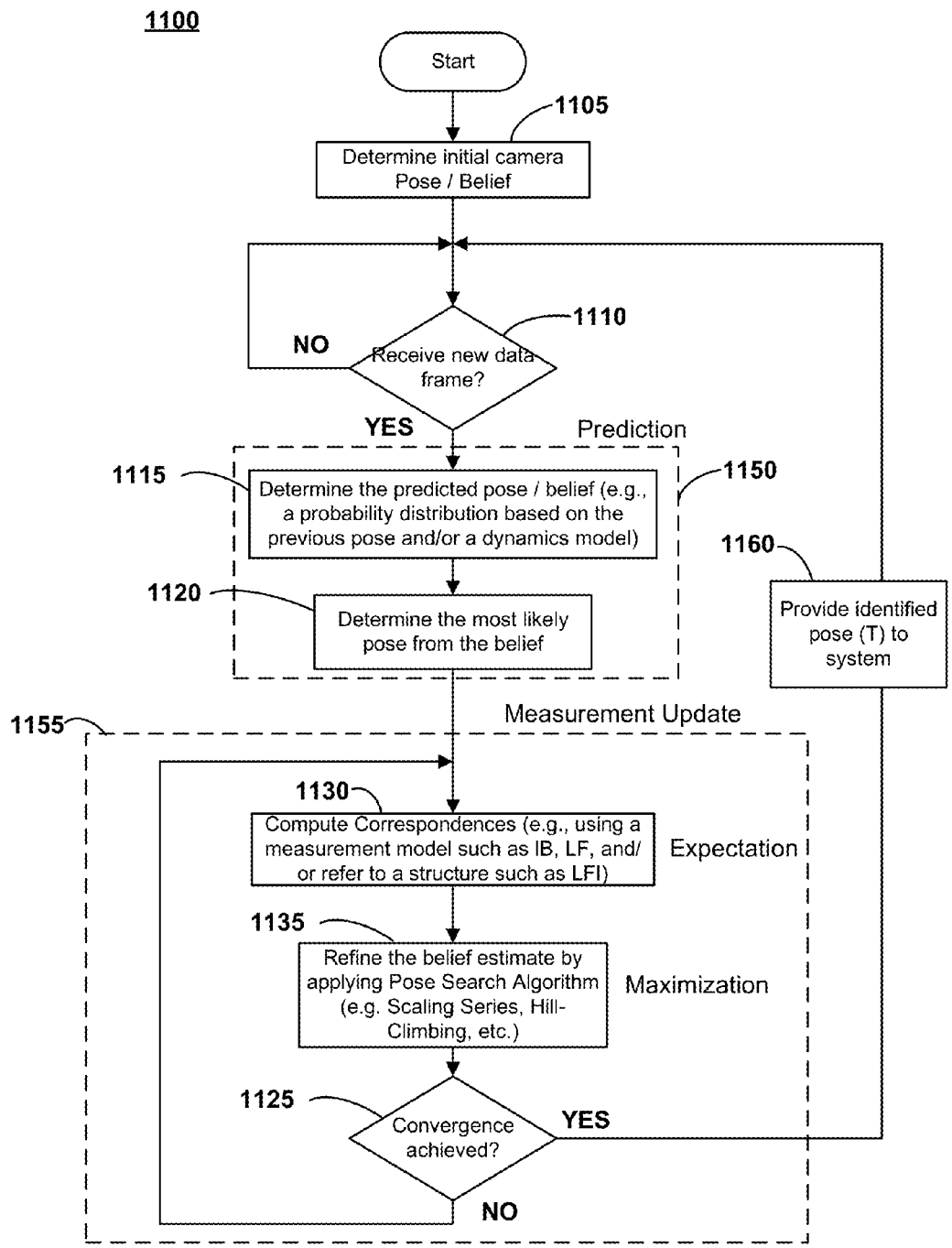
FIG. 11 is a flow diagram generally depicting a summary of an Estimation Maximization algorithm (e.g., for tracking) as may be implemented in some embodiments.
Figure 12:
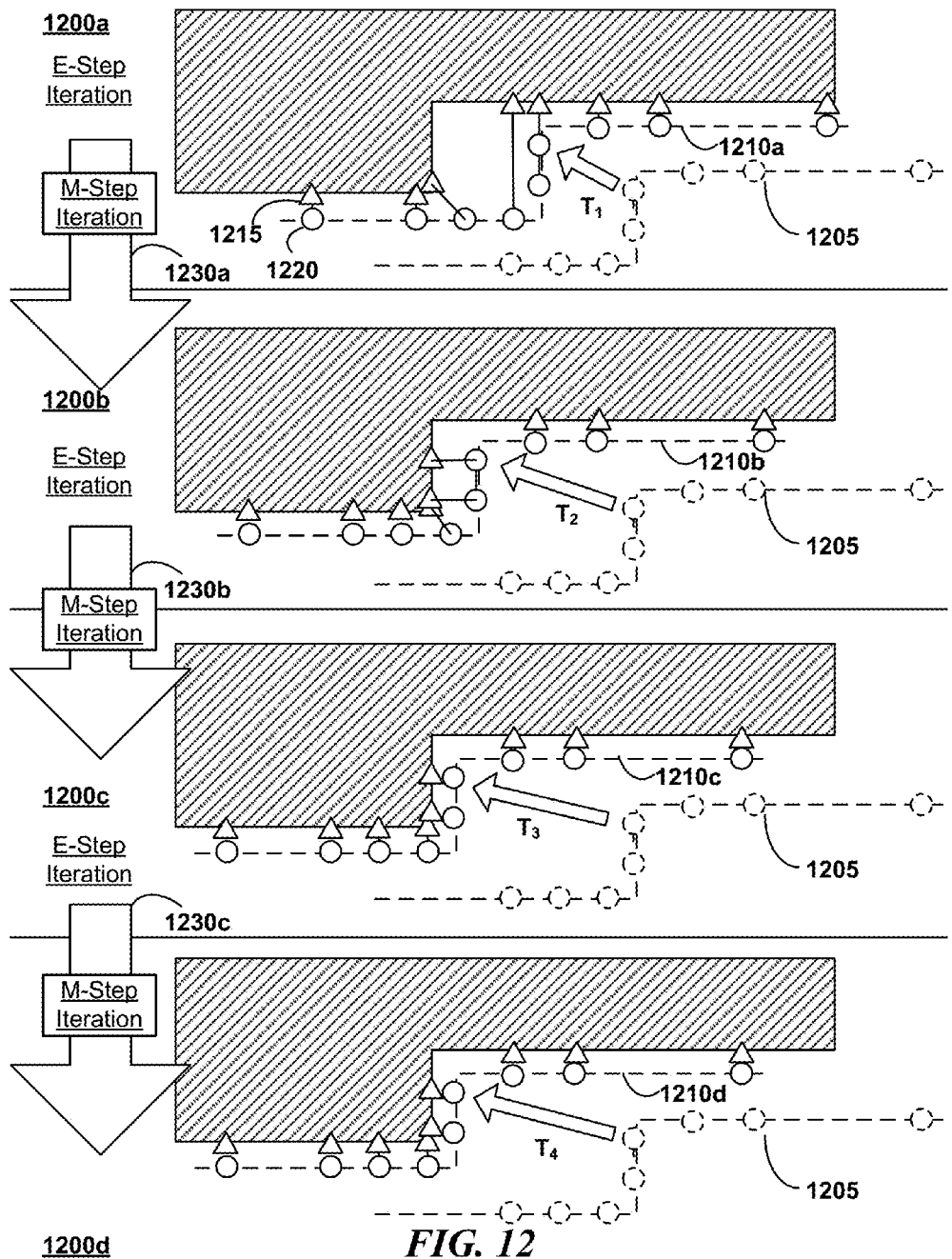
FIG. 12 is a graphical depiction of an example iterative convergence procedure during Estimation Maximization as may be applied in some embodiments.

This probabilistic approach may have the advantage of computing the optimal solution given all the available data, while also properly taking into account sensor noise and modeling uncertainties. The belief may be estimated recursively using the Bayesian recursion formula $$bel_t = \eta p(D_t | T_t) \int p(T_t | T_{t-1}) bel_{t-1} dT_{t-1} \quad (2)$$

where n is a normalization constant and $bel_{t-1}$ is the belief at the prior time step t−1. From here on, the term η is used to denote the normalization constant. Its value will be different between different equations, but such that the right-hand side of that particular equation integrates to one. The first probability term $p(D_t|T_t)$ is referred to herein as the measurement model, a probabilistic statement that describes how the sensor measurements are taken. The second probability term $p(T_t|T_{t-1})$ is the dynamics model, a probabilistic statement that describes how the camera can move (which may, e.g., consider how fast a human being could move a device, past poses, IMU data, etc.). The Bayesian filter estimates the belief by iterating Prediction and Measurement for each time step t. FIG. 11 a flow diagram generally depicting a summary of an Estimation Maximization algorithm (e.g., for tracking) as may be implemented in some embodiments. For example, FIG. 11 may reflect the combined operations of the Pose Update process 715c and EM process 740a or the combined operations of the Standard Tracking process 720b and EM process 740b. FIG. 12 is a graphical depiction of an example iterative convergence procedure during Estimation Maximization as may be applied in some embodiments. FIG. 13 is a pseudocode listing reflecting one possible tracking algorithm as may be implemented in some embodiments.

Initially, the system may receive a first camera pose and/or belief at block 1105. This may be an arbitrary, default assumption. In some embodiments, if Standard Tracking is just starting, then it may receive this initial pose and/or belief as the pose and/or belief generated by Global Localization. As new data frames are received at block 1110 the system may update the pose and/or belief estimates.

In Prediction, generally corresponding to blocks of group 1150 in FIG. 11, the system may determine the predicted belief based on, e.g., a frame timestamp, IMU data, (block 1115) and determine the most likely pose (block 1120). Prediction may be part of Pose Update process 715c or Standard Tracking process 720b. For example, the system may use a dynamics model, and compute the integral term from EQN. 2, also referred to as the Bayesian prediction $$\overline{bel}_t = \eta \int p(T_t | T_{t-1}) bel_{t-1} dT_{t-1} \quad (3)$$

This term may reflect the prediction of the camera pose given all the prior measurements, except the very last one. In other words, $$\overline{bel}_t = p(T_t | D_1, D_2, \ldots, D_{t-1}) \quad (4)$$

These steps may generally correspond to the example of lines 3-4 in FIG. 13. $MP(\overline{bel}_t)$ denotes the maximum-a-posteriori of $bel_t$, e.g., the most likely pose of the camera based on the prediction belief $\overline{bel}_t$.

At the Measurement Update, generally corresponding the blocks of group 1155, if convergence has not yet been achieved (block 1125), the system may determine the correspondences (block 1130) and refine the belief estimate (block 1135) (e.g., determine an improved transform for the pose). These steps may generally correspond to lines 7-12 in FIG. 13. The Measurement Update 1155 may generally correspond to EM process 740a or EM process 740b. The system may compute the resulting belief $bel_t$ for the time step by incorporating the latest measurement $D_t$ using the measurement model $p(D_t|T_t)$. Once convergence has been achieved (e.g., a comparison of the MAR difference between successive transforms is below a threshold, some number of iterations have been performed, etc.) the Measurement Update process may provide the most recent belief and pose 1160 to the requesting system (e.g., the Pose Update process or the Standard Tracking process).

An example of convergence is graphically presented in the block diagram of FIG. 12. The depth values associated with a frame relative to an untranslated, unrotated pose at the origin may result in the depth value positioning at location 1205. A Prediction step 1150 may generate a belief with a most likely transform/pose $T_1$ relocating the depth values to the position 1210a. Correspondences may then be determined in the E-Step 1200a using, e.g., LF with KD-Trees, IB, or LFI models. For example, the depth value 1220 may be determined to correspond with a point 1215 on the surface of an object. The system may provide these correspondences, e.g., to a PSA in the next M-step iteration 1230a.

The M-Step 1230a may produce a new belief with a most likely transform/pose $T_2$ which relocates the depth values to the position 1210b, which may be used by the second EM iteration to generate a second set of correspondences in the E-step 1200b. Similar iterations may continue: M-Step 1230b producing a new belief with a most likely transform/pose $T_3$ which could then be used to identify correspondences for data at the position 1210c; M-Step 1230c producing a new belief with a most likely transform/pose $T_4$ which could then be used to identify correspondences for data at the position 1210d; etc. As indicated, however, as the transform relocates the depth data closer and closer to the "correct" position, the successive transforms may change very little. For example, the difference between $T_4$ and $T_3$ is much less than between $T_4$ and $T_1$. The difference between transforms may be assessed with a metric, e.g., MARs (with an appropriate R selected), and when the difference is beneath a threshold "convergence" may be said to be achieved. The most recent belief and its most likely transform/pose (e.g., $T_4$) may then be returned.

At line 9 of FIG. 13, the LFI data structure may allow for fast correspondence matching and may be used in some embodiments. Without LFI (e.g., during mapping), computing correspondences for the entire model may be very costly. In these cases, some embodiments resort to alignment of the new data to a Virtual Scan of the model, which is generated from the predicted most likely camera pose $T_t^-$ as generated by line 4 of FIG. 13. For the tracker, a "virtual scan" may instead be generated in some embodiments by rendering the model mesh into an OpenGL depth buffer and then reading back the depth values. A PSA optimized to use an LFI data structure, however, may generate better results in some embodiments.

The use of a Virtual Scan may mean that the pose estimation aligns new data only to the Virtual Scan rather than the entire model. For small camera motions (as, e.g., during mapping), this may not be too significant, but for larger motions it may be suboptimal. In contrast to Virtual Scans, LFI has the advantage of aligning the data to the entire model, which may be better for larger motions that can arise during tracking.

The data scan and the virtual scan (if used) may have smooth normal computed. The model may already be smooth enough, but the data may need to be smoothed in order to obtain useful normal in some embodiments. For efficiency reasons, the smooth normal computation may be performed on a GPU. For improved performance, the data scan can also be sub-sampled to reduce the number of point comparisons in some embodiments. During mapping, some embodiments may also remove a border of some width from the data depth scan for the purposes of Pose Update while, e.g., using the entire data scan for Map Update.

With regard to Line 8 of FIG. 13, this loop may gradually refine an estimate of $bel_t$ using expectation maximization (EM) method, specifically a hard-assignment EM version in this example. EM alternates an expectation step (E-Step) and a maximization step (M-Step). The E-Step computes correspondences and the M-Step adjusts the pose.

With regard to Line 9 of FIG. 13, (E-Step), the system may first transform the data scan into world coordinates using the most recent camera pose estimate $\{y_n\} = \{T_t^{(i)}(x_n)\}$. Then, correspondences may be computed using IB, LF, or LFI models (e.g., correspondences as depicted graphically in FIG. 12). Next, the system may compute outliers, which are data points that do not match their corresponding model points very well. A data point may be considered an outlier, e.g., if it does not match up to a valid model point, is too far from the matched model point (more than some threshold $k_{dist}$), does not have a valid normal, or its normal is too different from the model normal. If the percentage of outliers is too great, the system may fail. The tracker can either attempt to restart from the same pose for the next data scan $D_{t+1}$, or it may require re-initialization using Global Localization techniques described in greater detail herein.

In some embodiments, the scan points in a frame of sensor data may come from two types of obstacles: the static obstacles and the dynamic obstacles. Static obstacles are the ones that remained in the same position since the map has been created, e.g., for, walls, etc. Dynamic obstacles are the objects that have moved since map creation. Dynamic obstacles may include people, pets, and any objects moved out of place since the previous mapping. When aligning a data scan to the map, the system, in some embodiments, may filter out dynamic obstacles as they are not on the map. Rejection of outliers is intended for filtering of dynamic obstacles. Thus, the smaller the outlier threshold $k_{dist}$ the more dynamic obstacles will be filtered. This may be desirable for very fine and accurate pose adjustment.

On the other hand, if the outlier threshold $k_{dist}$ is smaller than the error in the current pose estimate, then large portions of static obstacles may be filtered out as well. Without these obstacles, it may be difficult to converge to the correct pose. Since the pose error should gradually get smaller with EM iterations, some embodiments set $k_{dist}$ to a larger value at the start of EM and gradually reduce $k_{dist}$ towards a minimum value.

With regard to Line 10 of FIG. 13, (M-Step), the alignment of selected data points to their corresponding model points may be performed, e.g., using Scaling Series starting with the most recent estimate of the belief $bel_t^{(i)}$ and producing a new estimate $bel_t^{(i+1)}$ (resulting, e.g., in the increasing accurate mappings of states 1200a, 1200b, 1200c, and 1200d in FIG. 12). Distances between points may be computed using a Point-to-Plane metric based on the model normals. Scaling Series updates may be highly parallelized on the GPU. One will recognize that other hill climbing or optimization search techniques may also be used in place of Scaling Series.

The starting uncertainty for Scaling Series may be set to the uncertainty of the prediction distribution $\overline{bel}_t$ produced by the dynamics update. The final uncertainty $\delta^*$ may be set very small in order to achieve a highly accurate alignment. The values for most parameters of Scaling Series may be learned by the system.

With regard to Line 11 of FIG. 13, the improved pose estimate $T_t^{(i+1)}$ may be updated to be the maximum-a-posteriori of $bel_t^{(i+1)}$ and i is incremented for the next iteration.

With regard to Line 12 of FIG. 13, the convergence condition can be, e.g., that either the change in the estimate of $T_t^{(i)}$ becomes very small or the maximum number of EM iterations is reached. Since EM can oscillate between several local minima, some embodiments compute the distance from $T_t^{(i)}$ to all the prior iterations $T_t^{(0)}, \ldots, T_y^{(i-1)}$. If the MAR (e.g., MAR-1) distance from any of the prior iterations is below the convergence threshold, the system may assume that EM has converged and exit the EM loop.

With regard to Line 14 of FIG. 13, once the convergence condition is reached, some embodiments set $bel_t$ and $T_t$ to be the estimates from the last EM iteration i.

7. Pose Estimation—Pose Tracking—Scaling Series

The Scaling Series algorithm (an example PSA) may compute an approximation of the belief bel by weighted particles. A particle represents a position in the search space. For example, where the device's pose is represented as six dimensions (x, y, z, pitch, yaw, roll) then each particle may represent a potential pose across all six dimensions. The initial uncertainty may be assumed to be uniform over the starting region. If the initial uncertainty is assumed to be uniform, the belief may be proportional to the data probability. Thus, the weights can be computed via the measurement model. A more through discussion of an example Scaling Series approach is provided in the PhD Thesis of Anna Petrovskaya, "Towards Dependable Robotic Perception". However, the embodiments described herein are not limited to particularities of that example. Indeed, some embodiments employ other Hill Climbing, or Optimization Search functions in lieu of Scaling Series entirely.

Figure 14:
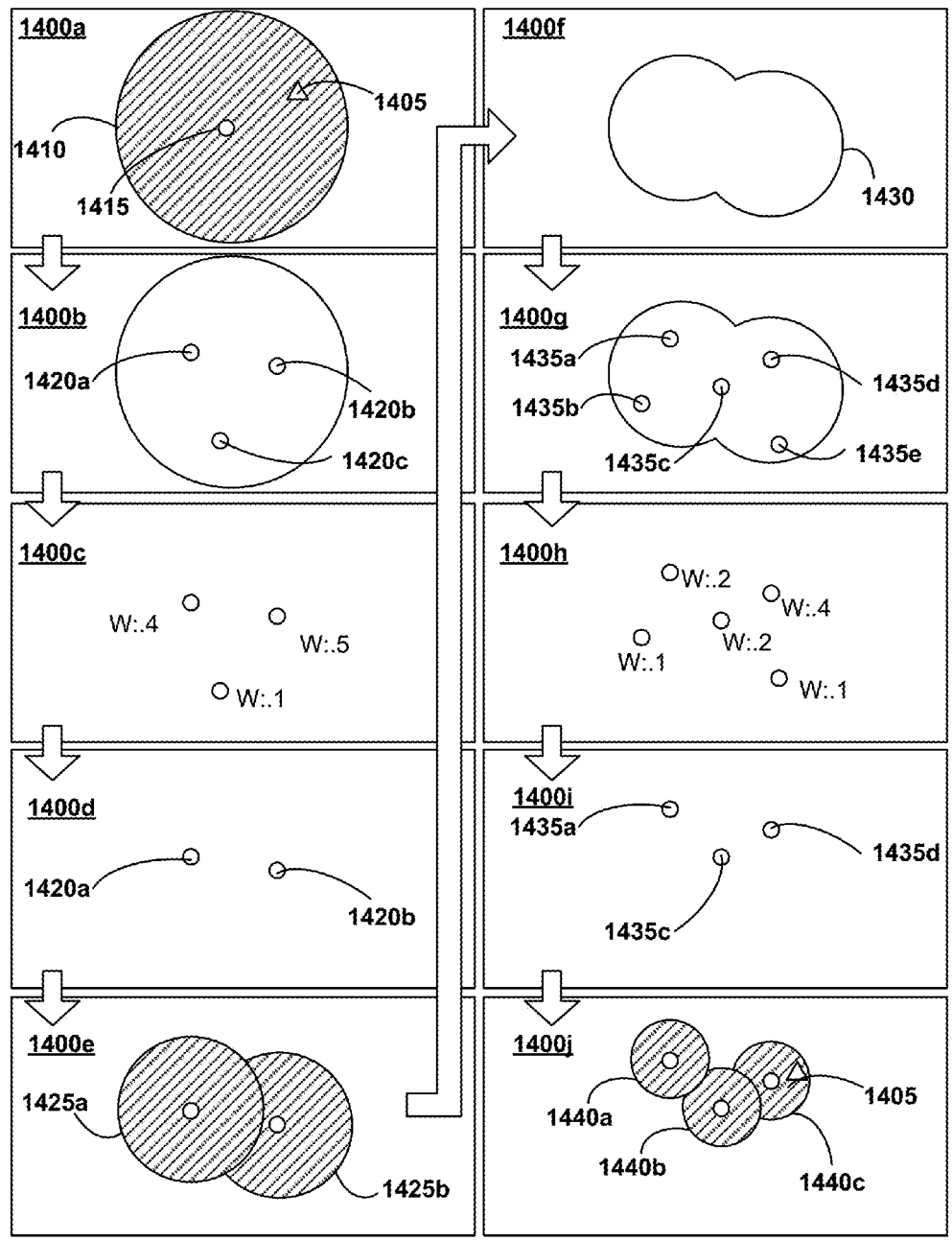
FIG. 14 is a graphical depiction of an example Scaling Series algorithm in a hypothetical two-dimensional universe to facilitate understanding of a higher-dimensional algorithm as may be implemented in some embodiments.
Figure 15:
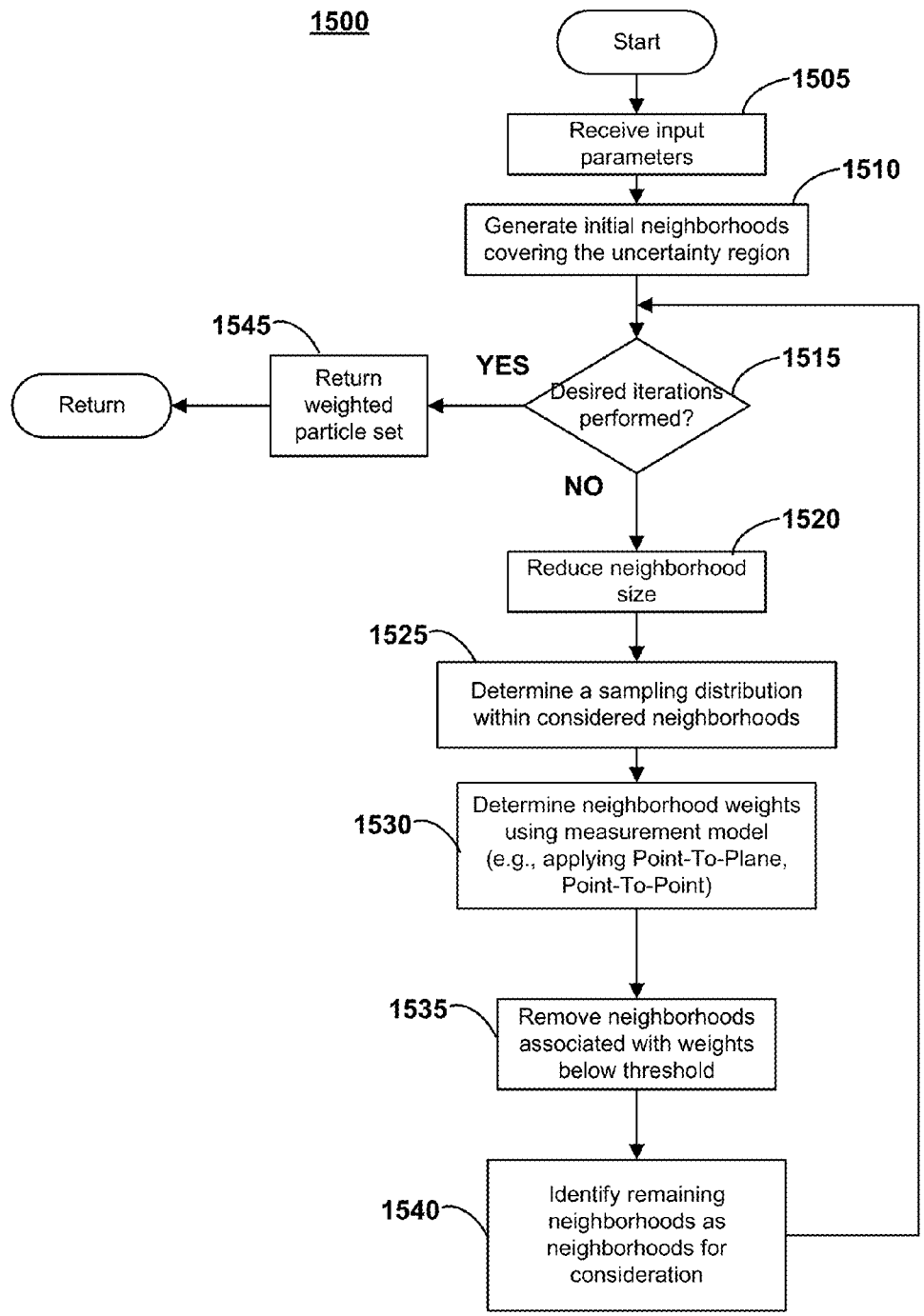
FIG. 15 is a flow diagram describing the operations of an example Scaling Series algorithm implemented in some embodiments.

FIG. 14 is a graphical depiction of a Scaling Series in a hypothetical two-dimensional universe as may be implemented in some embodiments. FIG. 15 is a flow diagram describing the operations of an example Scaling Series algorithm implemented in some embodiments. FIG. 16 is a pseudocode listing reflecting one possible scaling series algorithm as may be implemented in some embodiments. The search space in this example is depicted in each of steps 1400a-1400j as a two-dimensional rectangle (a typical search space would comprise, e.g., six rather than two dimensions). In this example, the actual position that best corresponds to the current data is the position 1405.

In this example implementation, at block 1505, the algorithm may take as input the initial uncertainty region, $V_0$, the data set, D (e.g., frame depth data), and two user-specified parameters: M and $\delta\bullet$. M specifies the number of particles to maintain per $\delta$-neighborhood. $\delta\bullet$ specifies the terminal value of $\delta$. The refinements may stop once this value is reached. At line 2 of FIG. 16 the scaling factor zoom is set so that the volume of each neighborhood is halved during scaling (though other scaling factors may be used).

At line 3 of FIG. 16, in this example algorithm, the number of iterations N is computed based upon the ratio of initial to final volume (this may be adjusted if, e.g., a different scaling factor is chosen). S denotes a neighborhood, R(•) denotes the radius, and Vol(•) denotes the volume (e.g., a six-dimensional volume) of the region.

As depicted in lines 1 of FIG. 16 the system may initialize the radius of the neighborhood to be considered to be the radius of the initial uncertainty region. Accordingly, initial neighborhoods covering the uncertainty space are generated at block 1510.

Lines 4-11 of FIG. 16 depict the steps occurring at each iteration of the algorithm. The iterations may be stopped at block 1515 based, e.g., on the number of iterations performed, the size of the neighborhoods, an applied metric, etc. At block 1520 the system may reduce the neighborhood size. For example, as indicated at line 5 of FIG. 16, at each iteration n, $d_n$, is computed by applying the zooming factor to $d_{n-1}$. Where the scaling series applies an annealing approach, at line 6 of FIG. 16, the corresponding temperature $\tau_n$ may also be determined assuming that $\delta^*$ correspond to the temperature of $\tau=1$.

At block 1525, the system may determine a sampling distribution within the neighborhood (e.g., which candidate poses within the space to consider). For example, at line 7 of FIG. 16 the system may draw a particle set $\bar{X}_n$ uniformly from $V_{n-1}$ ensuring that the required density of M particles per 5-neighborhood.

At block 1530, the system may determine measurement weights based on a measurement model. Example measurement weights are described in greater detail herein. For example, at line 8 of FIG. 16, the system may weigh the particles by the annealed data probability at temperature $\tau_n$, which could be, e.g., the probability provided by the measurement model raised to the power of $1/\tau_n$. In the example of FIG. 16, it may also serve to normalize the weights so that they add to 1, depending on the Pruning function on Line 9 (in some embodiments it may not be desirable to normalize weights to have them add up to 1). In some embodiments, the probability provided by the measurement model can be in negative-log form (i.e. not exponentiated to the negative power, e.g. total measurement error squared over 2 as in EQN. 5), also known as energy, thus allowing much better numerical stability in some embodiments when using floating point values. In some implementations, instead of exponentiating energy and raising it to the power of $1/\tau_n$, the energy can be multiplied by $1/\tau_n$ and the probability weights can be kept in negative-log form.

At block 1535, based, e.g., upon the measurement model determinations at block 1530, the system may remove neighborhoods having weights beneath a threshold, e.g., a pruning factor times the highest weight among all particles. If the weights are kept in negative-log form, in some implementations, the pruning can be determined by subtracting the lowest negative-log weight among all particles (e.g., the highest weighted particle would be the lowest energy particle), and determining that it is greater than the negative-log of pruning factor (e.g., −log(f)). For example, at line 9 of FIG. 16 the system may exclude low probability regions (e.g., regions below a threshold).

At block 1540, the system may identify neighborhoods for consideration in a next iteration. For example, at line 10 of FIG. 16 the system may then determine the resulting subregion for this iteration.

FIG. 14 depicts these operations graphically. For example, after several iterations the system may identify a neighborhood in the initial step 1410 about a value 1415. They system may then perform an even density cover (Line 7 of FIG. 16) to identify the points 1420a, 1420b, 1420c ($\bar{X}_1$). Normalized weights may then be computed for each point at step 1400c (Line 8 of FIG. 16). Based on these weight values, the points may be pruned so that only 1420a and 1420b remain (Line 9 of FIG. 16) at step 1400d. Smaller neighborhoods 1425a and 1425b (state 1400e) may appear around these points and a union 1430 of these neighborhoods (state 1400f) (Line 10 of FIG. 16). A new iteration may then be performed. Particularly, an even density cover (Line 7 of FIG. 16) may be computed across the union 1430 to yield the points 1435a, 1435b, 1435c, 1435d, 1435e ($\bar{X}_2$). Normalized weights may then be computed for each point at step 1400h (Line 8 of FIG. 16). Based on these weight values, the points may be pruned so that only points 1435a, 1435b, and 1435c remain (Line 9 of FIG. 16) at step 1400i. Smaller neighborhoods 1440a, 1440b, and 1440c (state 1420j) may appear around these points. The union may be taken of the neighborhoods and the iterations may continue.

Once N iterations have been performed (though other stop conditions may be used in some embodiments) the system may return the results at block 1545. For example, the system may prepare the output at lines 12 and 13 of FIG. 16. These lines draw the final particle set and compute weights at temperature r=1.

8. Pose Estimation—Pose Tracking—Scaling Series—Measurement Models

In some embodiments, the measurement model used to compute the normalized weights at line 8 of FIG. 16 is more complex than the dynamics model used by a Mapping or Tracking System. Generally, it's not possible to model a sensor exactly. On the other hand, this model may have a tremendous impact on accuracy of the estimate and also on the computation time required.

The measurement models applied in some embodiments may have a common structure. Generally, the measurement model may be computed as a Gaussian distribution over the total measurement error $\epsilon$. For example, $$p(D \mid T) := \eta \exp\left(-\frac{\varepsilon^2}{2}\right) \tag{5}$$

Where n denotes a normalization constant. If a scan is a collection of 3D points $D := \{x_1, \ldots, x_n\}$, the total measurement error $\epsilon$ is a function of the individual measurement errors en of each scan point $x_n$. Some embodiments assume that individual scan points are independent of each other given the pose of the camera T, then $\epsilon$ is the $L_2$-norm of the individual errors $$\varepsilon := \sqrt{\sum_n \varepsilon_n^2} \tag{6}$$

In reality, though, the individual scan points may not be completely independent of each other and an L1-norm may give better results:

$$\varepsilon := \sum_n |\varepsilon_n| \tag{7}$$

where |•| denotes the absolute value.

Each individual measurement $x_n$ may be expressed in the camera's local coordinate frame. Taking into account the current camera pose T, these points may be expressed in the world frame $y_n := T(x_n)$. In some embodiments, each individual error is defined to be proportional to some measure of distance from the measurement $y_n$ to some corresponding point $C(y_n)$ on the 3D map:

$$\varepsilon_n := \frac{d(y_n, C(y_n))}{\sigma} \quad (8)$$

Where σ is the standard deviation of the error, which may depend on sensor and map accuracy. The measure of distance d(•,•) may be the Euclidean distance, though some embodiments instead apply the Point-To-Plane distance. Given the data point $y_n$, its corresponding model point $C(y_n)$ and the surface normal vector at that model point $v_n$, the point-to-plane distance is computed as the absolute value of the dot product $$d(y_n, C(y_n)) := |(C(y_n) - y_n) \cdot v_n| \quad (9)$$

where |•| denotes absolute value and • denotes the dot product operator. Particularly, as described elsewhere herein, both the Pose Update and Standard Tracking processes may determine correspondences $C(y_n)$ which may then be used to determine the distance using the above equations. Additionally, in some implementations, the corresponding point $C(y_n)$ and the normal vector $v_n$ may be provided as a plane (a,b,c,d), in such case the Point-To-Plane distance can be computed as:

$$d((x,y,z),(a,b,c,d)) := |a*x + b*y + c*z + d| \quad (10)$$

where (x,y,z) is the location of $y_n$ and (a,b,c,d) is the corresponding plane representation. In some embodiments, the Global Localization process may instead use an LFF data structure to determine the distance (the LFF may provide the distance value directly without the need to compute the numerator "$d(y_n, C(y_n))$" explicitly). That is, $$\varepsilon_n = \frac{LFF(y_n)}{\sigma} \quad (11)$$

In the presence of outliers, some embodiments cap the value of en at a maximum value. The correspondence function C(•) may be defined differently in different measurement models as explained herein.

9. Social Methods—Overview Notice Systems and Methods

Figure 17:
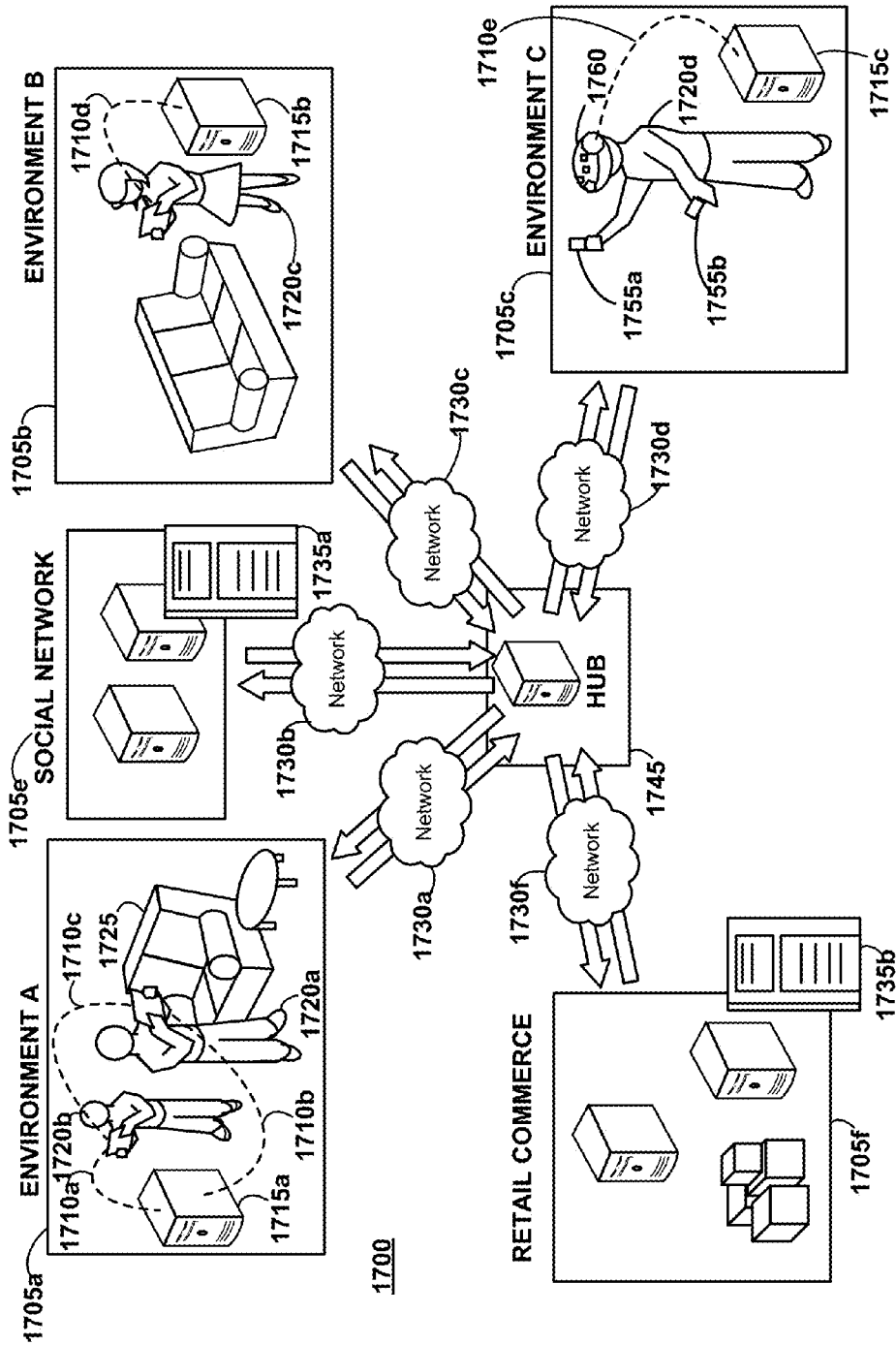
FIG. 17 is an overview of an example social applications network topology as may be used in some embodiments.

FIG. 17 is an overview of a social applications network topology 1700 as may be used in some embodiments. In this example, a hub 1745 may coordinate social interactions across two or more of users 1720a-d, service providers such as a social network 1705e and retail commerce organization 1705f, though one will recognize additional services and systems that hub 1745 may mediate between.

For example, users 1720a and 1720b may use AR tablet devices, as discussed herein, to map a real-world environment A 1705a, e.g., their personal residence, and to engage in subsequent AR or VR experiences in that environment. As discussed, the environment A 1705a may include real-world objects 1725. The users' tablets may communicate with a local server 1715a, e.g., via connections 1710a, 1710b, such as Bluetooth™ or WiFi™ connections. Local server 1715a may, e.g., perform local map processing operations. The users' 1720a and 1720b devices may also be in communication directly via connection 1710c (e.g., a hardwired connection, a Bluetooth™ connection, etc.).

Users 1720a and 1720b may send messages and data to one another directly via the connection 1710c. However, they may also communicate with the user 1720c, who is also using a tablet device (e.g., a personal phone with a touch-screen), in environment 1705b. User 1720c may have likewise mapped her environment 1705b and may also be in communication using server 1715b across connection 1710d. However, in some embodiments user 1720c may not have mapped her environment. Indeed, her tablet device may not even include a depth sensor (e.g., it may be an older generation touch-screen phone). Despite these limitations, user 1720c may still be able to interact with the users 1720a,b,d as described in various embodiments herein. Similarly, user 1720d may be located in another environment 1705c and may be using a headset device 1760 and gesture controls 1755a,b. Headset device 1760 may provide user 1720d with an AR experience (e.g., providing a transparent display, relaying camera images to an internal monitor, etc.). In some embodiments, headset device 1760 may instead provide a VR experience. In either event, the connection 1710e (which may be tethered or wireless) may allow user 1720d to participate in a social exchange with users 1720a,b,c (and to be in communication directly or indirectly with organizations 1705e, and 1705f). Thus, various of the disclosed embodiments may facilitate social interactions between tablet devices with depth functionality, devices with and without such functionality, tablet devices and head-mounted devices, etc. Some embodiments may use the pose search methods referenced herein to provide the granularity necessary to provide meaningful interaction experiences across these disparate devices and their disparate capabilities.

In some embodiments, programs operating on the tablet devices may permit the devices to communicate directly across the network connections 1730a, 1730c, and 1730d with hub 1745 serving merely as a router. For example, network connections 1730a and 1730c may be Internet connections, and hub 1745 simply a router, permitting TCP or UDP packets to be sent between devices in Environment A 1705a, Environment B 1705b, Environment C 1705c, etc. However, in some embodiments, the hub 1745 may take a more active role, serving as a central nexus for coordinating the high-bandwidth transfer of information between user devices.

While hub 1745 may facilitate interactions between users 1720a-d, it may also allow the users to access third party sites and services 1705e,f. For example, a social network 1705e may provide a webpage 1735a. Even if user 1720c does not have a depth-enabled device, she may still be able to access the webpages 1735a via a browser across network connection 1730b (e.g., a standard Internet connection). The web page 1735a may allow user 1720c to influence the AR and VR experiences of users 1720a and 1720b (e.g., making comments, inserting messages and suggestions, inserting triggering events, etc., as described in greater detail herein).

Similarly, the users 1720a-d may be able to explore environments mapped by other users (e.g., virtual models of a user's home). While the users may leave personal annotations in the map models for their peers, they may also reference data from a commercial retail organization 1705f (e.g., a furniture provider, a home appliance provider, etc.) via network connection 1730f. For example, the user may retrieve a virtual model of a furniture item from the commercial retail organization's 1705f servers and include it in their annotation to another user's map. In this way, users can, e.g., incorporate virtual objects in their discussions to directly reference the subject matter at issue. Similar to the social network 1705e, users may also accomplish similar results via a website 1735b. Indeed, the sites 1735a and 1735b may be in communication with one another and reference one another's data. As an example, Social Network 1705e may notify a user of another user's birthday, retrieve relevant gift items from commercial retail organization 1705*f* based upon each user's social data, and allow the user to place virtual representations of the gifts in the other user's environment (e.g., a virtual birthday party with virtual presents).

10. Social Methods—Notice Message Systems and Methods

Some embodiments allow users to leave messages for one another in their respective AR environments (e.g., user 1720*a* may leave user 1720*b* a message directly across connection 1710*c*, or user 1720*c* or 1720*d* may leave user 1720*a* a message, etc.). These messages may, e.g., be location-aware or temporally aware, appearing when the user comes within a threshold distance of them and/or at a certain time of day. In some embodiments, the triggers may be associated with local media events (e.g., the posting of an online notice that a musical group favorited by a user on their social networking site will be playing in town in the near future), calendar events, stock price fluctuations, etc. Various embodiments consider a variety of messages which may be sent, from simple text messages to animated 3D content, etc. The users may also place the messages directly within their own AR experience, rather than remotely (e.g., user 1720*a*, initially places the message during a first AR experience in Environment A 1705*a* for the benefit of user 1720*b* in a subsequent user AR experience in Environment A 1705*a*). The messages may be stored locally (e.g., on server 1715*a* or a user's tablet device) or remotely (e.g., on hub 1745).

Figure 18:
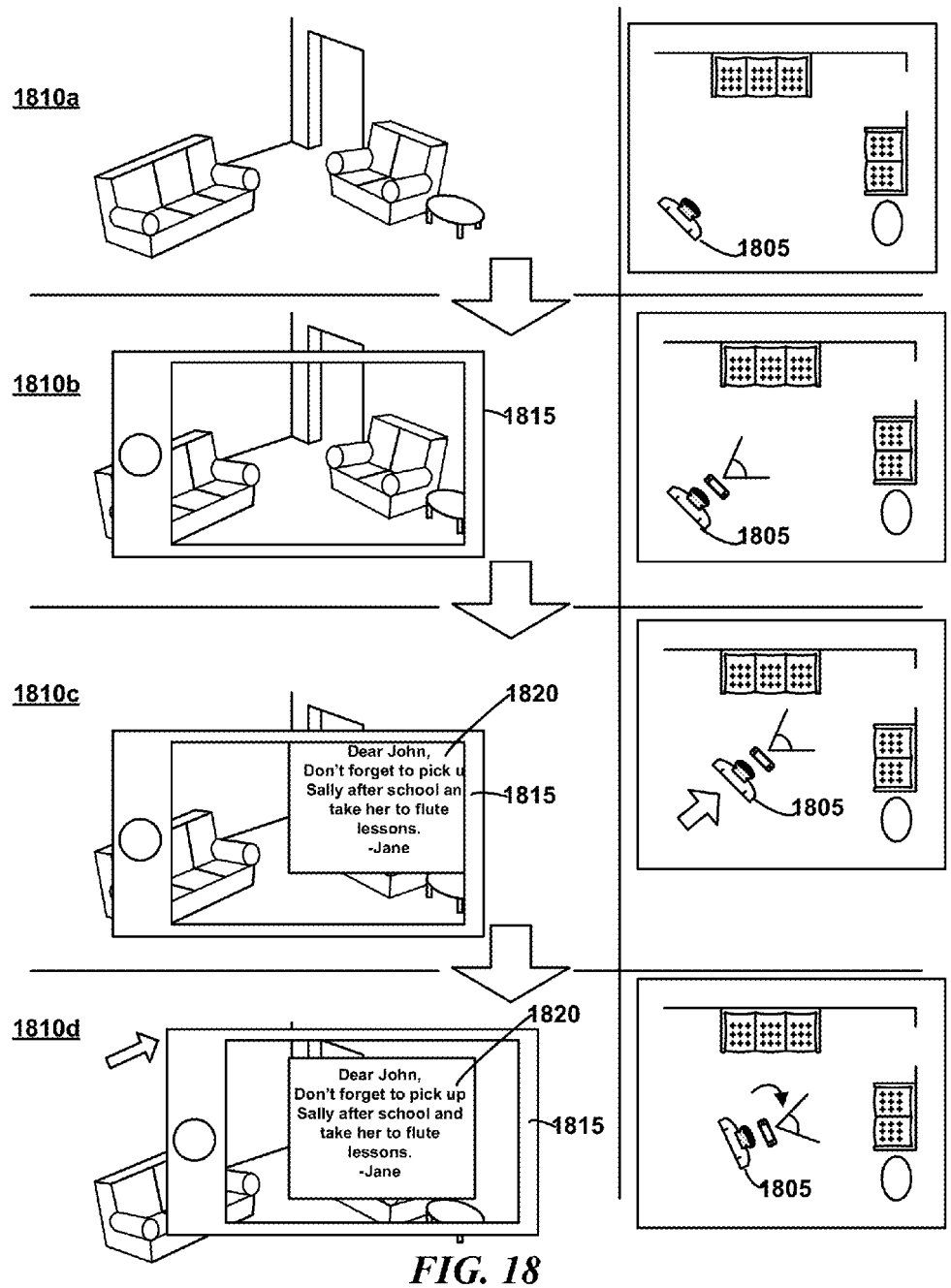
FIG. 18 is a series of conceptual diagrams illustrating an example of the "Notice Message" systems and methods considered in some embodiments.

FIG. 18 is a series of conceptual diagrams illustrating an example of the "Notice Message" systems and methods considered in some embodiments. At time 1810*a*, a user 1805 may be standing, staring at the contents of their living room. At later time 1810*b* the user 1805 may begin to use an AR device, e.g., the tablet 1815 from FIG. 4, to view the environment. The user's AR device 1815 may display the real-world environment as well as any relevant virtual objects.

Figure 19:
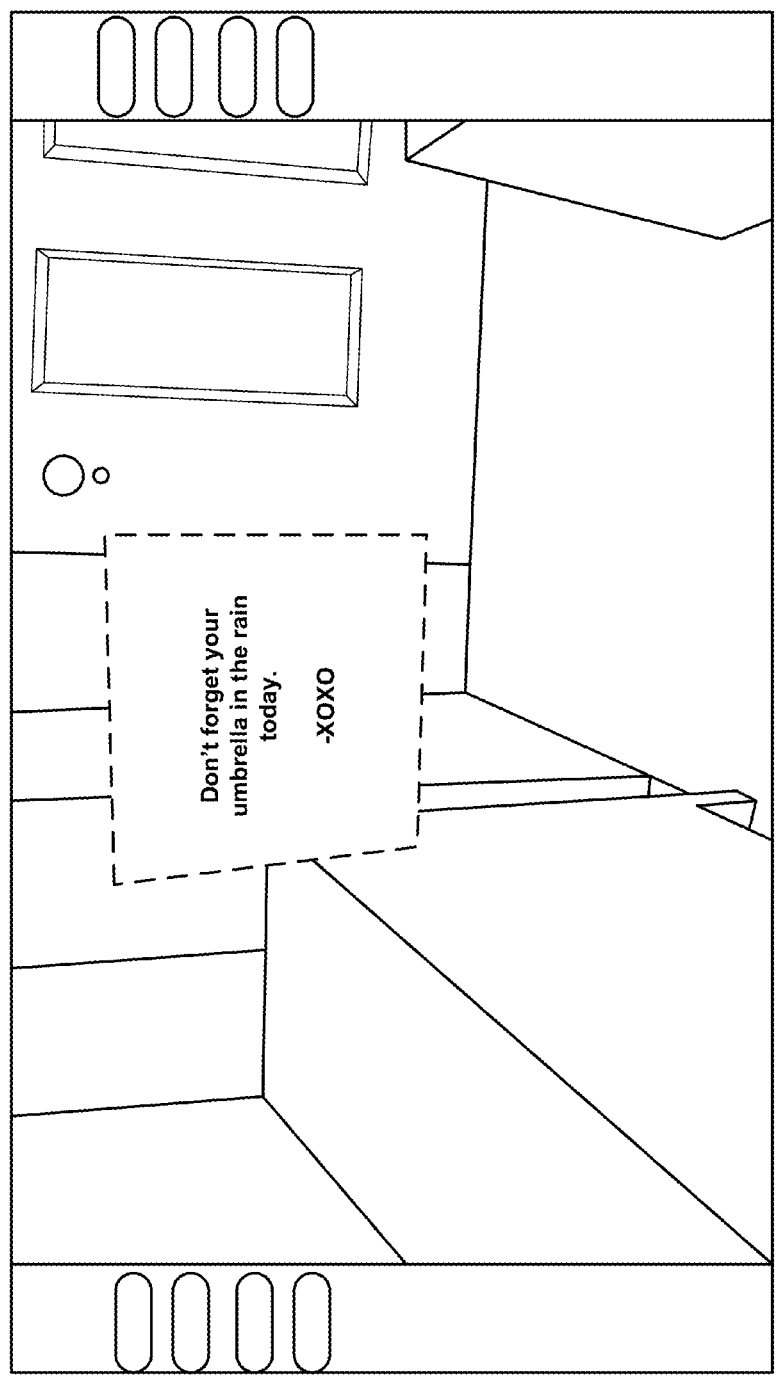
FIG. 19 is an example AR screen image of an example reminder message as may be implemented in some embodiments.

In some embodiments, virtual "notices" may be triggered by the user's determined location in the environment based upon the tracking data. For example, at time 1810*c* the user 1805 may move forward in the environment until they trigger the notice 1820. The notice 1820 may be presented with or without an animation to the user. In this example, a wife has specified a trigger en route to the living room door, with a reminder to her husband regarding their daughter's music appointment. At time 1810*d* the user rotates the AR device to bring the notice 1820 into complete view (the notice may be, e.g., a billboard quad). Users may specify triggers for such messages using an application displaying a top-down or three-dimensional representation of the environment's map. FIG. 19 is an example AR screen image of an example reminder message as may be implemented in some embodiments.

Text message notices may be used for a multitude of purposes. These messages may be statically placed in a specific 3D location. The user may have the ability to toggle the message on and off. For example, the messages may be descriptions of items that a user should purchase and where the items should go on each shelf in a storage area. The messages may annotate button functions on a home appliance. Thus, a retailer 1705*f* may introduce messages in user's homes to inform the user of products, provide updates of purchased products, notify the user of a product's status, notify the user of a friend with a similar product, etc.

Messages can be triggered by a user entering a specific location, e.g., within some radius of a specific 3D point. These messages may be displayed to the user, or, in some embodiments, may be sent to others located remotely (e.g., informing a mother at work that her daughter has arrived home from school). For example, these messages can be reminders to oneself triggered at specific locations. As another example, if parents would like their children to stay out of a dining room while playing, these messages may be triggered when children enter the dining room. The trigger can be based on, for example, a location within some radius, entering a specific user-specified region of any shape, and/or having line-of-sight to a specific location (referred to as "Location Activated Messages" in some embodiments).

Messages may also be set to activate during specific time intervals. For example, the messages can be reminders to oneself or others such as "Feed the dog" or "Start laundry" (referred to as "Time Activated Messages" in some embodiments). Messages may be activated purposefully by the user by toggling or clicking on a specific 3D location (referred to as "User Activated Messages" in some embodiments). Messages may be tied to the identity of the user, so that the message is visible only to a specific person or designated group of people (referred to as "Identity Activated Messages" in some embodiments). Instead of getting a text message, when the user approaches a certain location, the message may be read aloud to the user, and/or some music, audio, or sound effect may be played (referred to as "Audio Messages" in some embodiments). It may also be useful not only to show text, but also to display a virtual path the user should follow to reach a specific destination (referred to as "Guiding Messages" in some embodiments). For example, if a person forgets something at home and asks a friend to go fetch it, the person could indicate the 3D location by clicking on the 3D map of his/her house for the friend's benefit. Then, a path may "light up" (e.g., be presented in an AR experience) guiding the friend to the forgotten item. Guiding messages can also be very useful to emergency personnel (especially in an unfamiliar location, e.g., a cruise ship). Guiding messages may be embedded as hyper-links in other text messages. When the user clicks on the hyper-link the path may "light up" or be made visible in the AR application.

One will recognize that combinations of the above examples may also be implemented (referred to as "Combination Messages" in some embodiments). For example, a person may be house-sitting in an unfamiliar house. When it is time to feed the dog, a reminder message may be presented to the house-sitter. A guiding path may appear showing where the dog food is stored and where the bowl is located. The reminder message may have hyperlinks for "dog food" and "food bowl". When the house-sitter clicks on one of both of these hyper-links one or both of the paths may light up in different colors. Access to such personal information may be granted to service providers as part of their hiring process. For example, a job posting, such as "house" or "baby sitter" may include with it a request for certain smart-home augmented reality permissions, such as access to the above pet information.

Messages can be displayed as regular 2D text on screen, e.g., as a pop-up, in a status bar, etc. (referred to as "On-Screen Messages" in some embodiments). 2D text can also be placed on a billboard in a specific 3D location (referred to as "2D Text on Billboard Messages" in some embodiments). For reference, a billboard may be a quad (e.g., a rectangle) that always faces the camera. Instead of placing text on a billboard, one may place text on a flat or curved 3D surface (for example, writing a note on a wall) (referred to as "2D Text on a 3D Surface Messages" in some embodiments). This text may not always face the user, but instead may be displayed according to the vantage point of the camera.

Volumetric 3D font may also be used to spell out a message in a specific location (e.g., 3D text in space). Messages need not need to be limited to just text. Messages may contain images, video, which can be displayed in ways similar to text messages. Moreover, messages may contain full 3D content, both static and animated with or without sounds.

11. Example Process—Virtual Object Display

Figure 20:
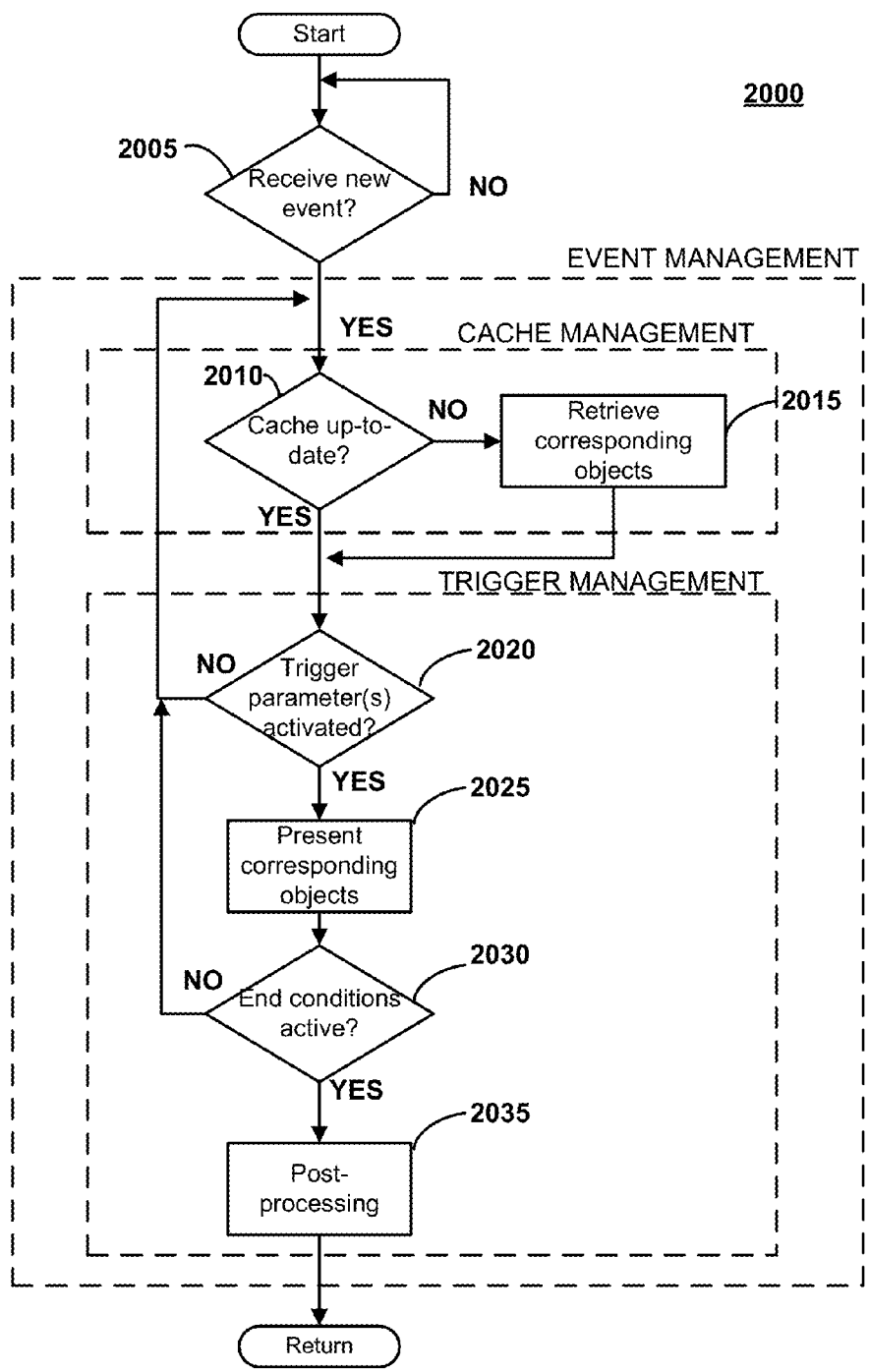
FIG. 20 is a flow diagram illustrating certain operations in virtual object display process as may occur in some embodiments.

FIG. 20 is a flow diagram illustrating certain operations in virtual object display process 2000 as may occur in some embodiments. The process 2000 may be implemented, e.g., all or in part on one or more of servers 1715*a-c*, hub 1745, user devices (e.g., tablets, head-mounted-displays 1760, etc.), etc., referred to for purposes of explanation in this section as the "system". At block 2005, the system may receive a new event (e.g., an XML or JSON representation of an event). The event may be a data object with fields indicating the nature of the event, the virtual objects involved, the triggering conditions, end conditions, etc. The system may receive the event from a social networking site via a network interface, via a user's AR device, via an automated calendaring system, etc.

In some embodiments, the system may spawn a new thread, process, or monitoring service to independently manage each received event object. This independent management is reflected by the grouping "EVENT MANAGEMENT" in the figure. In some embodiments, the events may be stored in a memory storage and consulted by an AR application during the use of the AR device. However managed, in some embodiments the system may verify that the virtual objects represented by the event are readily available to the intended AR application during "CACHE MANAGEMENT". Particularly, at block 2010 the system may determine if the cache contains enough of the necessary virtual objects to provide the appropriate response upon triggering. The system may try to proactively acquire the assets at block 2015 if they are not available. As the cache space may be finite and limited on some systems (e.g., a wireless head-mounted display) the system may periodically reevaluate the caching at block 2010. The system may place the events' virtual object assets in a total ordering based upon the likelihood of their being triggered and the size of the assets. Assets associated with events unlikely to be triggered in the near future may be displaced in memory by assets with a higher priority.

"TRIGGER MANAGEMENT" may involve the actual detection of the trigger activation (e.g., at block 2020), the subsequent presentation of the virtual assets (e.g., at block 2025), and the post-processing (e.g., at block 2035) once the end conditions are reached (e.g., at block 2030). For example, the end condition for a birthday party may be a timer, an "acknowledgement" by the viewing user, the completion of task by the user, etc. Some virtual assets may invite user action (e.g., "pinning a tail on the donkey") which may itself result in an output (e.g., "selecting a preferred gift", "selecting a vacation destination"). Thus, post-processing at block 2030 may include running a "callback function" or similar behavior specified in the event data (e.g., to submit the gift selection to a commercial retailer for fulfillment, submit a thank you message, etc.). The callback function may have been specified by a remote user in a web browser, by a remote retail commerce site, etc. In some embodiments, "TRIGGER MANAGEMENT" may occur on an AR device (e.g., a tablet), while "CACHE MANAGEMENT" and "EVENT MANAGEMENT" occur on one or more other devices (e.g., a local server in a home and a HUB respectively). Some embodiments may rely upon the Scaling Series and similar approaches discussed elsewhere herein to provide the fine granularity needed to place, display, and receive user input in relation to one or more of the virtual assets. The event may distinguish between scenes in need of such finely-grained placement and those which do not (e.g., floating or abstract billboards) to economize processing.

12. Social Item Selection and Publication

Figure 21:
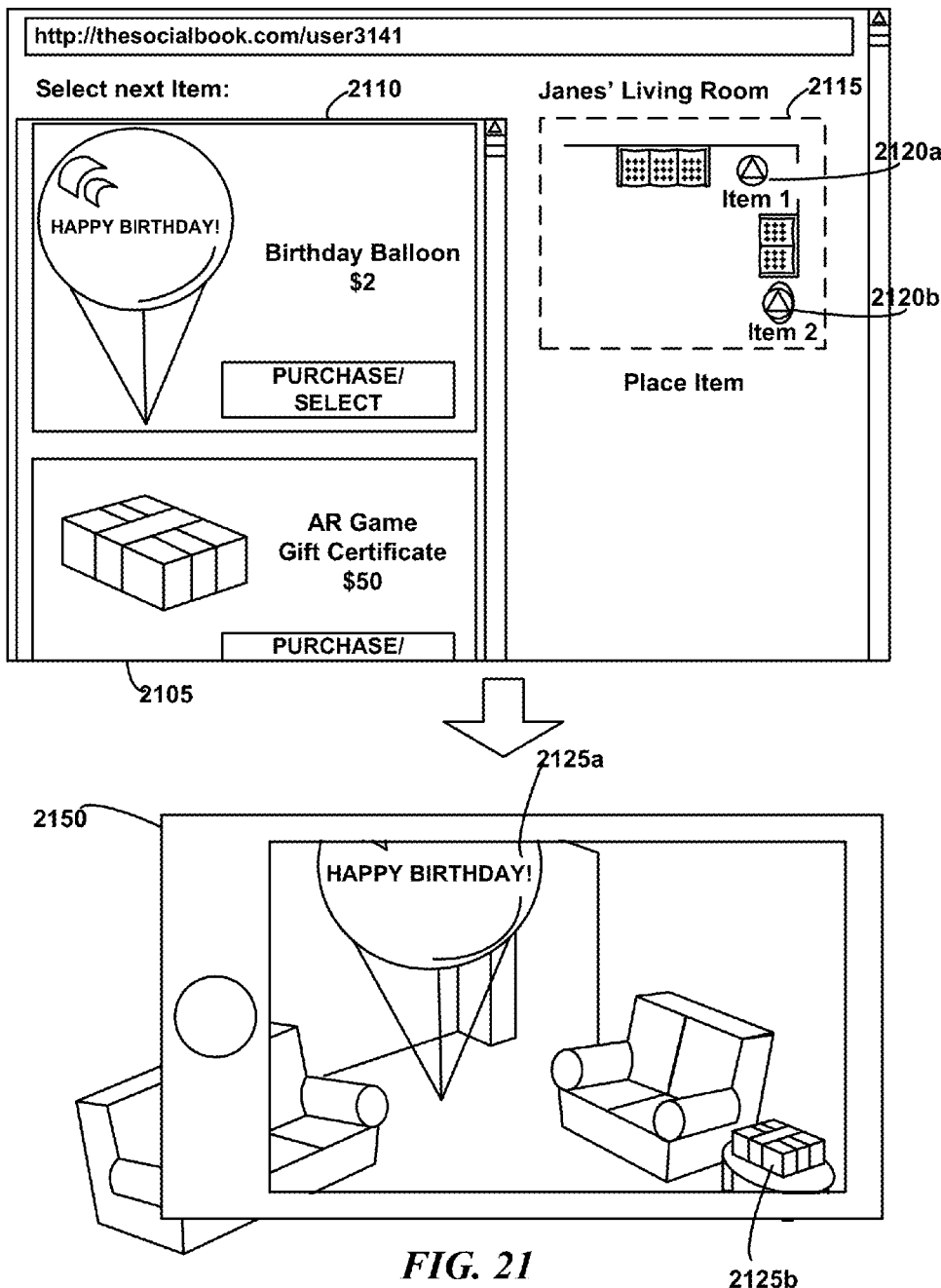
FIG. 21 is a series of diagrams illustrating an example of the "Social Item Selection" systems and methods considered in some embodiments.

As discussed above, some systems may allow a user (even a user with only, e.g., a web browser) to access a website (e.g., site 1735*a*) to influence another, perhaps remote, user's AR experience. FIG. 21 is a series of diagrams illustrating an example of the "Social Item Selection" systems and methods considered in some embodiments. In an application interface 2105, e.g., a browser directed to a social networking site, a user may select various virtual items 2110 to appear in another user's augmented reality environment. In this example, a user "Mary" is planning a birthday party for a friend "Jane" in her social network. Jane has previously provided access to a map 2115 of her living room (e.g., a 3D mesh on a local server, a remote hub, a copy on a social network server, etc.). Accordingly, Mary can purchase/select items 2110 and place them at positions 2120*a* and 2120*b* in the environment. A time delay or trigger may be included so that the virtual objects are only visible to Jane at the suitable time. As indicated, when Jane later views her living room using an AR device 2150 Jane will see each of the items 2125*a*, 2125*b* placed and possibly animated as specified by Mary. Various triggers and events may be associated with the items. For example, when Jane touches or approaches the gift 2125*b* her AR device may inform her that she has received a gift card, and the amount may be automatically credited to her account.

Figure 22:
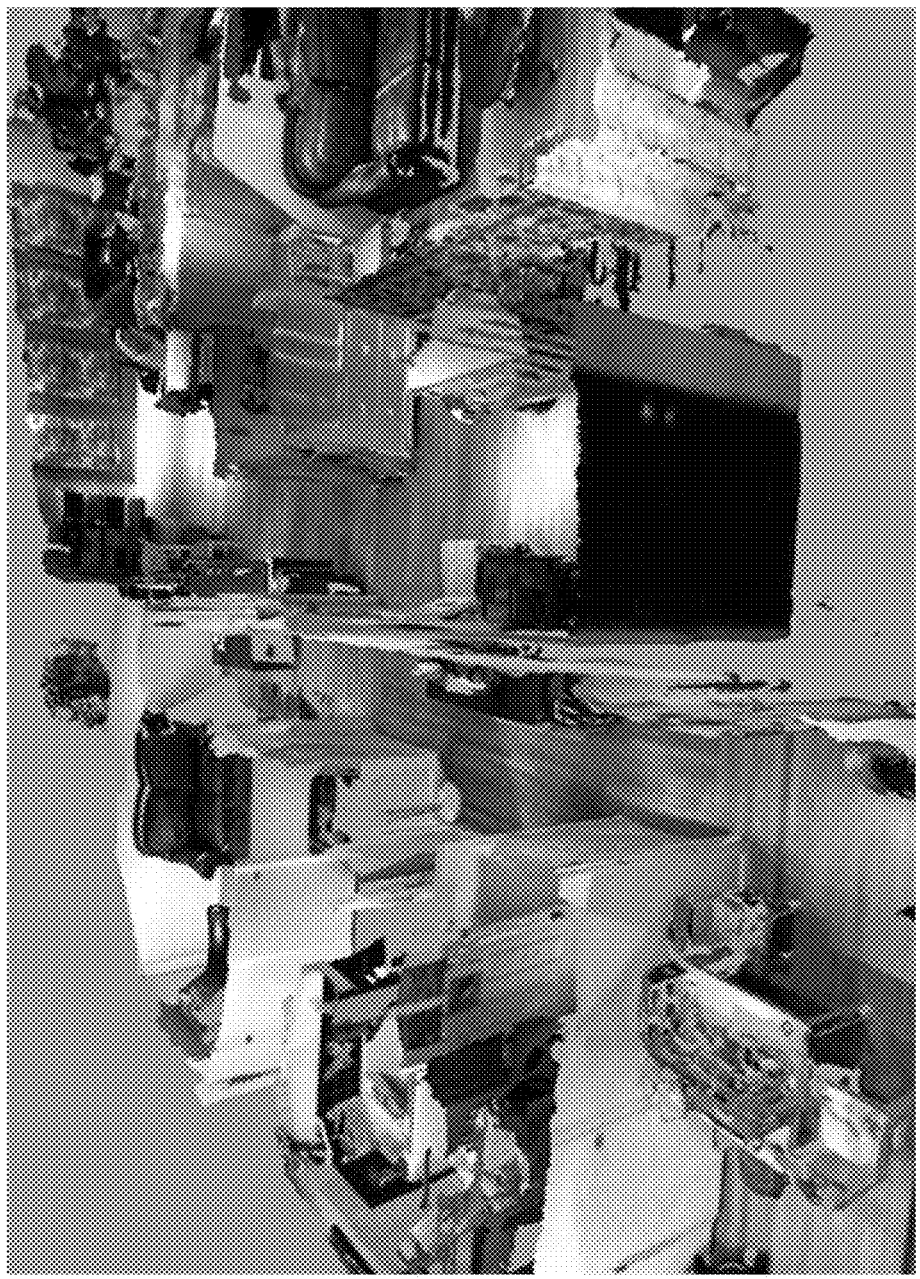
FIG. 22 is an image of an example of a user scanned/built 3D model of an environment (i.e., a home) using an AR device as may occur in some embodiments.
Figure 23:
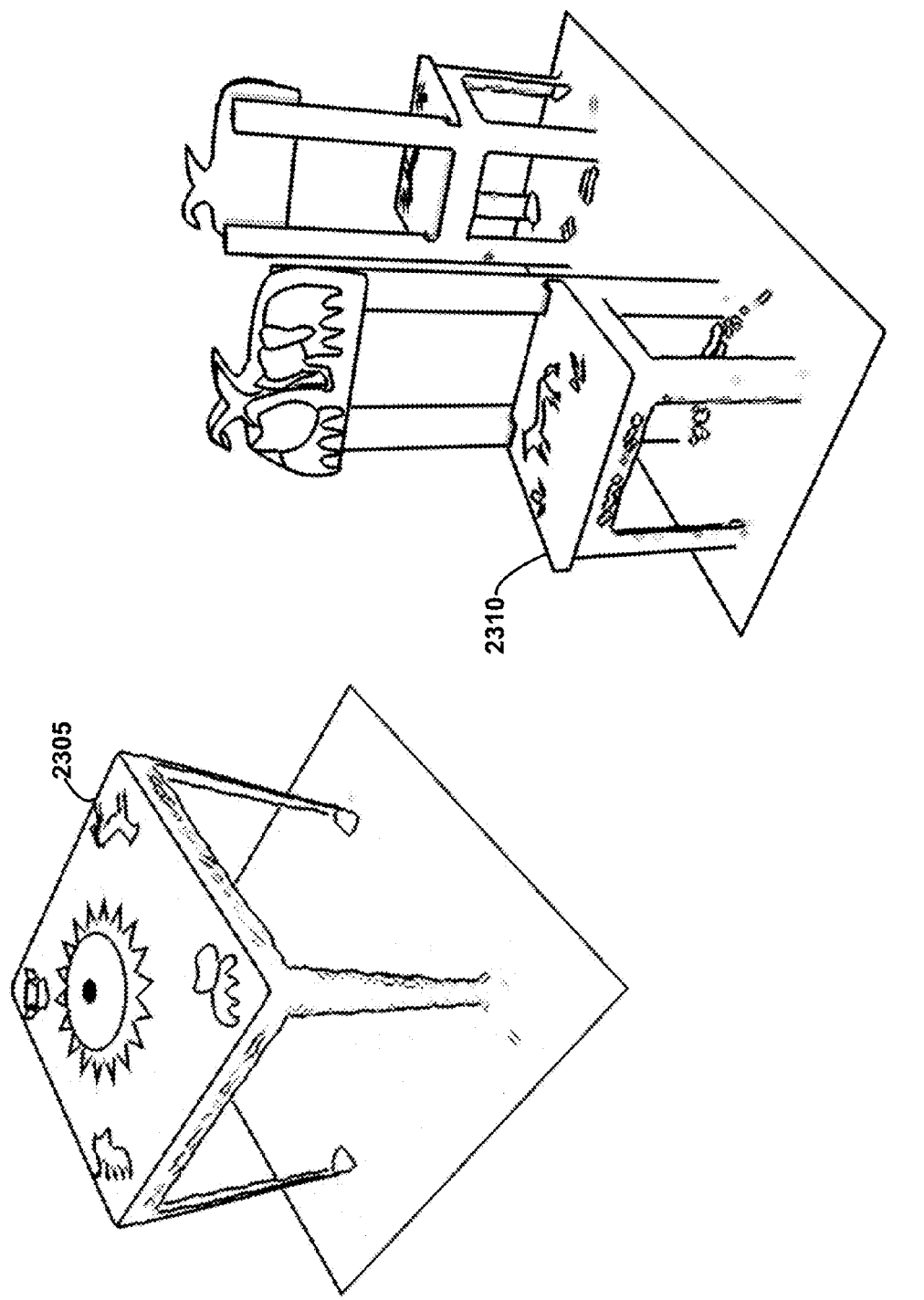
FIG. 23 is an image of an example of a user scanned/built 3D model of object (i.e., a chair and table) using an AR device as may occur in some embodiments.

Using the mapping sub-system, people can build 3D models of separate objects or of their entire homes (see, e.g., FIGS. 22 and 23). These models can then be shared with friends, family, and various professionals remotely. One could share an entire model or a part of it. FIG. 22 is an image of an example of a user scanned/built 3D model of an environment (i.e., a home) using an AR device as may occur in some embodiments. FIG. 23 is an image of an example of a user scanned/built 3D model of object (i.e., a virtual table 2305 generated from a real-world table and a virtual chair 2310 generated from a real-world chair) using an AR device as may occur in some embodiments. Such user-generated content may be uploaded to a hub or social server and used as a virtual object as discussed herein. Some embodiments employ maps by placing 3D models of other objects inside of them, e.g., pieces of furniture or decorations. These object models can be downloaded from an online service or they can be models of objects the user scans and builds using the mapping sub-system, or created using Computer-Aided Design (CAD) or 3D modeling software. In this manner, users can share suggested layouts, decorations, remodeling, and other ideas, or just show off their homes and scanned objects. Some embodiments may use these models in real-time in an immersive AR setting. For example, a user may be placed into a 3D model of someone-else's house. In some embodiments, the user can view suggested layouts and objects in their own home. Users may place and move objects sent by their friends in their own environment.

Figure 24:
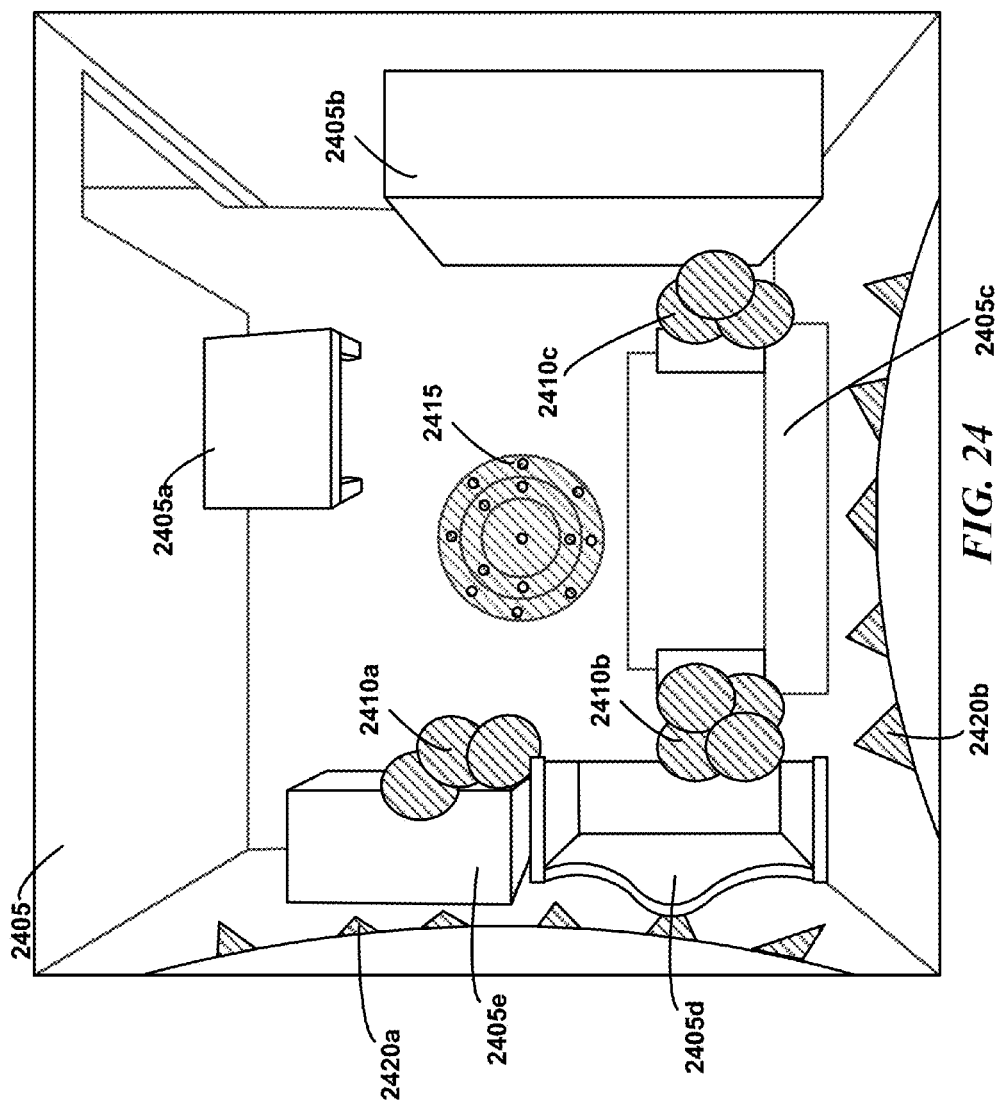
FIG. 24 is a top-down view of model with arranged 3D content as may occur in some embodiments.

FIG. 24 is a top-down view of model 2405 with arranged 3D content as may occur in some embodiments, e.g., the model appearing in 2115. The model may include mappings and/or virtual object insertions of real-world objects, such as table 2405*a*, book case 2405*b*, sofa 2405*c*, crib 2405*d*, and drawers 2405*e*. The user may place virtual objects, e.g., via a browser, an AR phone, tablet or HMD device, a VR phone, tablet or HMD device, etc., and specify corresponding triggering events. In this example, the user is planning a surprise birthday party and wishes to display virtual objects with the triggers, such as banners 2420a, 2420b, balloons 2410a-c, and cake 2415. The actual virtual object may not be represented in the browser, but may be shown indirectly (e.g., a confetti animation may be shown as a shape overlaying the relevant region of the map 2405, a musical sound may be illustrated by a waveform pattern, etc.). Some embodiments may allow the user to maneuver through the environment to test the intended effect of the triggering events (e.g., in a virtual HMD experience).

Figure 25:
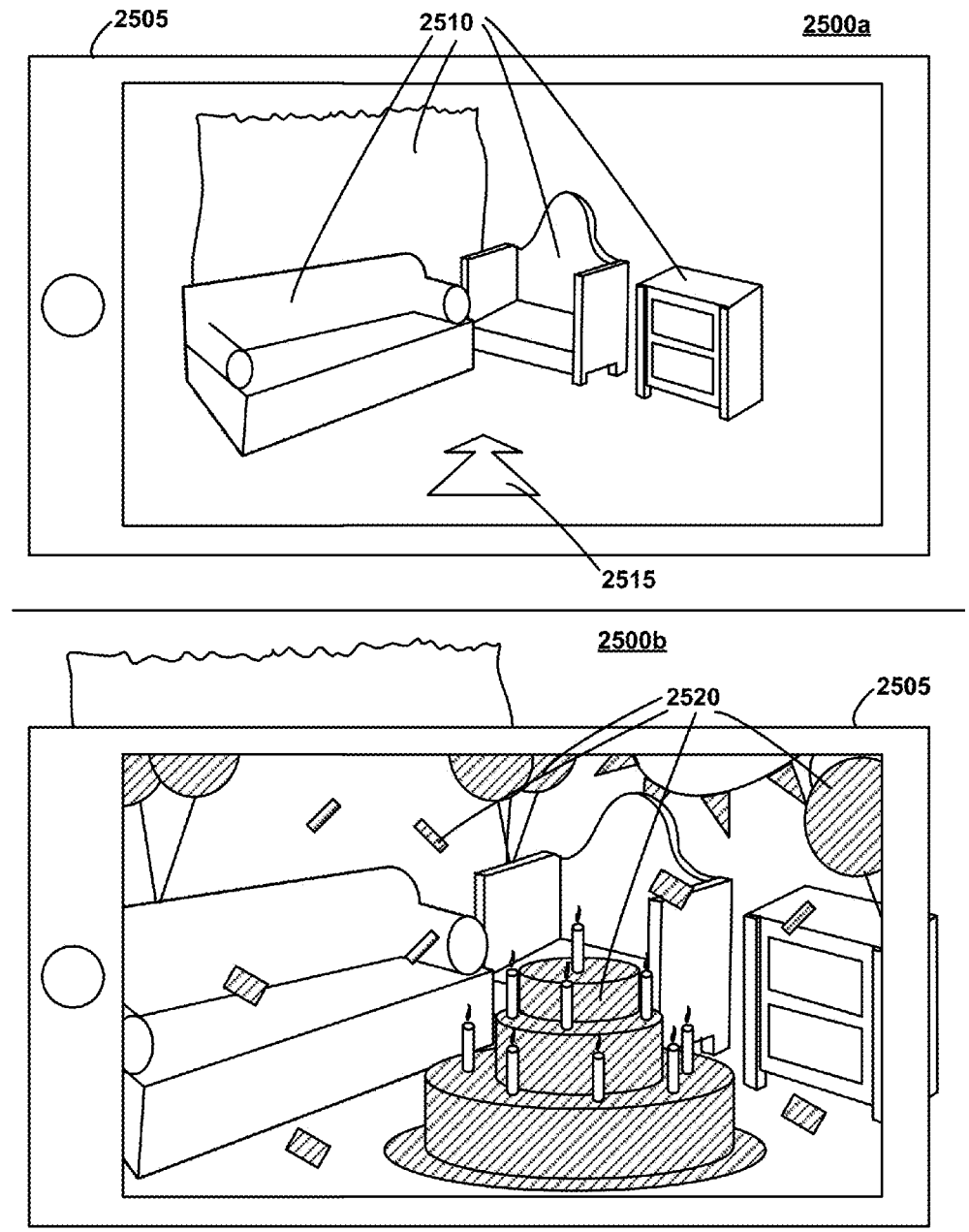
FIG. 25 is a conceptual diagram illustrating a pair of user perspectives in an AR experience prior to activation of a location trigger and following activation of a location trigger as may occur in some embodiments.

FIG. 25 is a conceptual diagram illustrating a pair of user perspectives in an shared AR experience prior to activation of a location trigger and following activation of a location trigger as may occur in some embodiments. For example, the user for whom the decorations were generated in FIG. 24 may initially 2500a hold an AR device 2505 and proceed forward 2515 (the arrow is merely to facilitate the reader's understanding and need not necessarily appear to the user) into a real-world room having real world objects 2510. If the date is correct (e.g., in agreement with a chronological trigger) and the user's location is correct (e.g., in agreement with a spatial trigger), then virtual objects 2520 and their corresponding animations/functionality may be presented.

In some embodiments, the sender (e.g., Mary) may be able to pre-arrange the content, indicating where the objects (3D objects, video, animations, sound locations, etc.) would go on the destination model. To continue the example, a person may have a birthday, and a sender may decide to decorate the person's room with balloons, cake, flags, and other objects. The message can be triggered when the person enters the room, with all the decorations popping up and the music playing. In this case the sender would place objects throughout the person's room, and designate an activation region.

Some content may contain logic (or programming, or scripts) that would move and animate the content based upon various conditions, e.g., where the user is, what time it is, where the user clicked, etc. For example, instead of carefully arranging birthday decorations, a sender may send an animated puppy to a person which includes path-navigation logic. The puppy could wear a party hat, dance around the person, and sing a happy birthday song. It may also allow the person to interact (e.g., pet or play) with the puppy. In this case, the animated 3D content may include code and logic on how the puppy should move around and jump around the person, based on where the person is. The surface on which the puppy will move can be identified using previously described floor-extraction techniques (e.g., those presented in U.S. Provisional Patent Application No. 62/080,400 filed Nov. 16, 2014 and U.S. Provisional Patent Application No. 62/080,983 filed Nov. 17, 2014). Path planning techniques can be used to plan a path for the puppy to move along, taking into account the person's location (which may be changing over time), and obstacles in the environment. The event object may additionally include various parameters that the sender could specify. For example, a parameter may specify that the puppy should only stay in a particular region of the house, or that it should eat virtual kibble out of a particular location (e.g., the location of a real pet bowl), etc.

13. Example Process—Virtual Object Display

Figure 26:
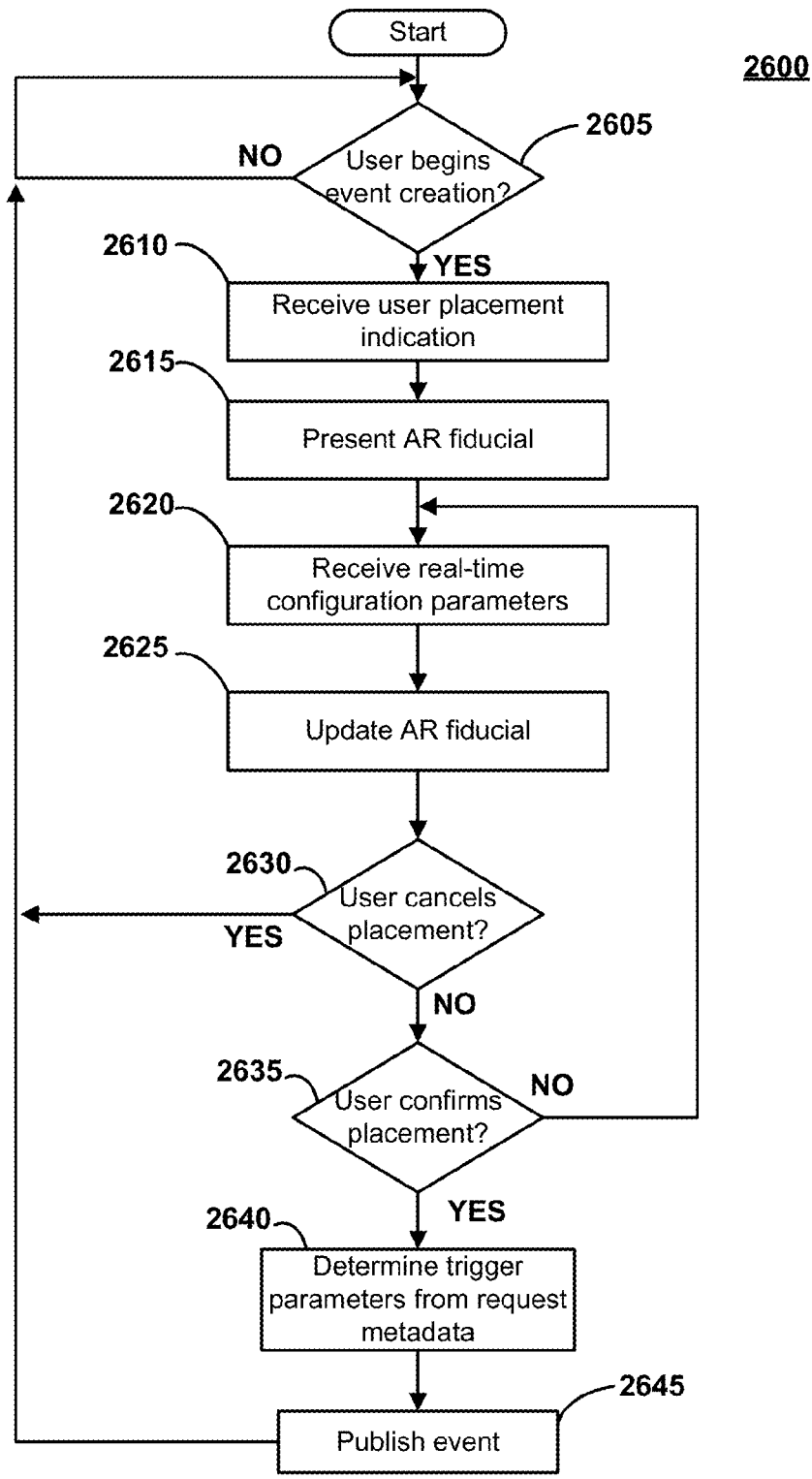
FIG. 26 is a flow diagram illustrating certain operations in a social virtual object event creation process as may be implemented in some embodiments.

FIG. 26 is a flow diagram illustrating certain operations in a social virtual object event creation process 2600 as may be implemented in some embodiments. The process 2600 may be implemented, e.g., all or in part on one or more of servers 1715a-c, hub 1745, user devices (e.g., tablets, head-mounted-displays 1760, etc.), etc., referred to for purposes of explanation in this section as the "system". Thus, in some embodiments, the process 2600 may occur via a web browser, while in some embodiments, the process 2600 may be implemented using an AR application.

At block 2605, the system may determine whether the user wishes to create a new social AR event (e.g., receiving a mouse click, an AR gesture, etc.). At block 2610, the system may receive a placement indication (e.g., a click on a virtual map of a target user's home environment, a projection upon a real-world position with a AR device in the selecting user's environment, etc.). At block 2615, the system may present a fiducial, or otherwise provide feedback to the user regarding their selected placement. For example, a sphere or circle may be placed about the center of the event to reflect a spatial event trigger. A timestamp billboard or overlay may be used to reflect a chronological trigger condition. The user may adjust the placement and parameters of the event, while the system provides feedback, at blocks 2620 and 2625 respectively. If the user cancels placement of the object at block 2630 the system may return to a state awaiting future placements.

Once the user confirms that the placement and parameters are as desired (e.g., the appropriate callback functions are in place, the event triggers selected, etc.) at block 2635 the system may package the event into a form suitable for publication to a server, hub, AR device, etc. For example, the event may be presented as XML or JSON. The system may also provide any third-party notifications (e.g., notify a commercial retailer that a gift card for a class of their products has been created as part of the event at a social site). As the trigger parameters may not be explicitly defined by the user, the system may need to infer the parameters from the request metadata at block 2640. The event may be a data object with fields indicating the nature of the event, the virtual objects involved, the triggering conditions, end conditions, etc. At block 2645, the system may publish the properly packaged event for use by a server, AR system, etc. (e.g., for use in process 2000).

14. Shared Room Systems and Methods

In some embodiments, multiple users may virtually share the real space (or their virtual space) around them with others. Each person may stay in their own environment, but it may appear to them that all the people are located in the same real space. For example, Person A may share a model or part of a model with person B. Person B may designate an area in their environment that person A's space should map to. The mapping may produce a 3D transform $T_{AB}$ from a location in person B's environment to a location in person A's environment. Once the mapping has been established, person B's virtual location in person A's environment can be determined by first computing the pose $T_B$ of person B in their own environment, and then composing with the mapping transform to obtain a pose in person A's environment $TA=T_{AB}T_B$. Similarly, the inverse mapping $T_{AB}^{-1}$ can be used to compute the virtual pose of person A in person B's environment.

The location of person A in person B's environment may be marked by a virtual object or avatar. Additionally, if person A's device is equipped with a front-facing camera, and image or video stream can be displayed on the virtual marker or avatar. For example, if the virtual marker has a virtual screen attached, person A's video stream may be shown on this virtual screen. Audio from person A may also be captured and played back from the same virtual screen. Alternatively, person A's video stream (or image) can be shown on a billboard quad placed at the virtual location of person A in person B's environment.

Figure 27:
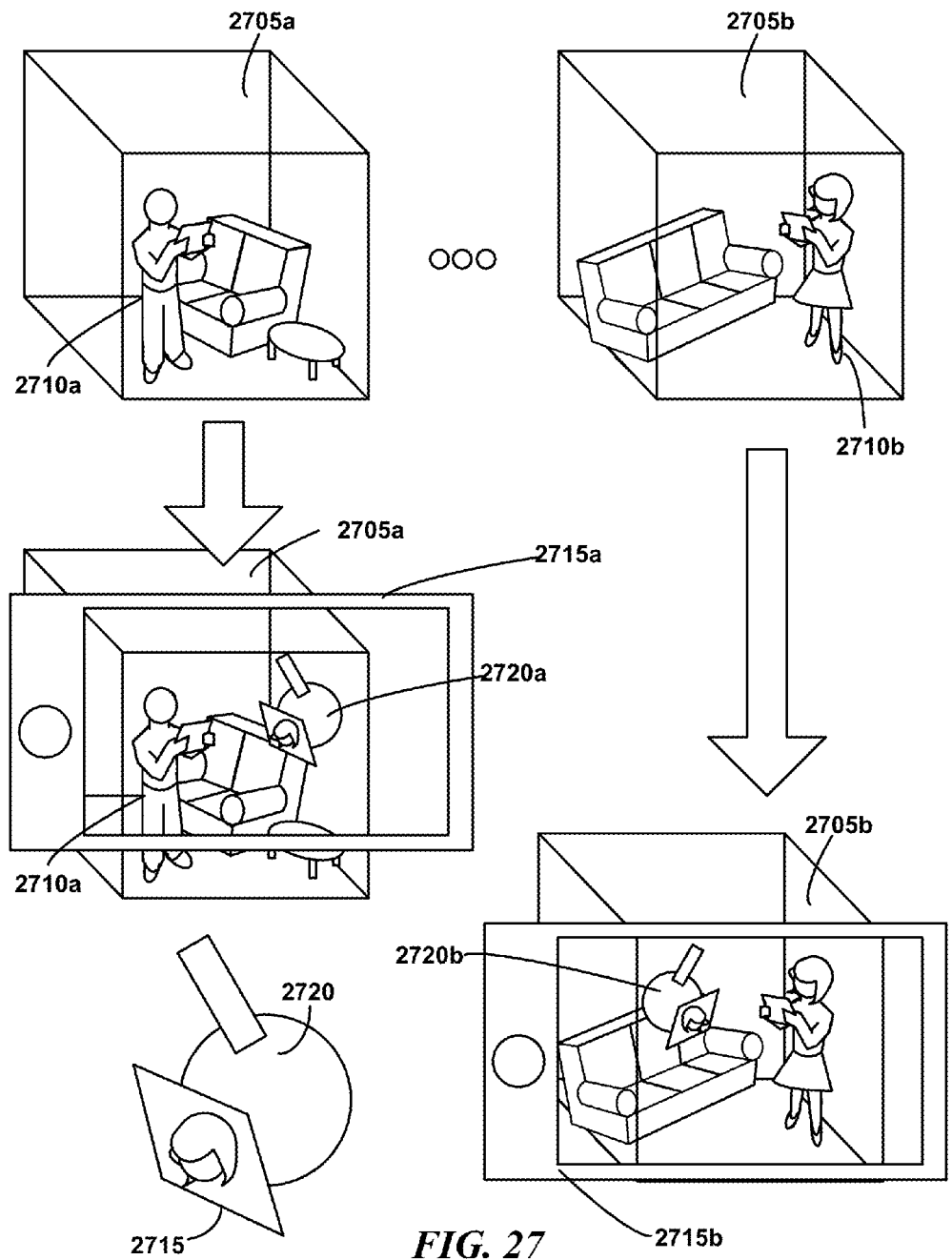
FIG. 27 is a series of diagrams illustrating an example of the "Shared Room" systems and methods considered in some embodiments.

FIG. 27 is a series of diagrams illustrating an example of the "Shared Room" systems and methods considered in some embodiments. In this example, two users 2710a, 2710b wish to share an evening despite being located in rooms 2705a, 2705b which may be hundreds of miles apart (e.g., between Boston and Los Angeles). Each of users' 2710a, 2710b AR devices may present augmented realities that include an avatar 2720 of the other user (in this example, the other user's face is displayed on the screen 2715).

Particularly, a user in user 2710a's room 2705a, including user 2710a will perceive user 2710b's avatar 2720a (AR device 2715a shows the augmented reality from a third person's perspective, standing in room 2705a). Conversely, a user in user 2710b's room 2705b, including user 2710b will perceive user 2710a's avatar 2720b (AR device 215b shows the augmented reality from a third person's perspective, standing in room 2705a). As each of users 2710a, 2710b move about their respective rooms 2705a, 2705b their avatars will move about the corresponding rooms 2705b, 2705a as though they were physically present with the other user.

The virtual object showing the location of person A may be, e.g., a cube, a screen, or any other suitable virtual object. It may be a humanoid avatar, who will move so that its head is positioned at the estimated location of person A's head. The location of person A's head can be estimated to be the location of the AR device, with an optional offset for a natural viewing distance. Additionally, face tracking techniques can be used to determine the position of person A's head with respect to the AR device. Alternatively, the screen can be displayed at the location the AR device screen is located, making it appear as if the AR device screen is a bi-directional window.

Figure 28:
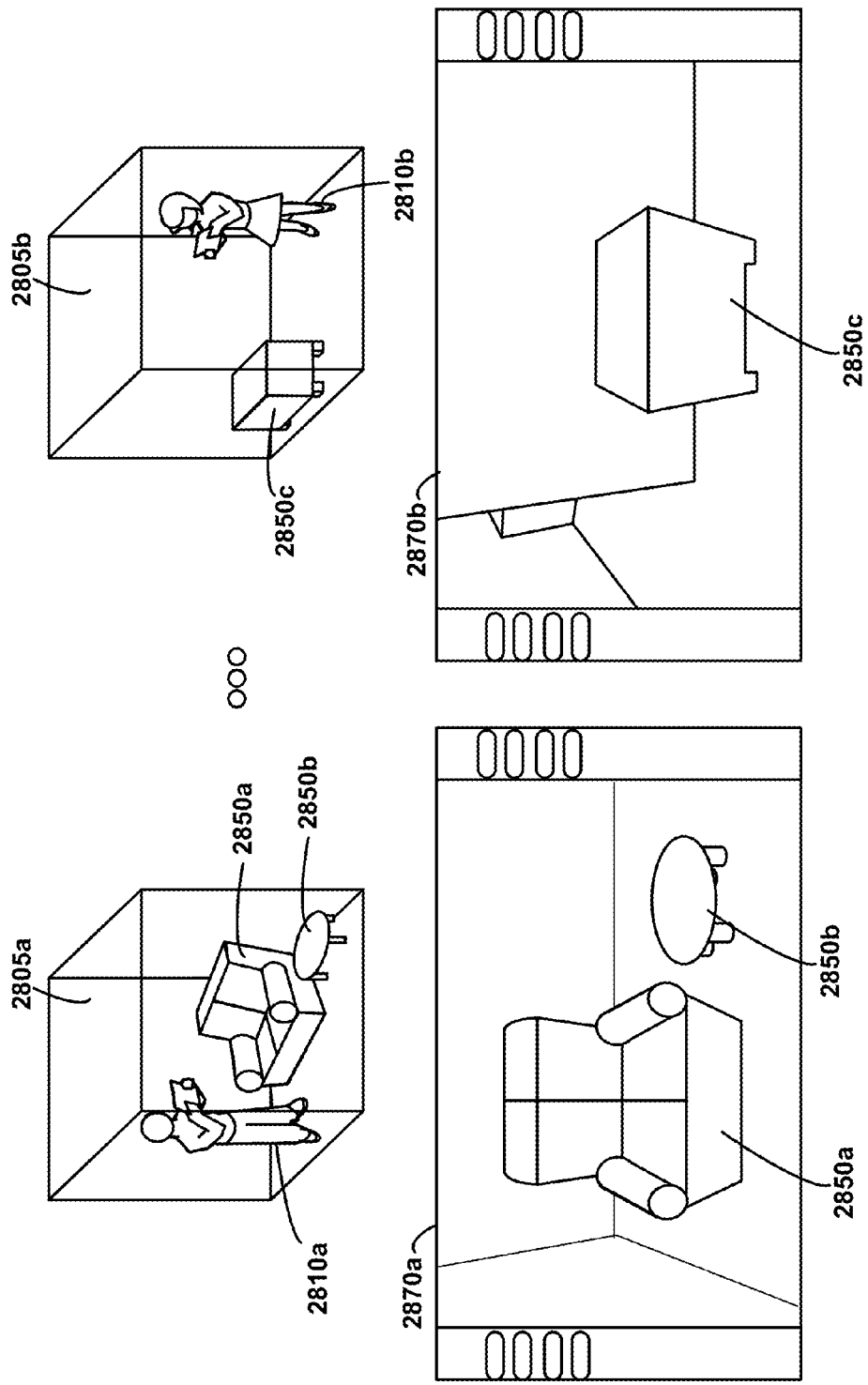
FIG. 28 is a conceptual diagram illustrating a pair of user perspectives in a shared AR experience before activation as may occur in some embodiments.
Figure 29:
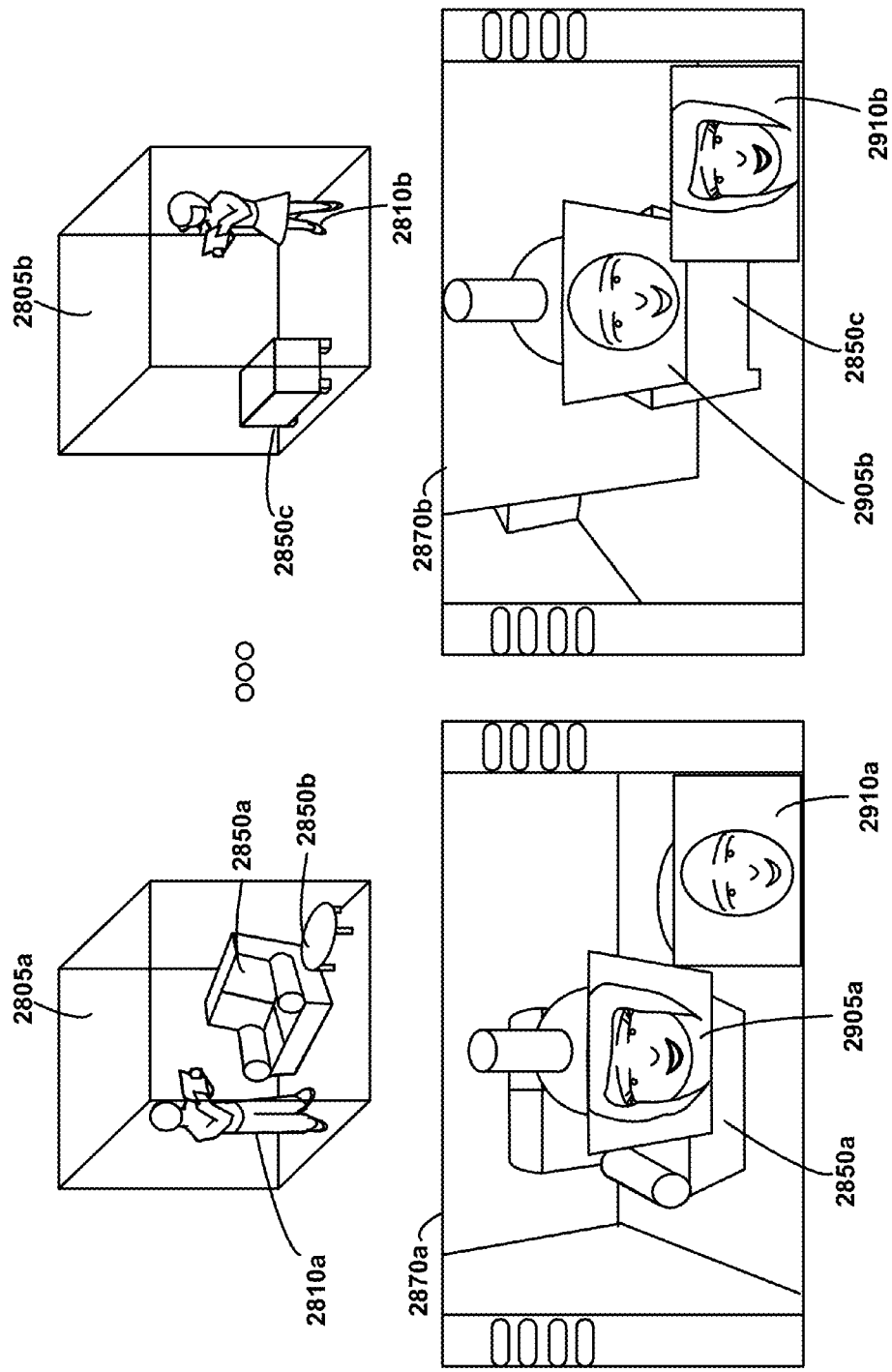
FIG. 29 is a conceptual diagram illustrating a pair of user perspectives in a shared AR experience after activation as may occur in some embodiments.

FIG. 28 is a conceptual diagram illustrating a pair of user perspectives in a shared AR experience following activation of the experience as may occur in some embodiments. As illustrated, prior to the shared user experience beginning, each of the AR users' respective perspectives 2870a (for user 2810a) and 2870b (for user 2810b) may show only real-world objects in their environments (e.g., furniture 2850a-c). FIG. 29 is a conceptual diagram illustrating a pair of user perspectives in a shared AR experience after activation as may occur in some embodiments. Once the shared-room application has begun, both users will see avatars 2905a, 2905b of the other users. The avatars may acquire real-time video of the user (e.g., via a camera facing the user on the same side of a tablet as a touch screen). The view presented to their counterpart may also be provided locally in popup displays 2910a, 2910b so that the user may gauge the other user's perception of them.

Figure 30:
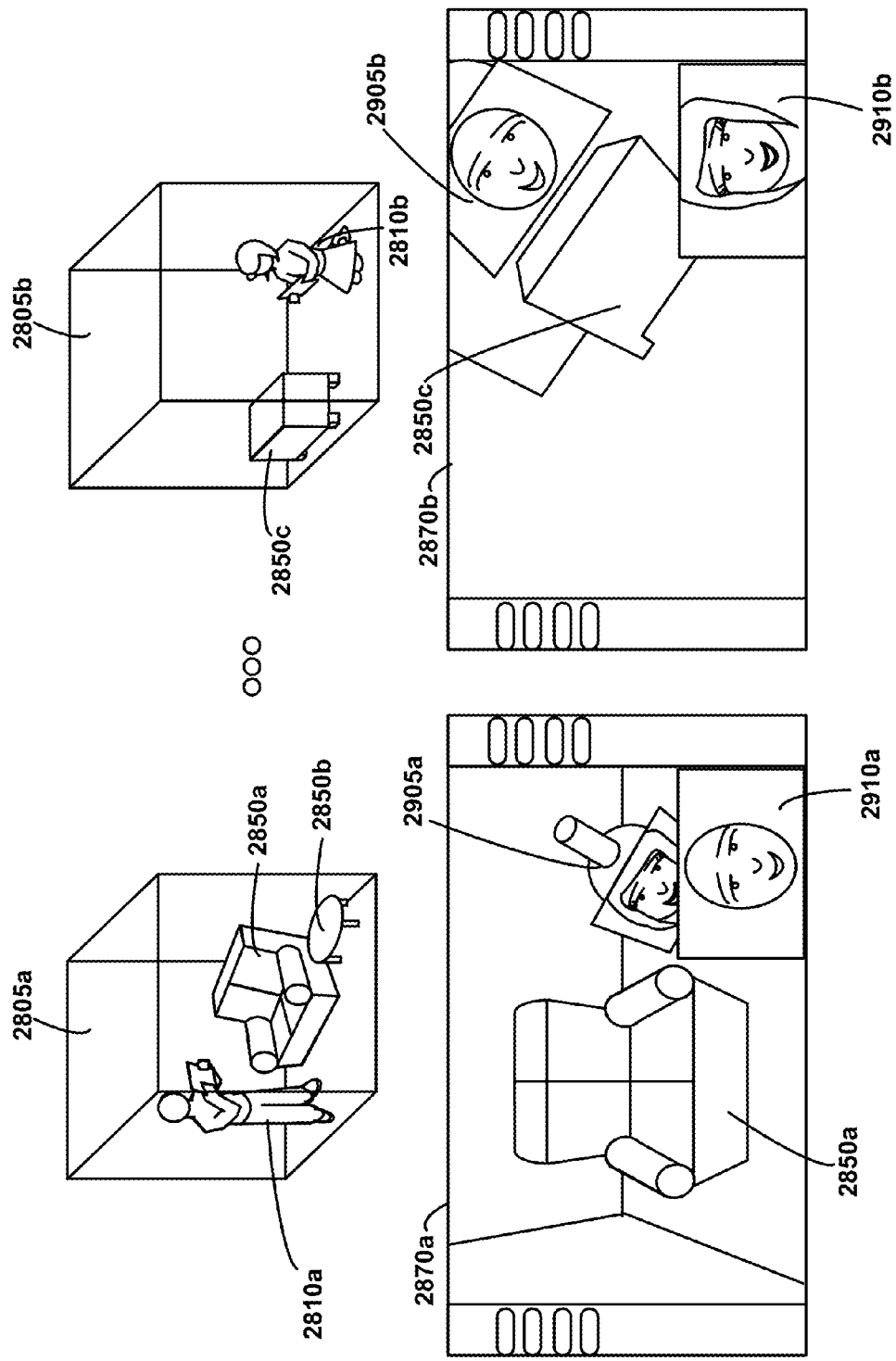
FIG. 30 is a conceptual diagram illustrating a pair of user perspectives in a shared AR experience after a user assumes a new orientation as may occur in some embodiments.

FIG. 30 is a conceptual diagram illustrating a pair of user perspectives in a shared AR experience after a user assumes a new orientation as may occur in some embodiments. Particularly, user 2810b is now on her knees and has rotated her tablet (or turned her head with a head-mounted display, etc.). Consequently, the respective views and placements of the avatars have changed.

Figure 31:
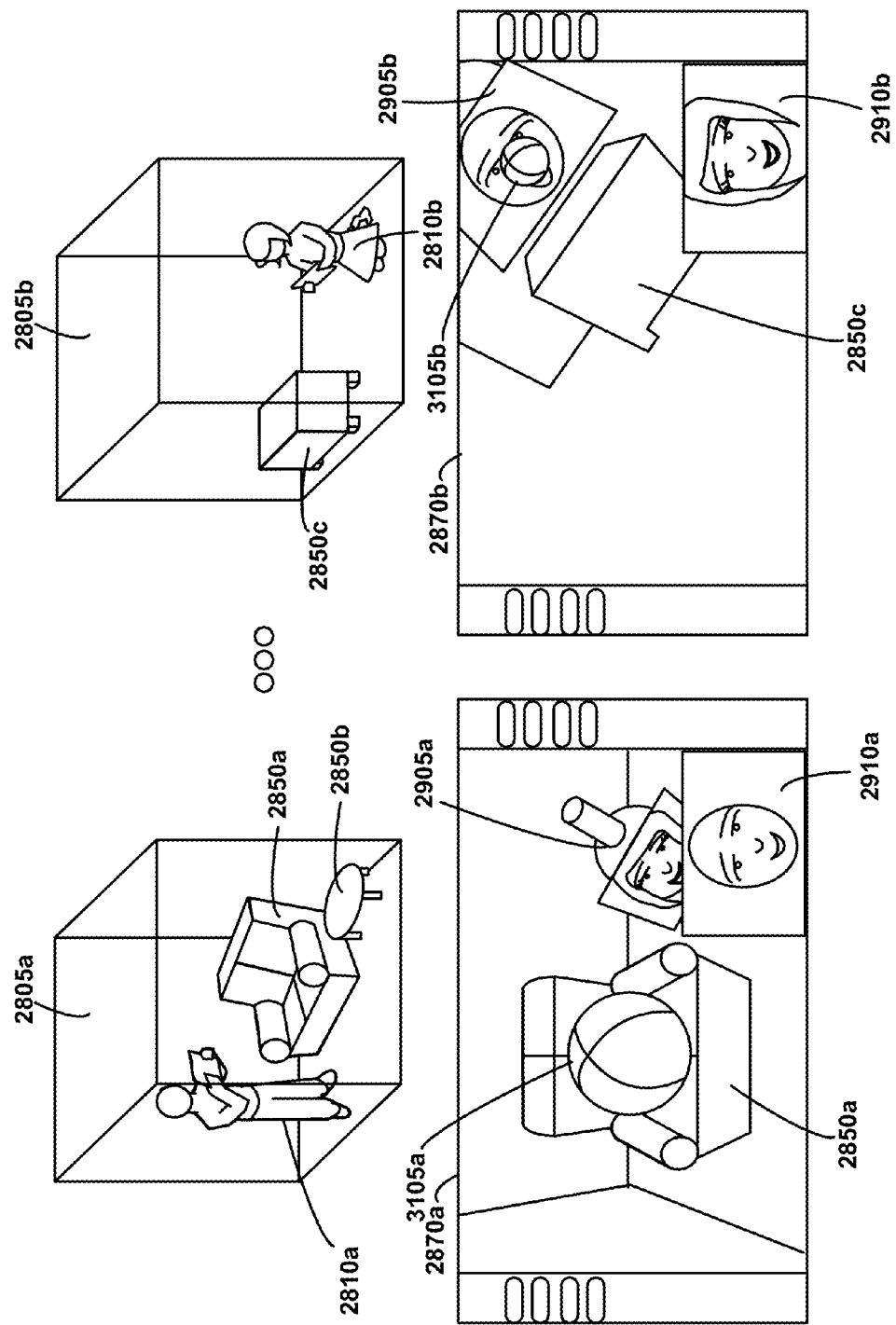
FIG. 31 is a conceptual diagram illustrating a pair of user perspectives in a shared AR experience prior to beginning a simulated physical interaction as may occur in some embodiments.

The system may infer surfaces and normals from both virtual and real-world objects to perform physical simulations between the rooms. In FIG. 31 user 2710a is about to toss a virtual ball to user 2710b. The ball is represented by an appropriate corresponding virtual object 3105a, 3105b in each augmented field of view. Virtual pets, avatars, non-playable videogame characters, etc. may all be reflected by shared virtual objects in an analogous fashion.

Figure 32:
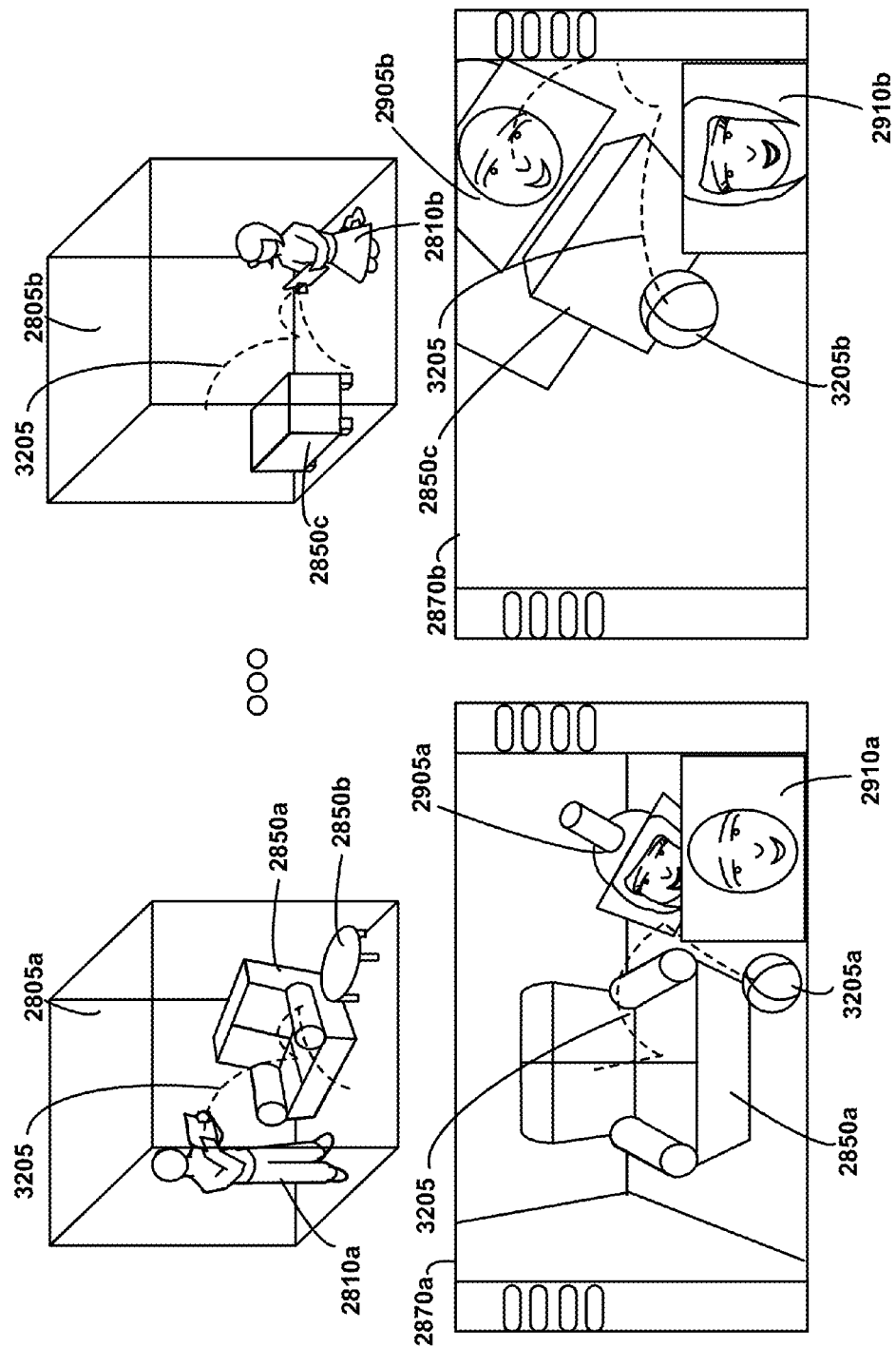
FIG. 32 is a conceptual diagram illustrating a pair of user perspectives in a shared AR experience depicting the path taken by a virtual object in a simulated physical interaction as may occur in some embodiments.

In FIG. 32, user 2810a has tossed the virtual ball and it has taken a path 3205. Note that the ball rebounds off both real-world objects (e.g., chair 2850a) and user 2810b's virtual avatar before coming to a stop on the floor. The decision whether to use one user's or another's real-world environment, as well as their respective virtual objects, for collision assessments can be made based upon context. For example, where one user has full depth determination capability and the other user does not (e.g., the other user is using an outdated touchscreen phone), the system may preferentially rely upon real-world and virtual objects in the depth-capable user's AR experience. The interaction may provide graphical signals to the users to inform them of which environment "dominates" such interactions. In some embodiments, one user engages in an AR experience (e.g., user 1720a) while the other engages in VR experience (e.g., user 1720d) as if they were in the first user's environment. In this situation, the first environment may be used for all collision assessments.

In this manner, person A may be virtually present in person B's environment. Similarly, person B can be virtually present in person A's environment (which may be real or virtual). Thus, the two people will be able to address each other naturally, as if they are both located in the same physical space. In addition, the point person A is looking at (or has clicked on) can be also shown by a virtual marker. This can facilitate pointing and interaction. As discussed, more than two people can be sharing the same space at the same time, thus enabling virtual tele-conference meetings or get-togethers.

One specific case of space-sharing is in multi-player games. Two or more players may designate play areas in their homes and share them with each other. Then they all join a game that takes place in this shared space. For example, the users may play a ball game or a shooter. The two systems can synchronize states of other virtual objects, so they see where the other players are and where the other characters are (for example, puppy, ball, goblins, etc.)

Virtual tele-presence can be extended to persistent sharing, where the designated areas remain shared over a lengthy period of time. For example, before moving-in together, a couple may decide to first share their homes via persistent sharing. In this way, they could leave notes, little surprises, and reminders to each other around the home and they can get a sense of living together.

There are several ways in which the two shared spaces may be combined. The type of sharing that is selected may depend on the application or user preference. The two shared areas may overlap (i.e., be overlaid on one another). For example, if each user selects a rectangular area in their environment to share with others, the system may automatically scale and align these rectangles to make their shapes match. These rectangles will then be rotated and offset to coincide with each other.

Alternatively, one of the users may manually specify how one area should map to another. This can be done by scaling, rotating, and translating models in a 3D model viewer. In some embodiments it may be done directly in that user's environment by overlaying a model of the other user's space onto the existing environment. Then, the user could scale, rotate, and translate this model using techniques similar to furniture placement described in U.S. Provisional Patent Application No. 62/080,400 filed Nov. 16, 2014 and U.S. Provisional Patent Application No. 62/080,983 filed Nov. 17, 2014.

Instead of making the two shared areas overlap, the environments may be placed side-by-side in some embodiments. For example, if two rooms are shared, they can be virtually joined along a wall. That wall may become a "virtual window" into the virtually adjoining room. In this case, the local data at and beyond the adjoining wall is not displayed, so that instead the data from the other side would be displayed. Additionally, some amount of local data in front of the adjoining virtual wall may also not be displayed, either a pre-specified amount (to remove sensor noise getting some points on the local wall) or user specified amount (to remove the chair by the adjoining wall so the user can see into the adjoining wall without it being occluded by the local chair). The other side can be represented by its 3D model, on which the other user's location is shown by a screen or avatar.

Scaling and alignment of the two shared areas may be performed manually or automatically by the system. Additionally, each user may click on a wall in their room along which they would like the areas to be joined. When two people virtually share a space, there are several types of content that can be displayed, including virtual objects, 3D models of each user's environment, and RGBD scan data coming in from each AR device, which can be further segmented into static and dynamic objects. Depending upon the application and/or user preference, a different combination of this content may be displayed to each user.

In some cases, it makes sense to see shared virtual objects for all users (with the exception of the avatar representing the user himself). For other types of content, there is a multitude of choices. A user may decide just to see his local environment, without seeing any geometry of the remote environment, only shared virtual objects in his own environment, etc. In this example, the remote model may not be rendered, and only the local scan received from their AR device and the shared virtual objects may be rendered. In some embodiments, the user may decide to just see the remote environment, without seeing any local geometry. In this case the local scan received from their AR device may not be rendered, and instead only remote model and shared virtual objects are rendered.

In some embodiments, the user may wish to see the data from a remote AR device overlaid on top of the remote model. In this case the remote model and shared virtual objects are rendered, together with the remote scan from the point of view where the remote AR device was located. This would make the remote AR device act as a kind of flashlight, highlighting what the remote user sees. As the remote user moves in his environment, the local user would see remote changes, but they would see it from their local perspective, instead of the perspective of the remote user. For this purpose, the remote scan may be filtered to remove triangles on depth discontinuities, such that if depth difference of triangle vertices differ by some amount (either a threshold, or determined by some function), that triangle would not be rendered.

In some embodiments, the user may decide to see the remote environment, but with any local dynamic obstacles visible (for example, passing pets, people, etc.). This may be accomplished by use of the clean-up mode (discussed, e.g., in U.S. Provisional Patent Application No. 62/080,400 filed Nov. 16, 2014 and U.S. Provisional Patent Application No. 62/080,983 filed Nov. 17, 2014), whereby clean-up mode would identify all pixels/vertices that are out of place. These pixels/vertices may be kept, and the rest removed (or their pixel coordinates are set such that it would be very far, or alternatively their pixel color is changed to be fully transparent, or alternatively the have the shader program not render them). The resulting filtered local scan, together with remote model, and shared virtual objects may be rendered.

In some embodiments, the user may decide to see both the local and the remote environment, allowing the environments to occlude each other. This may be particularly useful if the user is manually overlapping the two environments (similar to how the user can place virtual furniture). In this case, the system may render the local scan received from the user's device, the remote model, and the shared virtual objects.

In some embodiments, the user may decide to see both the local and the remote environment, but in cases where the surface closely matches (e.g., the floor) the user may prefer to only see the local environment. To do this, the system may create a subset of the remote model, removing parts that are close to the surface of the local environment (this can be either the local scan, the local model, or either of those) where "close" can be a tolerance (threshold) or a function (for example for projection sensors this can be based upon distance). The system may then render the local scan, the subset of the remote model, and the shared virtual objects.
Shared Room Systems and Methods—Display Modes—Remote with Protruding Local Similarly, a user may decide to see both a local and remote environment, but in cases where the surface closely matches, the user may prefer to only see the remote environment. To do this the system may remove vertices in the local scan (or set their range from the viewing camera to be very large) where those vertices fall close to the remote model surface (again, either by a threshold, a function, etc.). The system may then render the resulting filtered local scan, remote model, and shared virtual objects. Beyond selecting the types of content to be displayed, each type of content may be rendered in a different way in some embodiments. For example, local data may be rendered as a textured solid, whereas remote model data may be rendered in a single semi-transparent color or as a see-through mesh.

Figure 33:
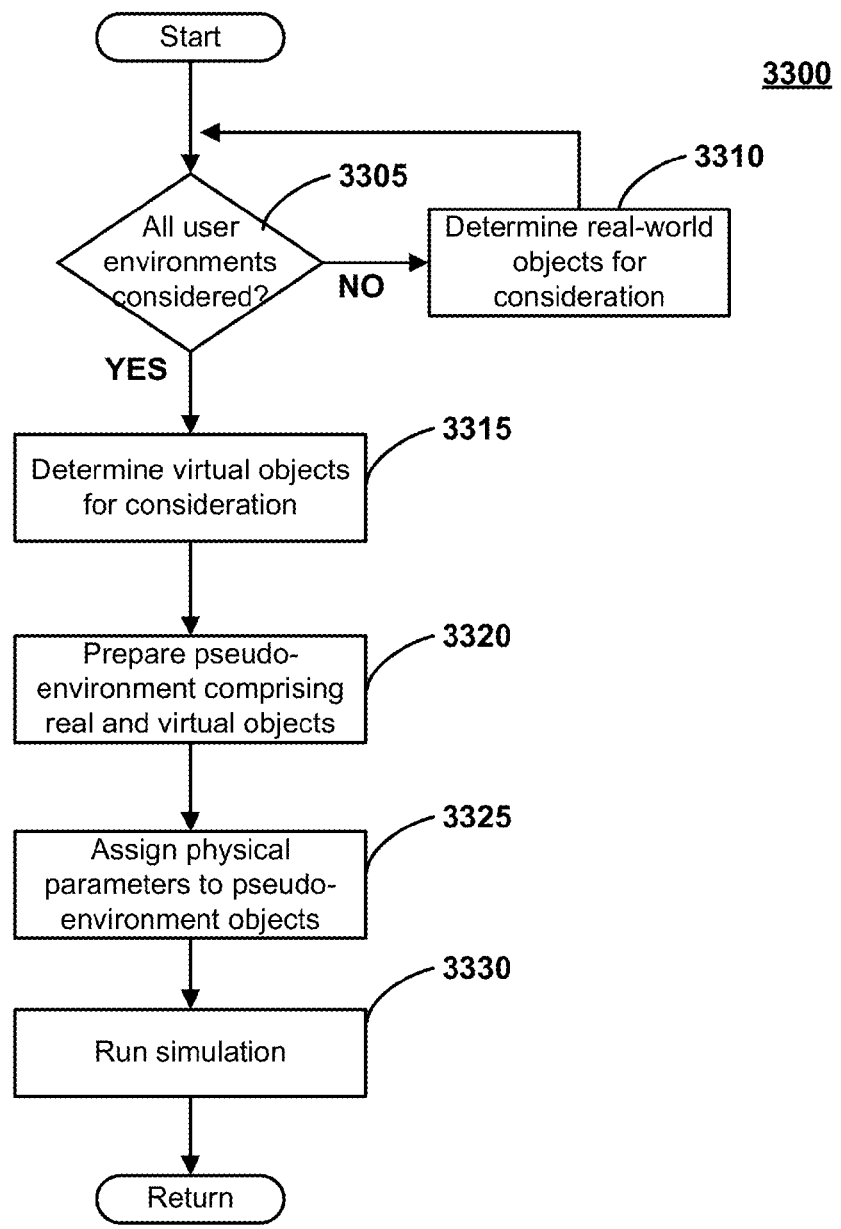
FIG. 33 is a flow diagram illustrating certain operations in shared physical simulation experience process as may be implemented in some embodiments.

FIG. 33 is a flow diagram illustrating certain operations in shared physical simulation experience process 3300 as may be implemented in some embodiments. The process 3300 may be implemented, e.g., all or in part on one or more of servers 1715*a-c*, hub 1745, user devices (e.g., tablets, head-mounted-displays 1760, etc.), etc., referred to for purposes of explanation in this section as the "system". At blocks 3305 and 3310 the system may consider all the real-world environments that are part of a social interaction and the relevant real-world objects within them. For example, these operations may be performed each time a new real-world location is included in a social interaction. The system may determine the relevant real-world objects to consider based upon their proximity to a user, the object's likelihood of being within the reachable effects of the physics simulation, designations provided by a user, etc.

At block 3315, the system may determine the virtual objects to be considered in the simulation. For example, not only dynamic objects (for example, the ball discussed herein), but various virtual objects (such as the user's avatars) may be taken into consideration. The selection of a virtual object, like the real world objects, may be context dependent (e.g., a video game may use most or all of the objects, both real and virtual, while a conferencing software may emphasize the virtual objects).

At block 3320, the system may prepare a "pseudo environment" based upon the selected virtual and real-world objects. This may simply be the placement of the objects in a data structure, or their geometry being flagged for consideration in the simulation. However, the pseudo-environment may also include considerable supplemental data depending upon the character and needs of the physical simulation. For example, at block 3325, the system may assign physical parameters to each of the objects, such as their mass, resistance, compressibility, etc. These parameters may inform the response of each object to the simulation once it is run at block 3330.

Computer System

Figure 34:
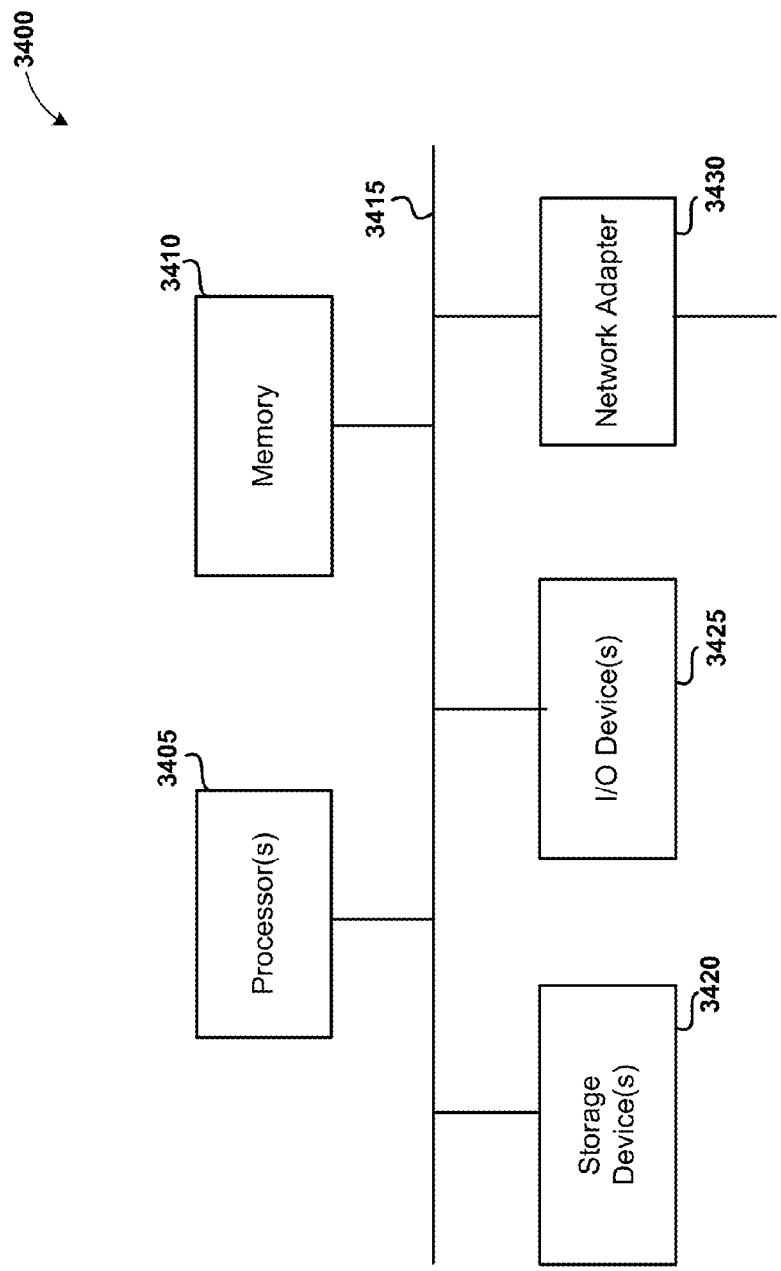
FIG. 34 is a block diagram of a computer system as may be used to implement features of some of the embodiments.

FIG. 34 is a block diagram of a computer system as may be used to implement features of some of the embodiments. The computing system 3400 may include one or more central processing units ("processors") 3405, memory 3410, input/output devices 3425 (e.g., keyboard and pointing devices, display devices), storage devices 3420 (e.g., disk drives), and network adapters 3430 (e.g., network interfaces) that are connected to an interconnect 3415. The interconnect 3415 is illustrated as an abstraction that represents any one or more separate physical buses, point to point connections, or both connected by appropriate bridges, adapters, or controllers. The interconnect 3415, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 3410 and storage devices 3420 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non transitory" media) and computer-readable transmission media.

The instructions stored in memory 3410 can be implemented as software and/or firmware to program the processor(s) 3405 to carry out actions described above. In some embodiments, such software or firmware may be initially provided to the processing system 3400 by downloading it from a remote system through the computing system 3400 (e.g., via network adapter 3430).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A server comprising:
    at least one processor;
    a network interface;
    at least one memory comprising instructions configured to cause the at least one processor to cause a method to be performed, the method comprising;
        causing a user interface to be presented to a first user, the user interface depicting a three-dimensional virtual map of a real-world environment created by a second user and the user interface configured to receive an event trigger condition in association with the three-dimensional virtual map;
        receiving, via the network interface and the user interface, an event trigger condition from the first user;
        receiving, via the network interface, an indication from the first user of a virtual object associated with the event trigger;
        determining that a copy of the virtual object is available at the server;
        determining that the event trigger condition has been met; and causing the virtual object to appear at an Augmented Reality (AR) device associated with the second user based upon the event trigger condition while the second user is at the real-world environment based upon a final pose of the AR device determined, at least in part, by iteratively performing, for at least two iterations, a correspondence identification process and a pose determination process, wherein the correspondence identification process comprises:
determining a plurality of correspondences between frame data transformed using a pose and model data of the real-world environment, and wherein the pose determination process comprises:
iteratively refining an intermediate pose determination, at least in part, by pruning candidate poses within a search space and considering poses from progressively smaller neighborhoods.

2. The server of claim 1, wherein the final pose is determined, at least in part, at the server using:
depth data received at the server from the AR device.

3. The server of claim 1, wherein the second user created the three-dimensional virtual map of the real-world environment using a Pose Search Algorithm on an AR device.

4. The server of claim 1, the method further comprising:
determining an end condition associated with the event trigger condition;
determining that the end condition has been met; and
causing the virtual object to disappear at the AR device associated with the second user based upon the end condition.

5. The server of claim 1, wherein the pose determination process comprises a Scaling Series algorithm.

6. The server of claim 1, wherein the server is the AR device associated with the second user.

7. The server of claim 1, wherein the pose determination process generates:
a Bayesian belief probability distribution associated with a given time; and
a pose corresponding to a transform.

8. A non-transitory computer-readable medium comprising instructions configured to cause a computer system to perform a method comprising:
causing a user interface to be presented to a first user, the user interface depicting a three-dimensional virtual map of a real-world environment created by a second user and the user interface configured to receive an event trigger condition in association with the three-dimensional virtual map;
receiving, via a network interface, an event trigger condition from the first user;
receiving, via the network interface, an indication from the first user of a virtual object associated with the event trigger;
determining that a copy of the virtual object is available at a server;
determining that the event trigger condition has been met; and
causing the virtual object to appear at an Augmented Reality (AR) device associated with the second user while the second user is at the real-world environment based upon a final pose of the AR device determined, at least in part, by iteratively performing, for at least two iterations, a correspondence identification process and a pose determination process, wherein
the correspondence identification process comprises:
determining a plurality of correspondences between frame data transformed using a pose and model data of the real-world environment, and wherein the pose determination process comprises:
iteratively refining an intermediate pose determination, at least in part, by pruning candidate poses within a search space and considering poses from progressively smaller neighborhoods.

9. The non-transitory computer-readable medium of claim 8, wherein the final pose is determined, at least in part, at the server using depth data received from the AR device.

10. The non-transitory computer-readable medium of claim 8, wherein the second user created the three-dimensional virtual map of the real-world environment using a Pose Search Algorithm on an AR device.

11. The non-transitory computer-readable medium of claim 8, wherein the pose determination process comprises a Scaling Series algorithm.

12. The non-transitory computer-readable medium of claim 8, wherein determining that the event trigger condition has been met comprises determining a position of the AR device using a Pose Search Algorithm.

13. The non-transitory computer-readable medium of claim 8, wherein the server is the AR device associated with the second user.

14. The non-transitory computer-readable medium of claim 8, wherein receiving, via the network interface, the event trigger condition from the first user comprises receiving the event trigger condition from a social networking website.

15. A computer-implemented method comprising:
causing a user interface to be presented to a first user, the user interface depicting a three-dimensional virtual map of a real-world environment created by a second user and the user interface configured to receive an event trigger condition in association with the three-dimensional virtual map;
receiving, via a network interface and the user interface, an event trigger condition from the first user;
receiving, via the network interface, an indication from the first user of a virtual object associated with the event trigger;
determining that a copy of the virtual object is available at a server;
determining that the event trigger condition has been met; and
causing the virtual object to appear at an Augmented Reality (AR) device associated with the second user while the second user is at the real-world environment, based upon a final pose of the AR device determined, at least in part, by iteratively performing, for at least two iterations, a correspondence identification process and a pose determination process, wherein
the correspondence identification process comprises:
determining a plurality of correspondences between frame data transformed using a pose and model data of the real-world environment, and wherein the pose determination process comprises:
iteratively refining an intermediate pose determination, at least in part, by pruning candidate poses within a search space and considering poses from progressively smaller neighborhoods.

16. The computer-implemented method of claim 15, wherein the final pose is determined, at least in part, at the server using depth data received from the AR device.

17. The computer-implemented method of claim 16, wherein the pose determination process comprises a Scaling Series algorithm.

18. The computer-implemented method of claim 15, wherein the second user created the three-dimensional virtual map of the real-world environment using a Pose Search Algorithm on an AR device.

19. The computer-implemented method of claim 15, wherein determining that the event trigger condition has been met comprises determining a position of the AR device using a Pose Search Algorithm.

20. The computer-implemented method of claim 15, wherein the server is the AR device associated with the second user.

* * * * *